United States Patent
Oh

(10) Patent No.: US 11,151,742 B2
(45) Date of Patent: Oct. 19, 2021

(54) POINT CLOUD DATA TRANSMISSION APPARATUS, POINT CLOUD DATA TRANSMISSION METHOD, POINT CLOUD DATA RECEPTION APPARATUS, AND POINT CLOUD DATA RECEPTION METHOD

(71) Applicant: LG ELECTRONICS INC., Seoul (KR)

(72) Inventor: Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/826,090

(22) Filed: Mar. 20, 2020

(65) Prior Publication Data

US 2020/0302632 A1 Sep. 24, 2020

Related U.S. Application Data

(60) Provisional application No. 62/822,004, filed on Mar. 21, 2019.

(51) Int. Cl.
*G06T 7/62* (2017.01)
*G06T 7/187* (2017.01)

(52) U.S. Cl.
CPC ............... *G06T 7/62* (2017.01); *G06T 7/187* (2017.01); *G06T 2207/10028* (2013.01)

(58) Field of Classification Search
CPC . G06T 2207/10028; G06T 7/187; G06T 7/62; H04N 19/597
See application file for complete search history.

(56) References Cited

U.S. PATENT DOCUMENTS

| | | |
|---|---|---|
| 2014/0219346 A1 | 8/2014 | Ugur et al. |
| 2017/0053538 A1 | 2/2017 | Samarasekera et al. |
| 2017/0347122 A1 | 11/2017 | Chou et al. |
| 2019/0197739 A1* | 6/2019 | Sinharoy ............... G06T 3/4007 |
| 2020/0112709 A1* | 4/2020 | Lim ............... H04N 21/234345 |
| 2020/0226792 A1* | 7/2020 | Wang ................... H04N 19/597 |
| 2020/0304834 A1* | 9/2020 | Wang ..................... H04N 21/83 |

FOREIGN PATENT DOCUMENTS

KR 20180122947 11/2018

OTHER PUBLICATIONS

PCT International Application No. PCT/KR2020/095010, International Search Report dated Jun. 25, 2020, 10 pages.
Mekuria et al., "Design, Implementation and Evaluation of a Point Cloud Codec for Tele-Immersive Video," In: IEEE Transactions on Circuits and Systems for Video Technology, vol. 27, Issue 4, Sep. 15, 2017, 16 pages.

* cited by examiner

*Primary Examiner* — Dakshesh D Parikh
(74) *Attorney, Agent, or Firm* — Lee, Hong, Degerman, Kang & Waimey

(57) ABSTRACT

Disclosed herein are a point cloud data transmission method including encoding point cloud data and transmitting the point cloud data, and a point cloud data reception method including receiving point cloud data, decoding the point cloud data, and rendering the point cloud data.

8 Claims, 34 Drawing Sheets

POINT CLOUD DATA TRANSMISSION APPARATUS, POINT CLOUD DATA TRANSMISSION METHOD, POINT CLOUD DATA RECEPTION APPARATUS, AND POINT CLOUD DATA RECEPTION METHOD

Pursuant to 35 U.S.C. § 119(e), this application claims the benefit of U.S. Provisional Application No. 62/822,004, filed on Mar. 21, 2019, the contents of which are all hereby incorporated by reference herein in its entirety.

BACKGROUND OF THE INVENTION

Field of the Invention

Embodiments provide a method for providing point cloud contents to provide a user with various services such as virtual reality (VR), augmented reality (AR), mixed reality (MR), and autonomous driving services.

Discussion of the Related Art

A point cloud is a set of points in a three-dimensional (3D) space. It is difficult to generate point cloud data because the number of points in the 3D space is large.

A large amount of throughput is required to transmit and receive data of a point cloud, which raises an issue.

SUMMARY OF THE INVENTION

An object of the present disclosure is to provide a point cloud data transmission apparatus, a point cloud data transmission method, a point cloud data reception apparatus, and a point cloud data reception method for efficiently transmitting and receiving a point cloud.

Another object of the present disclosure is to provide a point cloud data transmission apparatus, a point cloud data transmission method, a point cloud data reception apparatus, and a point cloud data reception method for addressing latency and encoding/decoding complexity.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of transmitting point cloud data may include encoding point cloud data, and transmitting the point cloud data.

In another aspect of the present disclosure, a method of receiving point cloud data may include receiving point cloud data, decoding the point cloud data, and rendering the point cloud data.

A point cloud data transmission method, a point cloud data transmission apparatus, a point cloud data reception method, and a point cloud data reception apparatus according to embodiments may provide a good-quality point cloud service.

A point cloud data transmission method, a point cloud data transmission apparatus, a point cloud data reception method, and a point cloud data reception apparatus according to embodiments may achieve various video codec methods.

A point cloud data transmission method, a point cloud data transmission apparatus, a point cloud data reception method, and a point cloud data reception apparatus according to embodiments may provide universal point cloud content such as an autonomous driving service.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE INVENTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
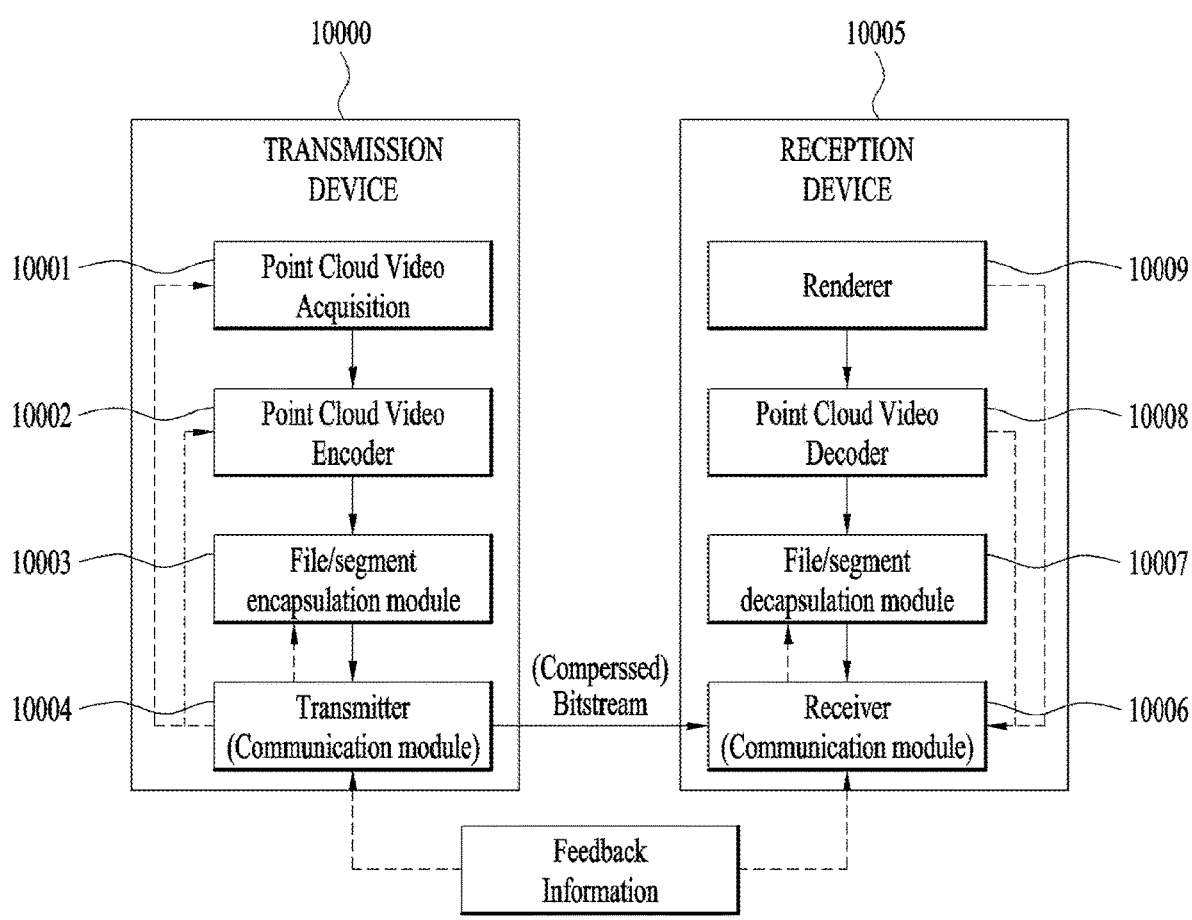
FIG. 1 illustrates an exemplary structure of a transmission/reception system for providing point cloud content according to embodiments.

FIG. 1 illustrates an exemplary structure of a transmission/reception system for providing point cloud content according to embodiments.

The present disclosure provides a method of providing point cloud content to provide a user with various services such as virtual reality (VR), augmented reality (AR), mixed reality (MR), and autonomous driving.

A point cloud data transmission device 10000 according to embodiment may include a point cloud video acquirer 10001, a point cloud video encoder 10002, a file/segment encapsulation module 10003, and/or a transmitter (or communication module) 10004.

The point cloud video acquirer 10001 according to the embodiments acquires a point cloud video through a process of capturing, synthesizing, or generating a point cloud video.

The point cloud video encoder 10002 according to the embodiments encodes the point cloud video data.

The file/segment encapsulation module 10003 according to the embodiments encapsulates the point cloud data in the form of a file and/or a segment.

The transmitter (or communication module) 10004 according to the embodiments transmits the encoded point cloud video data in the form of a bitstream.

A point cloud data reception device 10005 according to the embodiments may include a receiver 10006, a file/segment decapsulation module 10007, a point cloud video decoder 10008, and/or a renderer 10009.

The receiver 10006 according to the embodiments receives a bitstream containing point cloud video data. According to embodiments, the receiver 10006 may transmit feedback information to the point cloud data transmission device 10000.

The file/segment decapsulation module 10007 decapsulates a file and/or a segment containing point cloud data.

The point cloud video decoder 10007 decodes the received point cloud video data.

The renderer 10009 renders the decoded point cloud video data. According to embodiments, the renderer 10009 may transmit the feedback information obtained at the reception side to the point cloud video decoder 10008. The point cloud video data according to the embodiments may carry feedback information to the receiver. According to embodiments, the feedback information received by the point cloud transmission device may be provided to the point cloud video encoder.

Embodiments may provide a method of providing point cloud content to provide a user with various services such as virtual reality (VR), augmented reality (AR), mixed reality (MR), and autonomous driving.

In order to provide a point cloud content service, a point cloud video may be acquired first. The acquired point cloud video may be transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service (the point cloud data transmission method and/or point cloud data reception method) may include an acquisition process, an encoding process, a transmission process, a decoding process, a rendering process, and/or a feedback process.

According to embodiments, the process of providing point cloud content (or point cloud data) may be referred to as a point cloud compression process. According to embodiments, the point cloud compression process may represent a geometry-based point cloud compression process.

Each element of the point cloud data transmission device and the point cloud data reception device according to the embodiments may be hardware, software, a processor, and/or a combination thereof.

In order to provide a point cloud content service, a point cloud video may be acquired. The acquired point cloud video is transmitted through a series of processes, and the reception side may process the received data back into the original point cloud video and render the processed point cloud video. Thereby, the point cloud video may be provided to the user. Embodiments provide a method of effectively performing this series of processes.

The entire processes for providing a point cloud content service may include an acquisition process, an encoding process, a transmission process, a decoding process, a rendering process, and/or a feedback process.

The point cloud compression system may include a transmission device and a reception device. The transmission device may output a bitstream by encoding a point cloud video, and deliver the same to the reception device through a digital storage medium or a network in the form of a file or a stream (streaming segment). The digital storage medium may include various storage media such as a USB, SD, CD, DVD, Blu-ray, HDD, and SSD.

The transmission device may include a point cloud video acquirer, a point cloud video encoder, a file/segment encapsulator, and a transmitter. The reception device may include a receiver, a file/segment decapsulator, a point cloud video decoder, and a renderer. The encoder may be referred to as a point cloud video/picture/picture/frame encoder, and the decoder may be referred to as a point cloud video/picture/picture/frame decoding device. The transmitter may be included in the point cloud video encoder. The receiver may be included in the point cloud video decoder. The renderer may include a display. The renderer and/or the display may be configured as separate devices or external components. The transmission device and the reception device may further include a separate internal or external module/unit/component for the feedback process.

According to embodiments, the operation of the reception device may be the reverse of the operation of the transmission device.

The point cloud video acquirer may perform the process of acquiring point cloud video through a process of capturing, composing, or generating point cloud video. In the acquisition process, data of 3D positions (x, y, z)/attributes (color, reflectance, transparency, etc.) of multiple points, for example, a polygon file format (PLY) (or the stanford triangle format) file may be generated. For a video having multiple frames, one or more files may be acquired. During the capture process, point cloud related metadata (e.g., capture related metadata) may be generated.

A point cloud data transmission device according to embodiments may include an encoder configured to encode point cloud data, and a transmitter configured to transmit point cloud data.

A point cloud data reception device according to embodiments may include a receiver configured to receive point cloud data, a decoder configured to decode the point cloud data, and a renderer configured to render the point cloud data.

The method/device according to the embodiments represents the point cloud data transmission device and/or the point cloud data reception device.

Figure 2:
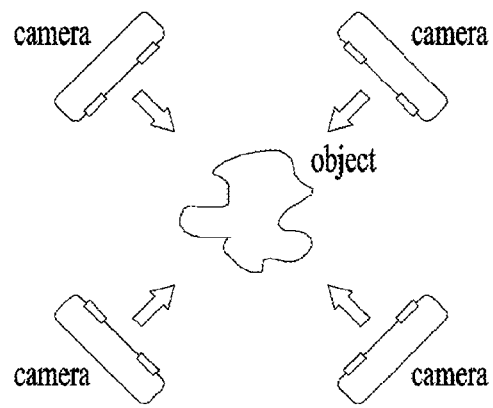
FIG. 2 illustrates capture of point cloud data according to embodiments.
Figure 2:
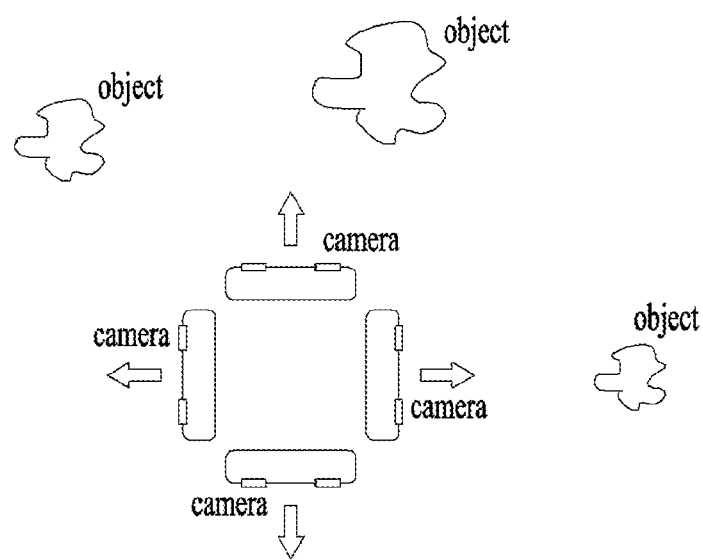

FIG. 2 illustrates capture of point cloud data according to embodiments.

Point cloud data according to embodiments may be acquired by a camera or the like. A capturing technique according to embodiments may include, for example, inward-facing and/or outward-facing.

In the inward-facing according to the embodiments, one or more cameras inwardly facing an object of point cloud data may photograph the object from the outside of the object.

In the outward-facing according to the embodiments, one or more cameras outwardly facing an object of point cloud data may photograph the object. For example, according to embodiments, there may be four cameras.

The point cloud data or the point cloud content according to the embodiments may be a video or a still image of an object/environment represented in various types of 3D spaces.

For capture of point cloud content, a combination of camera equipment (a combination of an infrared pattern projector and an infrared camera) capable of acquiring depth and RGB cameras capable of extracting color information corresponding to the depth information may be configured. Alternatively, the depth information may be extracted through LiDAR, which uses a radar system that measures the location coordinates of a reflector by emitting a laser pulse and measuring the return time. A shape of the geometry consisting of points in a 3D space may be extracted from the depth information, and an attribute representing the color/reflectance of each point may be extracted from the RGB information. The point cloud content may include information about the positions (x, y, z) and color (YCbCr or RGB) or reflectance (r) of the points. For the point cloud content, the outward-facing technique of capturing an external environment and the inward-facing technique of capturing a central object may be used. In the VR/AR environment, when an object (e.g., a core object such as a character, a player, a thing, or an actor) is configured into point cloud content that may be viewed by the user in any direction (360 degrees), the configuration of the capture camera may be based on the inward-facing technique. When the current surrounding environment is configured into point cloud content in a mode of a vehicle, such as autonomous driving, the configuration of the capture camera may be based on the outward-facing technique. Because the point cloud content may be captured by multiple cameras, a camera calibration process may need to be performed before the content is captured to configure a global coordinate system for the cameras.

The point cloud content may be a video or still image of an object/environment presented in various types of 3D spaces.

Additionally, in the point cloud content acquisition method, any point cloud video may be composed based on the captured point cloud video. Alternatively, when a point cloud video for a computer-generated virtual space is to be provided, capturing with an actual camera may not be performed. In this case, the capture process may be replaced simply by a process of generating related data.

Post-processing may be needed for the captured point cloud video to improve the quality of the content. In the video capture process, the maximum/minimum depth may be adjusted within a range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, one piece of point cloud content having a wide range may be generated, or point cloud content with a high density of points may be acquired.

The point cloud video encoder may encode the input point cloud video into one or more video streams. One video may include a plurality of frames, each of which may correspond to a still image/picture. In this specification, a point cloud video may include a point cloud image/frame/picture. In addition, the term "point cloud video" may be used interchangeably with a point cloud image/frame/picture. The point cloud video encoder may perform a video-based point cloud compression (V-PCC) procedure. The point cloud video encoder may perform a series of procedures such as prediction, transformation, quantization, and entropy coding for compression and encoding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and auxiliary information, which will be described later. The geometry video may include a geometry image, the attribute video may include an attribute image, and the occupancy map video may include an occupancy map image. The auxiliary information may include auxiliary patch information. The attribute video/image may include a texture video/image.

The encapsulation processor (file/segment encapsulation module) 1003 may encapsulate the encoded point cloud video data and/or metadata related to the point cloud video in the form of, for example, a file. Here, the metadata related to the point cloud video may be received from the metadata processor. The metadata processor may be included in the point cloud video encoder or may be configured as a separate component/module. The encapsulation processor may encapsulate the data in a file format such as ISOBMFF or process the same in the form of a DASH segment or the like. According to an embodiment, the encapsulation processor may include the point cloud video-related metadata in the file format. The point cloud video metadata may be included, for example, in boxes at various levels on the ISOBMFF file format or as data in a separate track within the file. According to an embodiment, the encapsulation processor may encapsulate the point cloud video-related metadata into a file. The transmission processor may perform processing for transmission on the point cloud video data encapsulated according to the file format. The transmission processor may be included in the transmitter or may be configured as a separate component/module. The transmission processor may process the point cloud video data according to a transmission protocol. The processing for transmission may include processing for delivery over a broadcast network and processing for delivery through a broadband. According to an embodiment, the transmission processor may receive point cloud video-related metadata from the metadata processor alown with the point cloud video data, and perform processing of the point cloud video data for transmission.

The transmitter 1004 may transmit the encoded video/image information or data that is output in the form of a bitstream to the receiver of the reception device through a digital storage medium or a network in the form of a file or streaming. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoding device.

The receiver 1003 may receive point cloud video data transmitted by the point cloud video transmission device according to the present disclosure. Depending on the transmission channel, the receiver may receive the point cloud video data over a broadcast network or through a broadband. Alternatively, the point cloud video data may be received through a digital storage medium.

The reception processor may process the received point cloud video data according to the transmission protocol. The reception processor may be included in the receiver or may be configured as a separate component/module. The reception processor may reversely perform the above-described process of the transmission processor such that the processing corresponds to the processing for transmission performed at the transmission side. The reception processor may deliver the acquired point cloud video data to the decapsulation processor, and the acquired point cloud video-related metadata to the metadata parser. The point cloud video-related metadata acquired by the reception processor may take the form of a signaling table.

The decapsulation processor (file/segment decapsulation module) 1007 may decapsulate the point cloud video data received in the form of a file from the reception processor. The decapsulation processor may decapsulate the files according to ISOBMFF or the like, and may acquire a point cloud video bitstream or point cloud video-related metadata (a metadata bitstream). The acquired point cloud video bitstream may be delivered to the point cloud video decoder, and the acquired point cloud video-related metadata (metadata bitstream) may be delivered to the metadata processor. The point cloud video bitstream may include the metadata (metadata bitstream). The metadata processor may be included in the point cloud video decoder or may be configured as a separate component/module. The point cloud video-related metadata acquired by the decapsulation processor may take the form of a box or a track in the file format. The decapsulation processor may receive metadata necessary for decapsulation from the metadata processor, when necessary. The point cloud video-related metadata may be delivered to the point cloud video decoder and used in a point cloud video decoding procedure, or may be transferred to the renderer and used in a point cloud video rendering procedure.

The point cloud video decoder may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary information as described below. The geometry video may include a geometry image, and the attribute video may include an attribute image. The occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. A color point cloud image/picture may be reconstructed by assigning color values to the smoothed 3D geometry based on the texture image. The renderer may render the reconstructed geometry and the color point cloud image/picture. The rendered video/image may be displayed through the display. The user may view all or part of the rendered result through a VR/AR display or a typical display.

The feedback process may include transferring various kinds of feedback information that may be acquired in the rendering/displaying process to the transmission side or to the decoder of the reception side. Interactivity may be provided through the feedback process in consuming point cloud video. According to an embodiment, head orientation information, viewport information indicating a region currently viewed by a user, and the like may be delivered to the transmission side in the feedback process. According to an embodiment, the user may interact with things implemented in the VR/AR/MR/autonomous driving environment. In this case, information related to the interaction may be delivered to the transmission side or a service provider during the feedback process. According to an embodiment, the feedback process may be skipped.

The head orientation information may represent information about the location, angle and motion of a user's head. On the basis of this information, information about a region of the point cloud video currently viewed by the user, that is, viewport information, may be calculated.

The viewport information may be information about a region of the point cloud video currently viewed by the user. Gaze analysis may be performed using the viewport information to check the way the user consumes the point cloud video, a region of the point cloud video at which the user gazes, and how long the user gazes at the region. The gaze analysis may be performed at the reception side and the result of the analysis may be delivered to the transmission side on a feedback channel. A device such as a VR/AR/MR display may extract a viewport region based on the location/direction of the user's head, vertical or horizontal FOV supported by the device, and the like.

According to an embodiment, the aforementioned feedback information may not only be delivered to the transmission side, but also be consumed at the reception side. That is, decoding and rendering processes at the reception side may be performed based on the aforementioned feedback information. For example, only the point cloud video for the region currently viewed by the user may be preferentially decoded and rendered based on the head orientation information and/or the viewport information.

Here, the viewport or viewport region may represent a region of the point cloud video currently viewed by th user. A viewpoint is a point which is viewed by the user in the point cloud video and may represent a center point of the viewport region. That is, a viewport is a region around a viewpoint, and the size and form of the region may be determined by the field of view (FOV).

The present disclosure relates to point cloud video compression as described above. For example, the methods/embodiments disclosed in the present disclosure may be applied to the point cloud compression or point cloud coding (PCC) standard of the moving picture experts group (MPEG) or the next generation video/image coding standard.

As used herein, a picture/frame may generally represent a unit representing one image in a specific time interval.

A pixel or a pel may be the smallest unit constituting one picture (or image). Also, "sample" may be used as a term corresponding to a pixel. A sample may generally represent a pixel or a pixel value, or may represent only a pixel/pixel value of a luma component, only a pixel/pixel value of a chroma component, or only a pixel/pixel value of a depth component.

A unit may represent a basic unit of image processing. The unit may include at least one of a specific region of the picture and information related to the region. The unit may be used interchangeably with term such as block or area in some cases. In a general case, an M×N block may include samples (or a sample array) or a set (or array) of transform coefficients configured in M columns and N rows.

Figure 3:
FIG. 3 illustrates an exemplary point cloud, geometry, and texture image according to embodiments.

FIG. 3 illustrates an exemplary point cloud, geometry, and texture image according to embodiments.

According to embodiments, a point cloud may have the same meaning as point cloud data.

In the figure, the left part shows a point cloud, in which an object is positioned in a 3D space and may be represented by a bounding box or the like. The middle part shows the geometry, and the right part shows a texture image (non-padded image).

Video-based point cloud compression (V-PCC) according to embodiments may provide a method of compressing 3D point cloud data based on a 2D video codec such as HEVC or VVC. Data and information that may be generated in the V-PCC compression process are as follows:

Occupancy map: this is a binary map indicating whether there is data at a corresponding position in a 2D plane, using a value of 0 or 1 in dividing the points constituting a point cloud into patches and mapping the same to the 2D plane.

Patch: is a set of points constituting a point cloud, which indicates that points belonging to the same patch are adjacent to each other in 3D space and are mapped in the same direction among 6-face bounding box planes in the process of mapping to a 2D image.

Geometry image: this is an image in the form of a depth map that presents position information (geometry) about each point constituting a point cloud on a patch-by-patch basis. The geometry image may be composed of pixel values of one channel.

Texture image: this is an image representing the color information about each point constituting a point cloud on a patch-by-patch basis. A texture image may be composed of pixel values of a plurality of channels (e.g., three channels of R, G, and B). The texture is included in an attribute. According to embodiments, a texture and/or attribute may be interpreted as the same object and/or having an inclusive relationship.

Auxiliary patch info: this indicates metadata needed to reconstruct a point cloud with individual patches. Auxiliary patch info may include information about the position, size, and the like of a patch in a 2D/3D space.

The point cloud data according to the embodiments represents PCC data according to video-based point cloud compression (V-PCC). The point cloud data may include a plurality of components. For example, it may include an occupancy map, a patch, a geometry and/or a texture.

Figure 4:
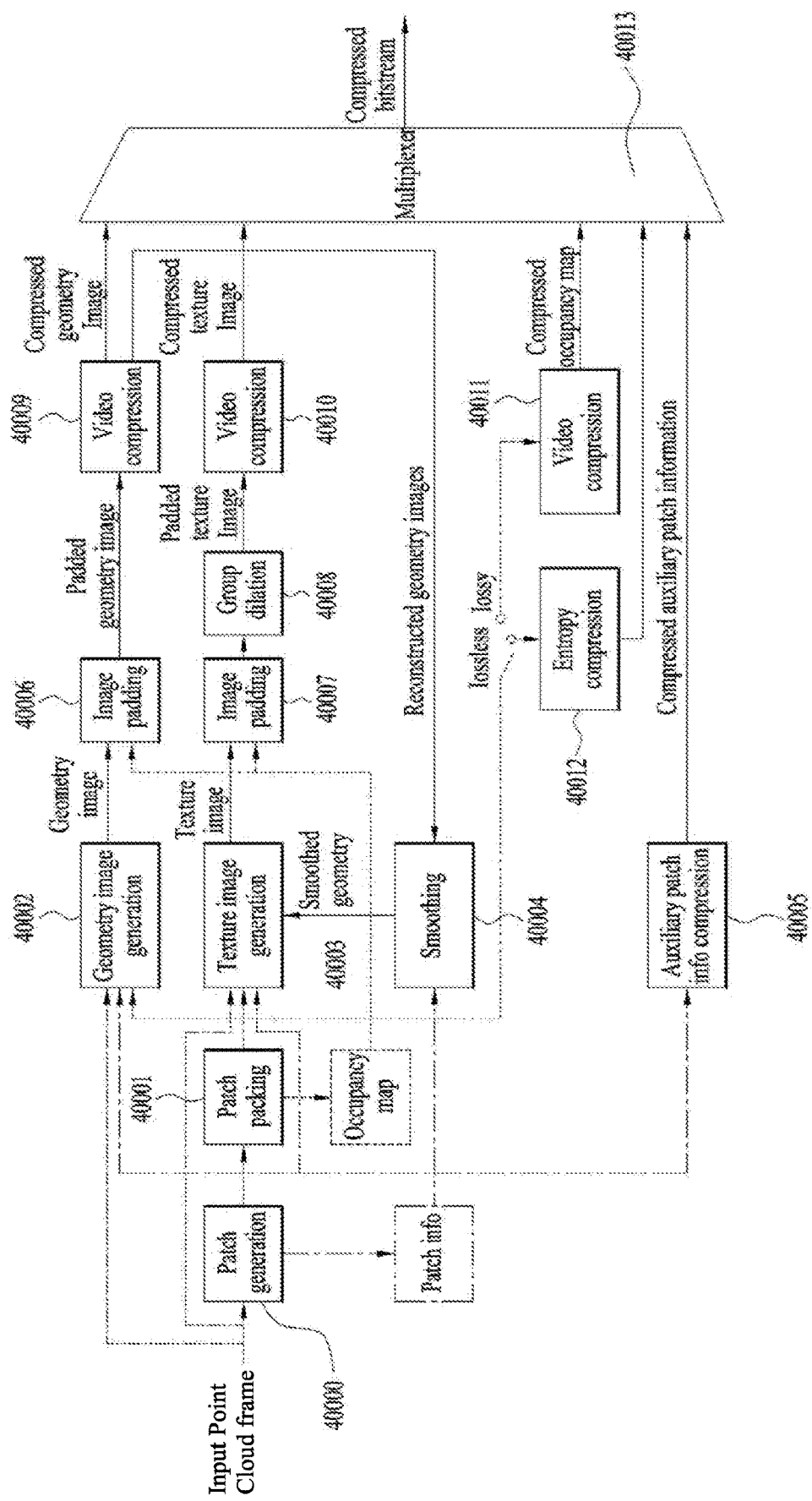
FIG. 4 illustrates an exemplary V-PCC encoding process according to embodiments.

FIG. 4 illustrates a V-PCC encoding process according to embodiments.

The figure illustrates a V-PCC encoding process for generating and compressing an occupancy map, a geometry image, a texture image, and auxiliary patch information.

A patch generator (patch generation) 40000, a point cloud frame (which may be in the form of a bitstream containing point cloud data) is received. The patch generator 40000 generates a patch from the point cloud data. In addition, patch information including information about patch generation is generated.

In patch packing 40001, patches for point cloud data are packed. For example, one or more patches may be packed. In addition, an occupancy map map containing information about patch packing is generated.

In geometry image generation 40002, a geometry image is generated based on the point cloud data, patches, and/or packed patches. The geometry image refers to data containing geometry related to the point cloud data.

In texture image generation 40003, a texture image is generated based on the point cloud data, patches, and/or packed patches. In addition, the texture image may be generated further based on smoothed geometry generated by smoothing processing of smoothing based on the patch information.

In smoothing 40004, errors contained in the image data may be mitigated or eliminated. For example, based on the patched reconstructed geometry image, portions that may cause errors between data may be smoothly filtered out to generate smoothed geometry.

In auxillary patch info compression 40005, auxiliary patch information related to the patch information generated in the patch generation is compressed. In addition, the compressed auxiliary patch information may be transmitted to the multiplexer. The auxiliary patch information may be used in the geometry image generation 40002.

In image padding operations 40006 and 40007, the geometry image and the texture image may be padded, respectively.

In group dilation 40008, data may be added to the texture image in a similar manner to image padding.

In video compression operations 40009, 40010, and 40011, the padded geometry image, the padded texture image, and/or the occupancy map may be compressed, respectively.

In entropy compression 40012, the occupancy map may be compressed based on an entropy scheme.

According to embodiments, the entropy compression and/or video compression may be performed, respectively depending on whether the point cloud data is lossless and/or lossy.

A multiplexer 40013 multiplexes the compressed geometry image, the compressed texture image, and the compressed occupancy map into a bitstream.

The operations in the respective processes are described in detail below.

Patch Generation

The patch generation process refers to a process of dividing a point cloud into patches, which are mapping units, in order to map the point cloud to the 2D image. The patch generation process may be divided into three steps: normal value calculation, segmentation, and patch segmentation.

The normal value calculation process will be described in detail with reference to FIG. 5.

Figure 5:
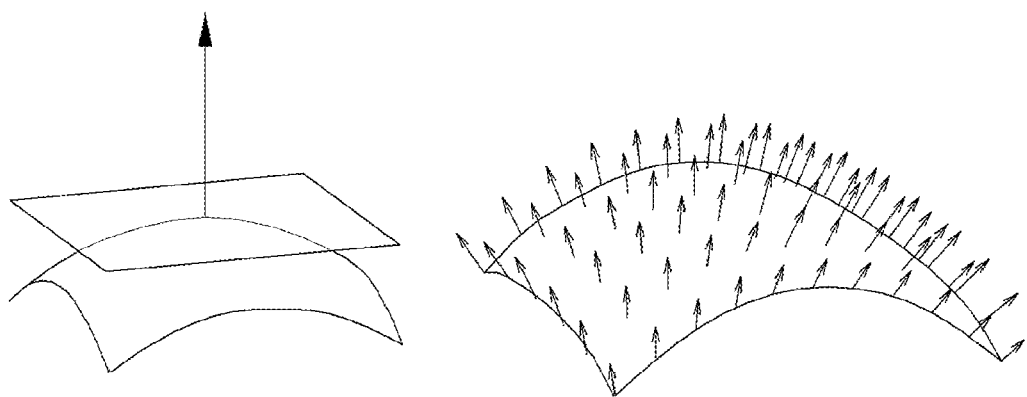
FIG. 5 illustrates an example of a tangent plane and a normal vector of a surface according to embodiments.

FIG. 5 illustrates an example of a tangent plane and a normal vector of a surface according to embodiments.

Normal Calculation

Each point of a point cloud has its own direction, which is represented by a 3D vector called a normal vector. Using the neighbors of each point obtained using a K-D tree or the like, a tangent plane and a normal vector of each point constituting the surface of the point cloud as shown in the figure may be obtained. The search range applied to the process of searching for neighbors may be defined by the user.

The tangent plane refers to a plane that passes through a point on the surface and completely includes a tangent line to the curve on the surface.

Figure 6:
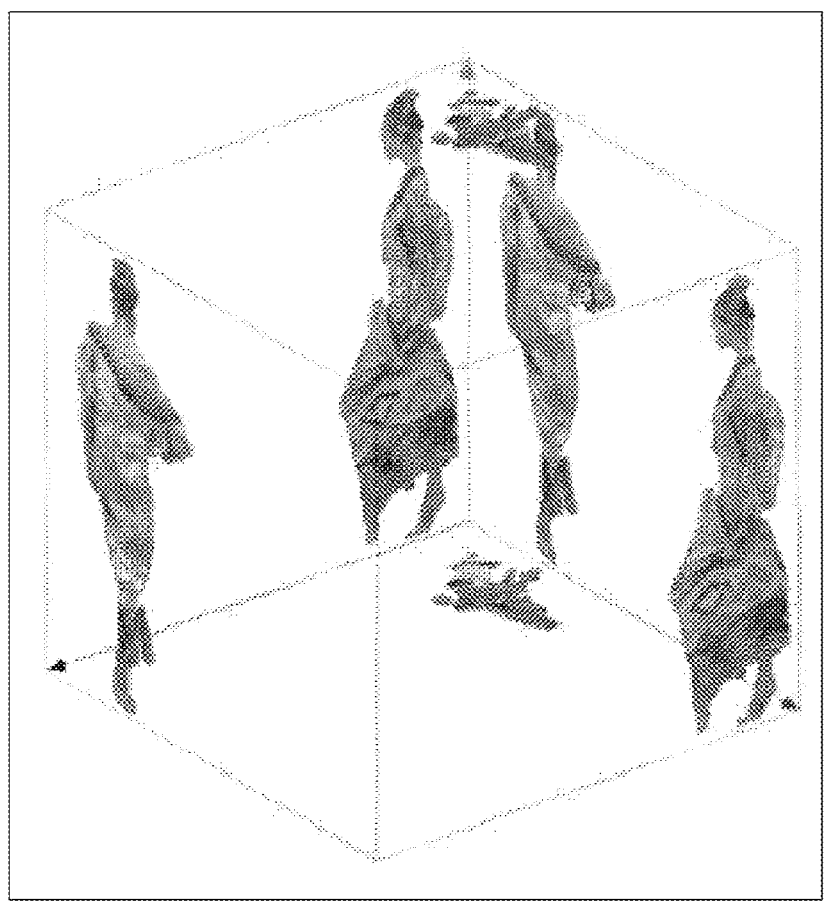
FIG. 6 illustrates an exemplary bounding box of a point cloud according to embodiments.

FIG. 6 illustrates an exemplary bounding box of a point cloud according to embodiments.

A method/device according to embodiments, for example, patch generation, may employ a bounding box in generating a patch from point cloud data.

The bounding box may be used in projecting a target object of the point cloud data onto a plane of each planar face of a hexahedron in a 3D space.

Segmentation

Segmentation is divided into two processes: initial segmentation and refine segmentation.

Each point constituting a point cloud is projected onto one of the six faces of a bounding box surrounding the point cloud as shown in the figure. Initial segmentation is a process of determining one of the planar faces of the bounding box onto which each point is to be projected.

$\vec{n}_{pidx}$, which is a normal value corresponding to each of the six planar faces, is defined as follows:

(1.0, 0.0, 0.0), (0.0, 1.0, 0.0), (0.0, 0.0, 1.0), (−1.0, 0.0, 0.0), (0.0, −1.0, 0.0), (0.0, 0.0, −1.0).

As shown in the equation below, a face that yields the maximum value of dot product of the normal vector $\vec{n}_{pi}$ of each point obtained in the normal value calculation process and $n'_{p_{idx}}$ is determined as a projection plane of the corresponding point. That is, a plane whose normal vector is most similar to the direction of the normal vector of a point is determined as the projection plane of the point.

$$\max_{Pidx}\{\vec{n}_{pi} \cdot \vec{n}_{pidx}\}$$

The determined plane may be identified by one cluster index, which is one of 0 to 5.

Refine segmentation is a process of enhancing the projection plane of each point constituting the point cloud determined in the initial segmentation process in consideration of the projection planes of neighboring points. In this process, a score normal, which represents the degree of similarity between the normal vector of each point and the normal of each planar face of the bounding box which are considered in determining the projection plane in the initial segmentation process, and score smooth, which indicates the degree of similarity between the projection plane of the current point and the projection planes of neighboring points, may be considered together.

Score smooth may be considered by assigning a weight to the score normal. In this case, the weight value may be defined by the user. The refine segmentation may be performed repeatedly, and the number of repetitions may also be defined by the user.

Patch Segmentation

Patch segmentation is a process of dividing the entire point cloud into patches, which are sets of neighboring points, based on the projection plane information about each point constituting the point cloud obtained in the initial/refine segmentation process. The patch segmentation may include the following steps:

1) Calculate neighboring points of each point constituting the point cloud, using the K-D tree or the like. The maximum number of neighbors may be defined by the user;

2) When the neighboring points are projected onto the same plane as the current point (when they have the same cluster index), extract the current point and the neighboring points as one patch;

3) Calculate geometry values of the extracted patch. The details are described in section 1.3; and 4) Repeat operations 2) to 4) until there is no unextracted point.

The occupancy map, geometry image and texture image for each patch as well as the size of each patch are determined through the patch segmentation process.

Figure 7:
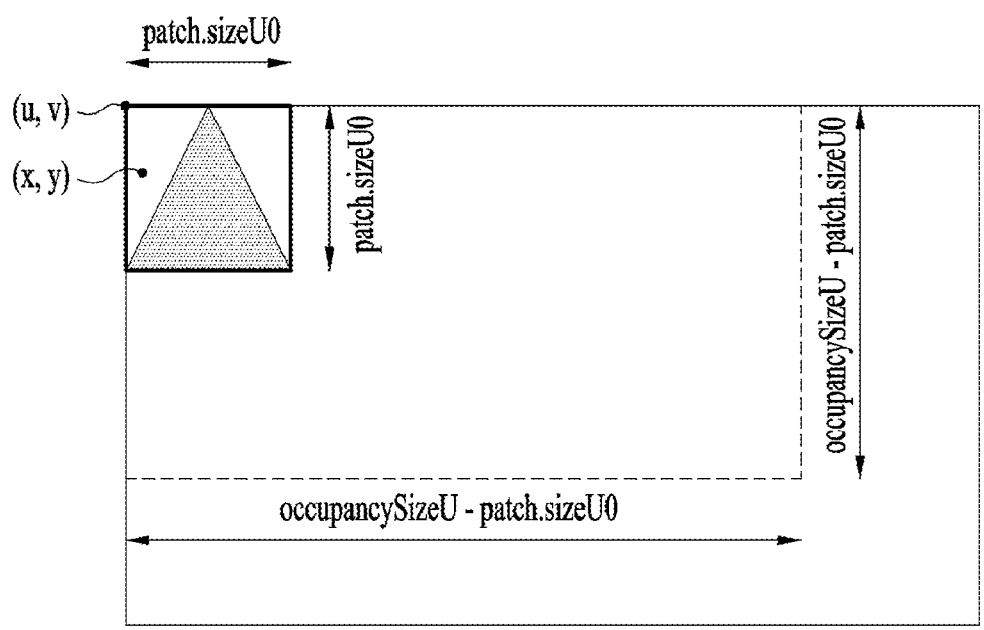
FIG. 7 illustrates an example of determination of individual patch positions on an occupancy map according to embodiments.

FIG. 7 illustrates an example of determination of individual patch positions on an occupancy map according to embodiments.

Patch Packing & Occupancy Map Generation

This is a process of determining the positions of individual patches in a 2D image to map the segmented patches to the 2D image. The occupancy map, which is a kind of 2D image, is a binary map that indicates whether there is data at a corresponding position, using a value of 0 or 1. The occupancy map is composed of blocks and the resolution thereof may be determined by the size of the block. For example, when the block is 1*1 block, a pixel-level resolution is obtained. The occupancy packing block size may be determined by the user.

The process of determining the positions of individual patches on the occupancy map may be configured as follows:

1) Set all positions on the occupancy map to 0;

2) Place a patch at a point (u, v) having a horizontal coordinate within the range of (0, occupancySizeU−patch.sizeU0) and a vertical coordinate within the range of (0, occupancySizeV−patch.sizeV0) in the occupancy map plane;

3) Set a point (x, y) having a horizontal coordinate within the range of (0, patch.sizeU0) and a vertical coordinate within the range of (0, patch.sizeV0) in the patch plane as a current point;

4) Change the position of point (x, y) in raster order and repeat operations 3) and 4) if the value of coordinate (x, y) on the patch occupancy map is 1 (there is data at the point in the patch) and the value of coordinate (u+x, v+y) on the global occupancy map is 1 (the occupancy map is filled with the previous patch). Otherwise, proceed to operation 6);

5) Change the position of (u, v) in raster order and repeat operations 3) to 5);

6) Determine (u, v) as the position of the patch and copy the occupancy map data about the patch onto the corresponding portion on the global occupancy map; and 7) Repeat operations 2) to 7) for the next patch.

occupancySizeU: indicates the width of the occupancy map. The unit thereof is occupancy packing block size.

occupancySizeV: indicates the height of the occupancy map. The unit thereof is occupancy packing block size.

patch.sizeU0: indicates the width of the occupancy map. The unit thereof is occupancy packing block size.

patch.sizeV0: indicates the height of the occupancy map. The unit thereof is occupancy packing block size.

Figure 8:
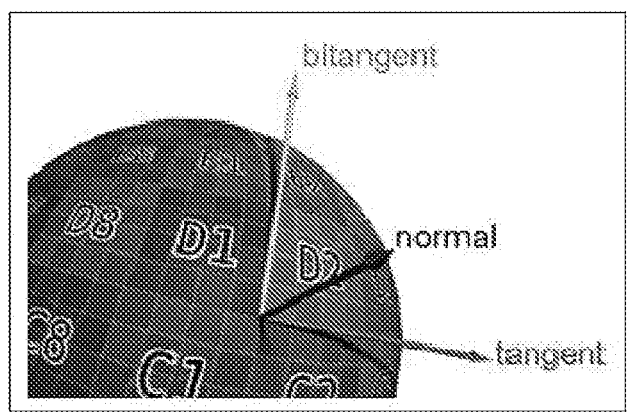
FIG. 8 shows an exemplary relationship among normal, tangent, and bitangent axes according to embodiments.

FIG. 8 shows an exemplary relationship among normal, tangent, and bitangent axes according to embodiments.

Geometry Image Generation

In this process, the depth values constituting the geometry images of individual patches are determined, and the entire geometry image is generated based on the positions of the patches determined in the patch packing process described above. The process of determining the depth values constituting the geometry images of individual patches may be configured as follows.

1) Calculate parameters related to the position and size of an individual patch. The parameters may include the following information.

A normal index indicating the normal axis is obtained in the previous patch generation process. The tangent axis is an axis coincident with the horizontal axis u of the patch image among the axes perpendicular to the normal axis, and the bitangent axis is an axis coincident with the vertical axis v of the patch image among the axes perpendicular to the normal axis. The three axes may be expressed as shown in the figure.

Figure 9:
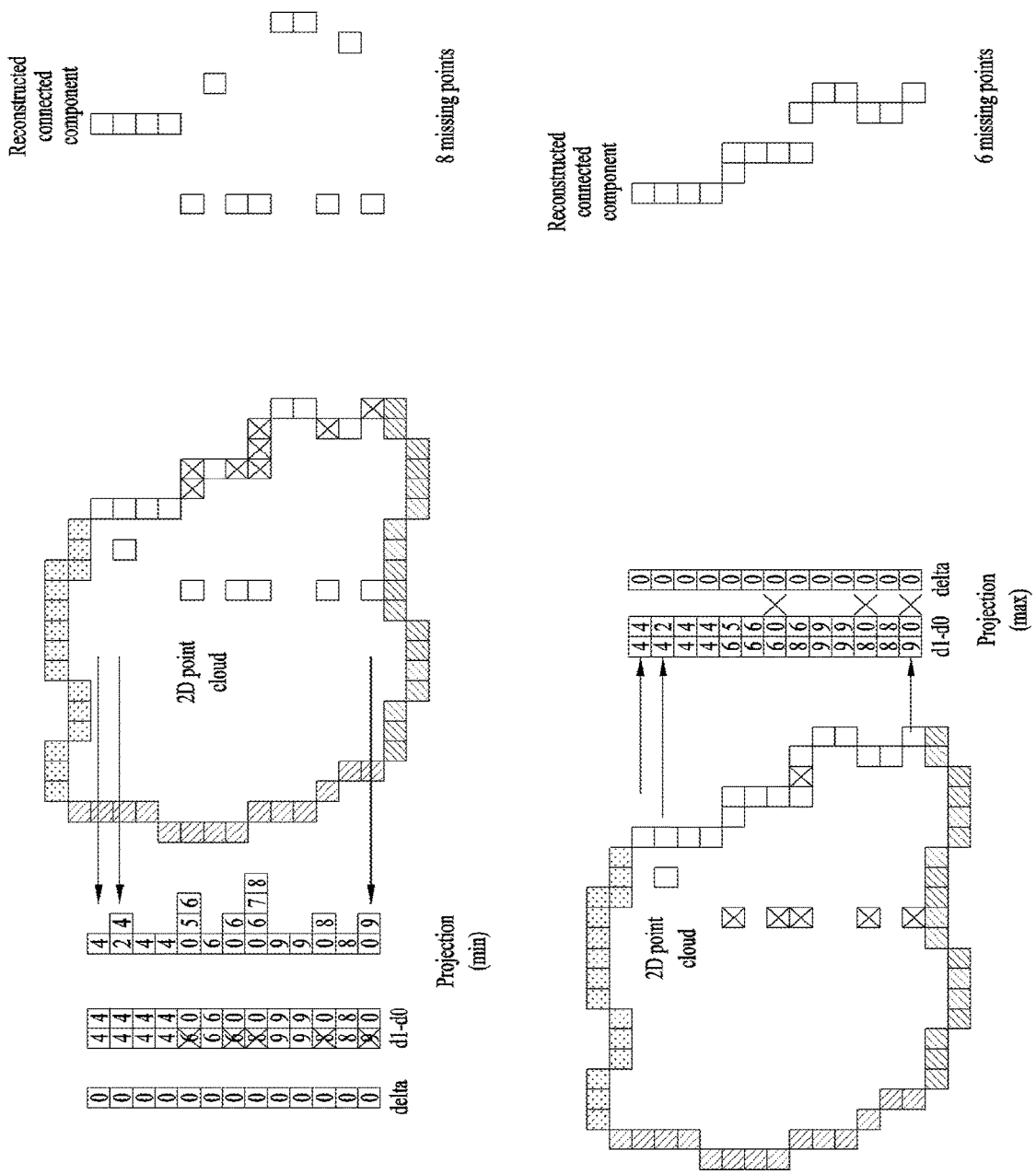
FIG. 9 shows an exemplary configuration of the minimum mode and maximum mode of a projection mode according to embodiments.

FIG. 9 shows an exemplary configuration of the minimum mode and maximum mode of a projection mode according to embodiments.

3D spatial coordinates of a patch may be calculated based on the bounding box of the minimum size surrounding the patch. The 3D spatial coordinates may include the minimum tangent value of the patch (on the patch 3d shift tangent axis) of the patch, the minimum bitangent value of the patch (on the patch 3d shift bitangent axis), and the minimum normal value of the patch (on the patch 3d shift normal axis).

2D size of a patch indicates the horizontal and vertical sizes of the patch when the patch is packed into a 2D image. The horizontal size (patch 2d size u) may be obtained as a difference between the maximum and minimum tangent values of the bounding box, and the vertical size (patch 2d size v) may be obtained as a difference between the maximum and minimum bitangent values of the bounding box.

2) Determine a projection mode of the patch. The projection mode may be either the min mode or the max mode. The geometry information about the patch is expressed with a depth value. When each point constituting the patch is projected in the normal direction of the patch, two layers of images, an image constructed with the maximum depth value and an image constructed with the minimum depth value, may be generated.

In the min mode, in generating the two layers of images d0 and d1, the minimum depth may be configured for d0, and the maximum depth within the surface thickness from the minimum depth may be configured for d1, as shown in the figure. In the max mode, the maximum depth may be configured for d0, and the minimum depth within the surface thickness from the maximum depth may be configured for d1, as shown in the FIG. 6

The same projection mode may be applied to all point clouds or different projection modes may be applied to respective frames or patches according to user definition. When different projection modes are applied to the respective frames or patches, a projection mode that may enhance compression efficiency or minimize missed points may be adaptively selected.

3) Calculate the depth values of the individual points. In the min mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the minimum normal value of each point. If there is another depth value within the range between depth0 and the surface thickness at the same position, this value is set to depth1. Otherwise, the value of depth0 is assigned to depth1. Image d1 is constructed with the value of depth1.

In the max mode, image d0 is constructed with depth0, which is a value obtained by subtracting the minimum normal value of the patch (on the patch 3d shift normal axis) calculated in operation 1) from the minimum normal value of the patch (on the patch 3d shift normal axis) for the maximum normal value of each point. If there is another depth value within the range between depth0 and the surface thickness at the same position, this value is set to depth1. Otherwise, the value of depth0 is assigned to depth1. Image d1 is constructed with the value of depth1.

The entire geometry image may be generated by placing the geometry images of the individual patches generated through the above-described processes onto the entire geometry image based on the patch position information determined in the patch packing process.

Layer d1 of the generated entire geometry image may be encoded using various methods. A first method (absolute d1 method) is to encode the depth values of the previously generated image d1. A second method (differential method) is to encode a difference between the depth values of previously generated image d1 and the depth values of image d0.

In the encoding method using the depth values of the two layers, d0 and d1 as described above, if there is another point between the two depths, the geometry information about the point is lost in the encoding process, and therefore an enhanced-delta-depth (EDD) code may be used for lossless coding.

Hereinafter, the EDD code will be described in detail with reference to FIG. 10.

Figure 10:
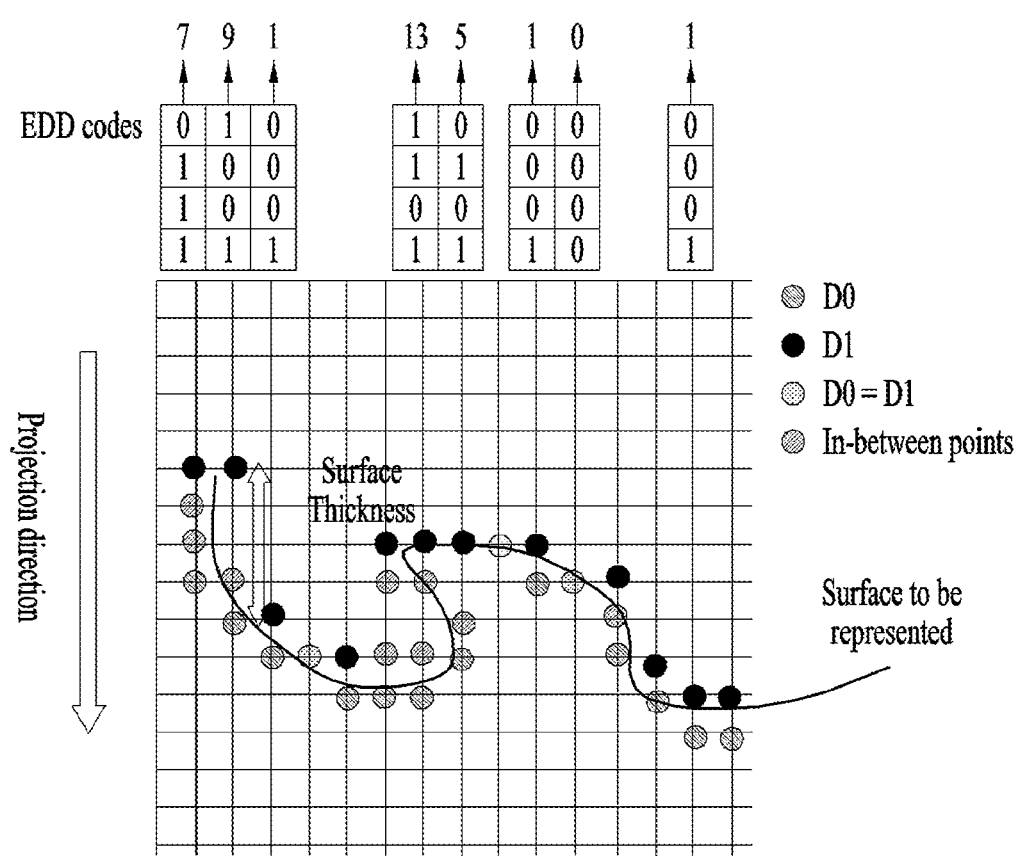
FIG. 10 illustrates an exemplary EDD code according to embodiments.

FIG. 10 illustrates an exemplaryn EDD code according to embodiments.

As shown in the figure, the EDD code is used for binary encoding of the positions of all points within the range of surface thickness including d1. For example, in the figure, the points included in the second left column may be represented by an EDD code of 0b1001 (=9) because the points are present at the first and fourth positions over DO and the second and third positions are empty. When the EDD code is encoded together with DO and transmitted, a reception terminal may restore the geometry information about all points without loss.

Smoothing

Smoothing is a process for eliminating discontinuity that may occur on the patch boundary due to deterioration of the image quality occurring during the compression process. Smoothing may be performed through the following operations:

1) Reconstruct the point cloud from the geometry image. This operation may be the reverse of the geometry image generation described above;

2) Calculate neighboring points of each point constituting the reconstructed point cloud using the K-D tree or the like;

3) Determine whether each of the points is positioned on the patch boundary. For example, when there is a neighboring point having a different projection plane (cluster index) from the current point, it may be determined that the point is positioned on the patch boundary;

4) If there is a point present on the patch boundary, move the point to the center of mass of the neighboring points (positioned at the average x, y, z coordinates of the neighboring points). That is, change the geometry value. Otherwise, maintain the previous geometry value.

Figure 11:
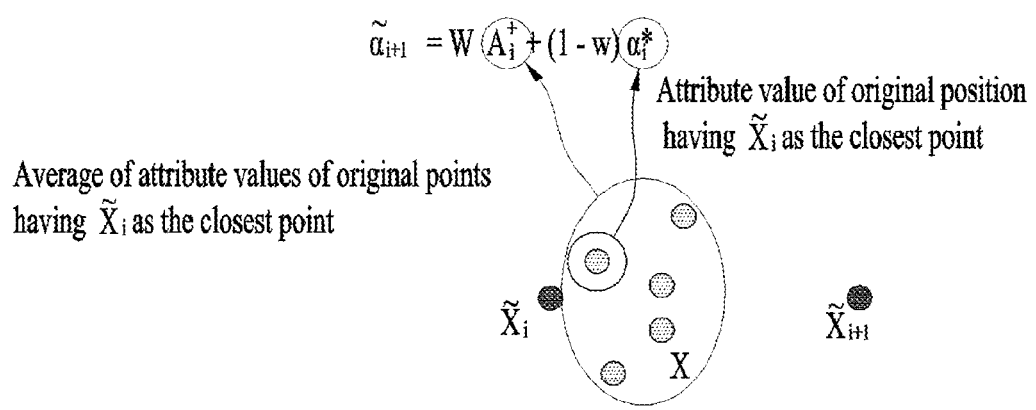
FIG. 11 illustrates an example of recoloring based on color values of neighboring points according to embodiments.

FIG. 11 illustrates an example of recoloring based on color values of neighboring points according to embodiments.

Texture Image Generation

The texture image generation process, which is similar to the geometry image generation process described above, includes generating texture images of individual patches and generating an entire texture image by arranging the texture images at determined positions. However, in the operation of generating texture images of individual patches, an image with color values (e.g., R, G, and B values) of the points constituting a point cloud corresponding to a position is generated in place of the depth values for geometry generation.

In estimating a color value of each point constituting the point cloud, the geometry previously obtained through the smoothing process may be used. In the smoothed point cloud, the positions of some points may have been shifted from the original point cloud, and accordingly a recoloring process of finding colors suitable for the changed positions may be required. Recoloring may be performed using the color values of neighboring points. For example, as shown in the figure, a new color value may be calculated in consideration of the color value of the nearest neighboring point and the color values of the neighboring points.

Texture images may also be generated in two layers of t0 and t1, like the geometry images generated in two layers of d0 and d1.

Auxiliary Patch Info Compression

In this process, the auxiliary patch information generated in the patch generation, patch packing, and geometry generation processes described above is compressed. The auxiliary patch information may include the following parameters:

Index (cluster index) for identifying the projection plane (normal plane);

3D spatial position of a patch, i.e., the minimum tangent value of the patch (on the patch 3d shift tangent axis), the minimum bitangent value of the patch (on the patch 3d shift bitangent axis), and the minimum normal value of the patch (on the patch 3d shift normal axis);

2D spatial position and size of the patch, i.e., the horizontal size (patch 2d size u), the vertical size (patch 2d size v), the minimum horizontal value (patch 2d shift u), and the minimum vertical value (patch 2d shift u); and Mapping information about each block and patch, i.e., a candidate index (when patches are disposed in order based on the 2D spatial position and size information about the patches, multiple patches may be mapped to one block in an overlapping manner. In this case, the mapped patches constitute a candidate list, and the candidate index indicates the position in sequential order of a patch whose data is present in the block), and a local patch index (which is an index indicating one of the patches present in the frame). Following Table shows a pseudo code representing the process of matching between blocks and patches based on the candidate list and the local patch indexes.

The maximum number of candidate lists may be defined by a user.

TABLE 1-1

Pseudo code for mapping a block to a patch

```
for( i = 0; i < BlockCount; i++) {
  if( candidatePatches[ i ].size( ) = = 1 ) {
    blockToPatch[ i ] = candidatePatches[ i ][ 0 ]
  } else {
    candidate_index
    if( candidate_index = = max_candidate_count ) {
      blockToPatch[ i ] = local_patch_index
    } else {
      blockToPatch[ i ] = candidatePatches[ i ][ candidate_index ]
    }
  }
}
```

Figure 12:
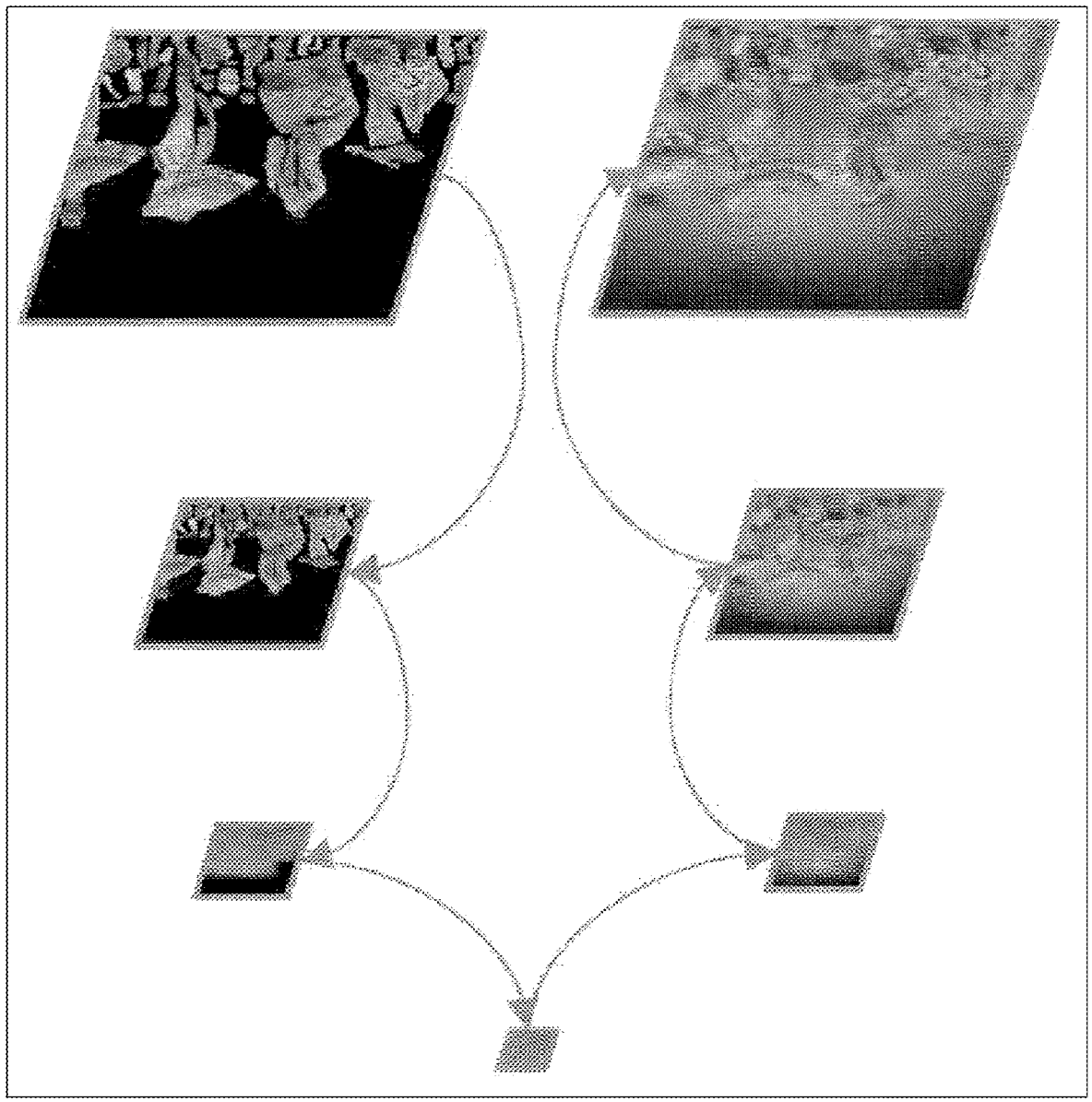
FIG. 12 illustrates an example of push-pull background filling according to embodiments.

FIG. 12 illustrates push-pull background filling according to embodiments.

Image Padding and Group Dilation

Image padding is a process of filling the space other than the patch region with meaningless data to improve compression efficiency. For image padding, pixel values in columns or rows close to a boundary in the patch may be copied to fill the empty space. Alternatively, as shown in the figure, a push-pull background filling method may be used.

According to this method, the empty space is filled with pixel values from a low resolution image in the process of gradually reducing the resolution of a non-padded image and increasing the resolution again.

Group dilation is a process of filling the empty spaces of a geometry image and a texture image configured in two layers, d0/d1 and t0/t1, respectively. In this process, the empty spaces of the two layers calculated through image padding are filled with the average of the values for the same position.

Figure 13:
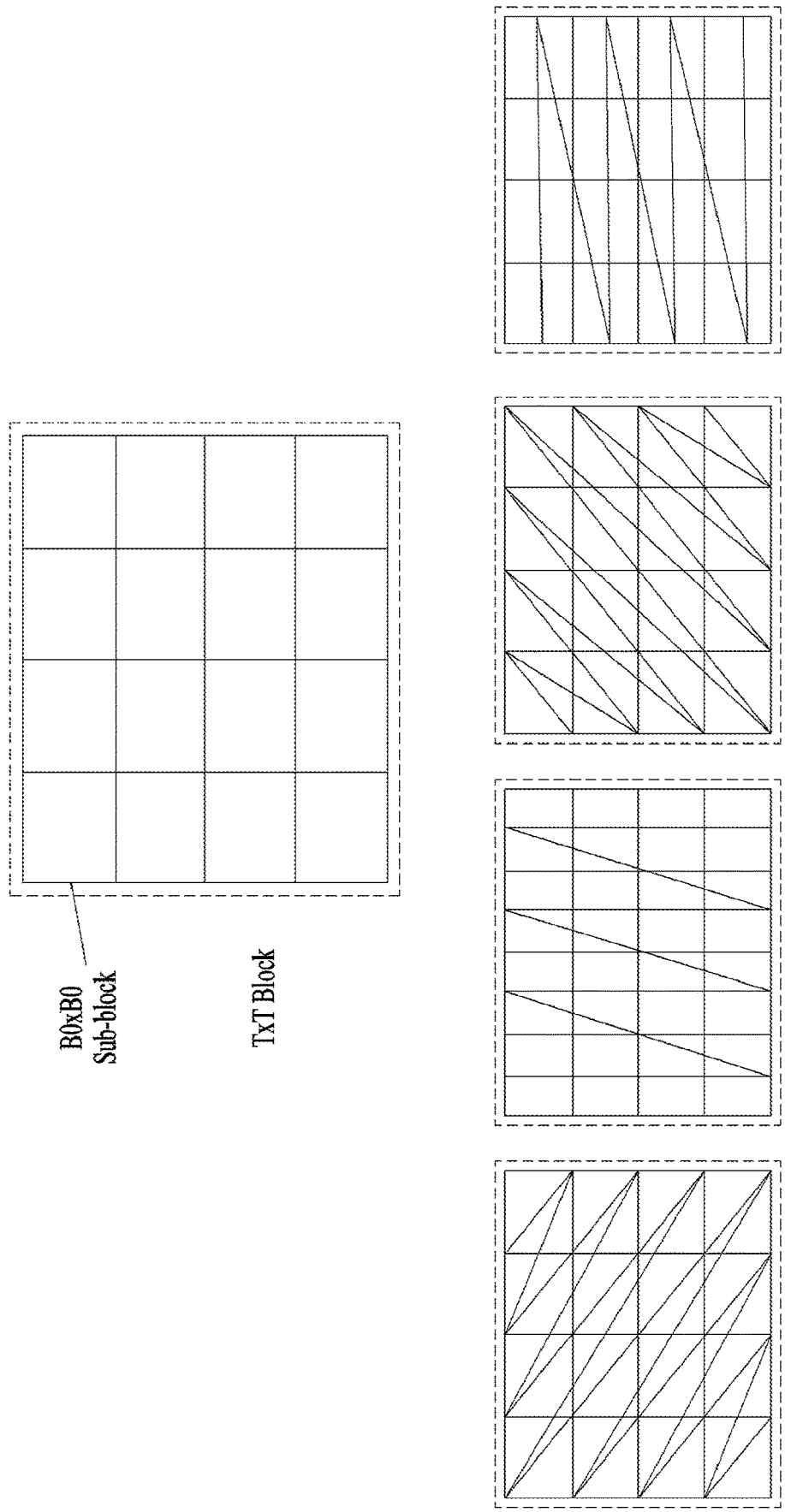
FIG. 13 shows an exemplary possible traversal order for a 4*4 block according to embodiments.

FIG. 13 shows an exemplary possible traversal order for a 4*4 block according to embodiments.

Occupancy Map Compression

Occupancy map compression is a process of compressing the generated occupancy map and may include two methods: video compression for lossy compression and entropy compression for lossless compression. Video compression is described below.

The entropy compression may be performed through the following operations.

1) If a block constituting an occupancy map is fully occupied, encode 1 and repeat the same operation for the next block of the occupancy map. Otherwise, encode 0 and perform operations 2) to 5).

2) Determine the best traversal order to perform run-length coding on the occupied pixels of the block. The figure shows four possible traversal orders for a 4*4 block.

Figure 14:
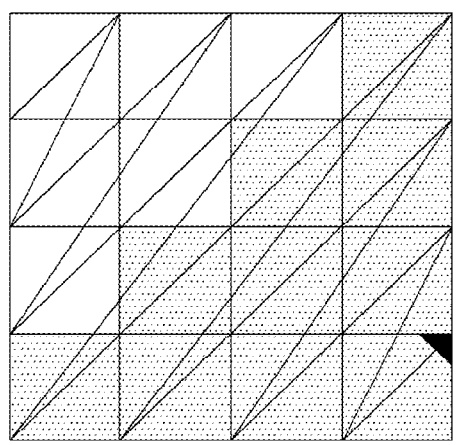
FIG. 14 illustrates an exemplary best traversal order according to embodiments.

FIG. 14 illustrates an exemplary best traversal order according to embodiments.

The best traversal order with the minimum number of runs is selected from among the possible traversal orders and the index thereof is encoded. The figure illustrates a case where the third traversal order in FIG. 13 is selected. In the illustrated case, the number of runs may be minimized to 2, and therefore the third traversal order may be selected as the best traversal order.

3) Encode the number of runs. In the example of FIG. 14, there are two runs, and therefore 2 is encoded.

4) Encode the occupancy of the first run. In the example of FIG. 14, 0 is encoded because the first run corresponds to unoccupied pixels.

5) Encode lengths of the individual runs (as many as the number of runs). In the example of FIG. 14, the lengths of the first run and the second run, 6 and 10, are sequentially encoded.

Video Compression

This is an operation of encoding a sequence of a geometry image, a texture image, an occupancy map image, and the like generated in the above-described operations using a 2D video codec such as HEVC or VVC.

Figure 15:
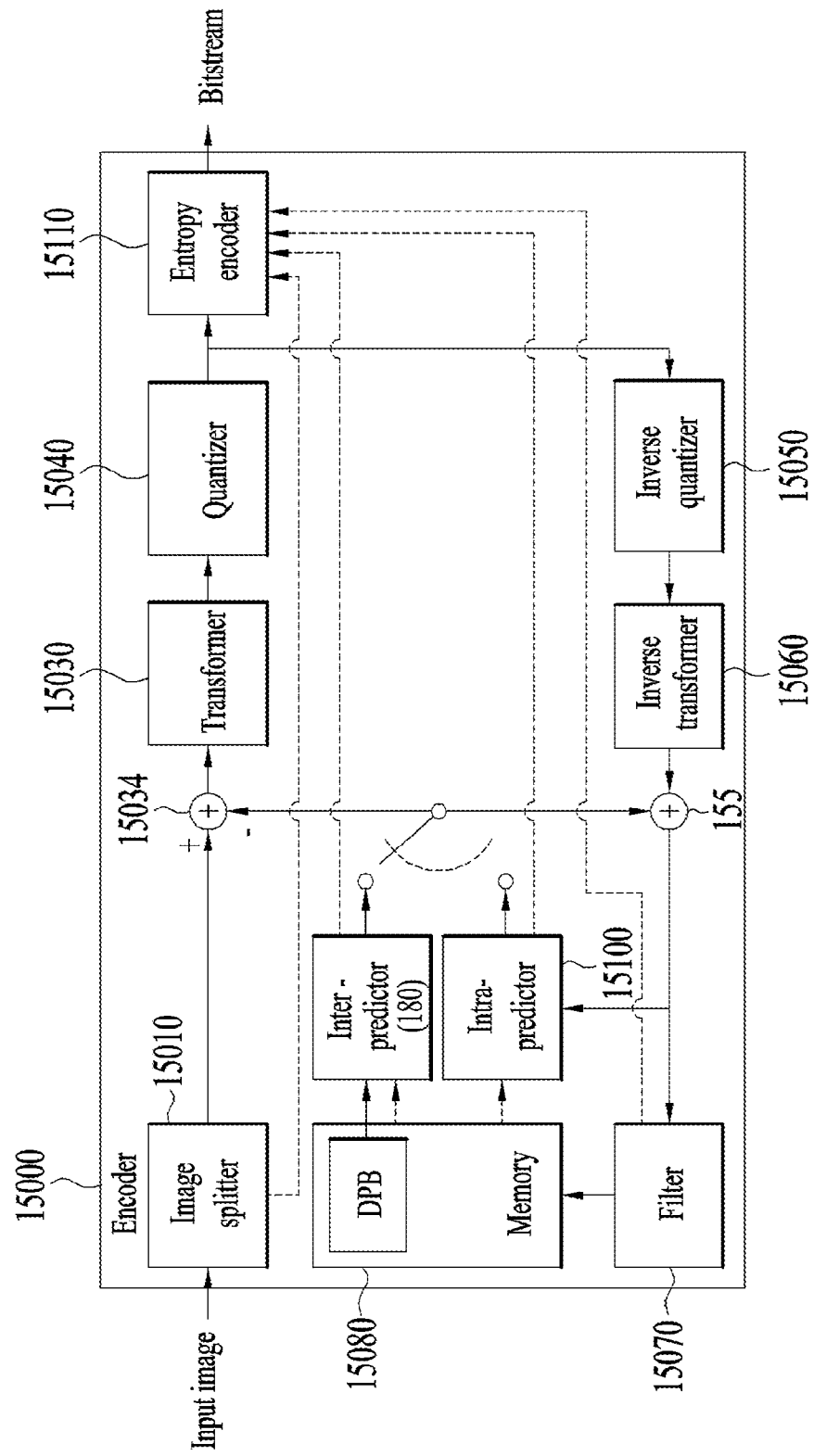
FIG. 15 illustrates an exemplary 2D video/image encoder according to embodiments.

FIG. 15 illustrates an exemplary 2D video/image encoder according to embodiments.

The figure, which represents an embodiment to which video compression 40009, 40010, and 40011 described above is applied, is a schematic block diagram of a 2D video/image encoder 15000 configured to encode a video/image signal. The 2D video/image encoder 15000 may be included in the point cloud video encoder described above or may be configured as an internal/external component. Here, the input image may include the geometry image, the texture image (attribute(s) image), and the occupancy map image described above. The output bitstream (i.e., the point cloud video/image bitstream) of the point cloud video encoder may include output bitstreams for the respective input images (i.e., the geometry image, the texture image (attribute(s) image), the occupancy map image, etc.).

An inter-predictor 15090 and an intra-predictor 15100 may be collectively called a predictor. That is, the predictor may include the inter-predictor 15090 and the intra-predictor 15100. A transformer 15030, a quantizer 15040, an inverse quantizer 15050, and an inverse transformer 15060 may be included in the residual processor. The residual processor may further include a subtractor 15020. According to an embodiment, the image splitter 15010, the subtractor 15020, the transformer 15030, the quantizer 15040, the inverse quantizer 15050, the inverse transformer 15060, the adder 155, the filter 15070, the inter-predictor 15090, the intra-predictor 15100, and the entropy encoder 15110 described above may be configured by one hardware component (e.g., an encoder or a processor). In addition, the memory 15080 may include a decoded picture buffer (DPB) and may be configured by a digital storage medium.

The image splitter 15010 may spit an image (or a picture or a frame) input to the encoder 15000 into one or more processing units. For example, the processing unit may be called a coding unit (CU). In this case, the CU may be recursively split from a coding tree unit (CTU) or a largest coding unit (LCU) according to a quad-tree binary-tree (QTBT) structure. For example, one CU may be split into a plurality of CUs of a lower depth based on a quad-tree structure and/or a binary-tree structure. In this case, for example, the quad-tree structure may be applied first and the binary-tree structure may be applied later. Alternatively, the binary-tree structure may be applied first. The coding procedure according to the present disclosure may be performed based on a final CU that is not split anymore. In this case, the LCU may be used as the final CU based on coding efficiency according to characteristics of the image. When necessary, a CU may be recursively split into CUs of a lower depth, and a CU of the optimum size may be used as the final CU. Here, the coding procedure may include prediction, transformation, and reconstruction, which will be described later. As another example, the processing unit may further include a prediction unit (PU) or a transform unit (TU). In this case, the PU and the TU may be split or partitioned from the aforementioned final CU. The PU may be a unit of sample prediction, and the TU may be a unit for deriving a transform coefficient and/or a unit for deriving a residual signal from the transform coefficient.

The term "unit" may be used interchangeably with terms such as block or area. In a general case, an M×N block may represent a set of samples or transform coefficients configured in M columns and N rows. A sample may generally represent a pixel or a value of a pixel, and may indicate only a pixel/pixel value of a luma component, or only a pixel/pixel value of a chroma component. "Sample" may be used as a term corresponding to a pixel or a pel in one picture (or image).

The encoder 15000 may generate a residual signal (residual block or residual sample array) by subtracting a prediction signal (predicted block or predicted sample array) output from the inter-predictor 15090 or the intra-predictor 15100 from an input image signal (original block or original sample array), and the generated residual signal is transmitted to the transformer 15030. In this case, as shown in the figure, the unit that subtracts the prediction signal (predicted block or predicted sample array) from the input image signal (original block or original sample array) in the encoder 15000 may be called a subtractor 15020. The predictor may perform prediction for a processing target block (hereinafter referred to as a current block) and generate a predicted block including prediction samples for the current block. The predictor may determine whether intra-prediction or inter-prediction is applied on a current block or CU basis. As will described later in the description of each prediction mode, the predictor may generate various kinds of information about prediction, such as prediction mode information, and deliver the generated information to the entropy encoder 15110. The information about the prediction may be encoded and output in the form of a bitstream by the entropy encoder 15110.

The intra-predictor 15100 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The non-directional modes may include, for example, a DC mode and a planar mode. The directional modes may include, for example, 33 directional prediction modes or 65 directional prediction modes according to fineness of the prediction directions. However, this is merely an example, and more or fewer directional prediction modes may be used depending on the setting. The intra-predictor 15100 may determine a prediction mode to be applied to the current block, based on the prediction mode applied to the neighboring block.

The inter-predictor 15090 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. The reference picture including the reference block may be the same as or different from the reference picture including the temporal neighboring block. The temporal neighboring block may be referred to as a collocated reference block or a collocated CU (colCU), and the reference picture including the temporal neighboring block may be referred to as a collocated picture (colPic). For example, the inter-predictor 15090 may configure a motion information candidate list based on the neighboring blocks and generate information indicating a candidate to be used to derive a motion vector and/or a reference picture index of the current block. Inter-prediction may be performed based on various prediction modes. For example, in a skip mode and a merge mode, the inter-predictor 15090 may use motion information about a neighboring block as motion information about the current block. In the skip mode, unlike the merge mode, the residual signal may not be transmitted. In a motion vector prediction (MVP) mode, the motion vector of a neighboring block may be used as a motion vector predictor and the motion vector difference may be signaled to indicate the motion vector of the current block.

The prediction signal generated by the inter-predictor 15090 or the intra-predictor 15100 may be used to generate a reconstruction signal or to generate a residual signal.

The transformer 15030 may generate transform coefficients by applying a transformation technique to the residual signal. For example, the transformation technique may include at least one of discrete cosine transform (DCT), discrete sine transform (DST), Karhunen-Loève transform (KLT), graph-based transform (GBT), or conditionally non-linear transform (CNT). Here, the GBT refers to transformation obtained from a graph depicting the relationship between pixels. The CNT refers to transformation obtained based on a prediction signal generated based on all previously reconstructed pixels. In addition, the transformation operation may be applied to pixel blocks having the same size of a square, or may be applied to blocks of a variable size other than the square.

The quantizer 15040 may quantize the transform coefficients and transmit the same to the entropy encoder 15110. The entropy encoder 15110 may encode the quantized signal (information about the quantized transform coefficients) and output a bitstream of the encoded signal. The information about the quantized transform coefficients may be referred to as residual information. The quantizer 15040 may rearrange the quantized transform coefficients, which are in a block form, in the form of a one-dimensional vector based on a coefficient scan order, and generate information about the quantized transform coefficients based on the quantized transform coefficients in the form of the one-dimensional vector. The entropy encoder 15110 may employ various encoding techniques such as, for example, exponential Golomb, context-adaptive variable length coding (CAVLC), and context-adaptive binary arithmetic coding (CABAC). The entropy encoder 15110 may encode information necessary for video/image reconstruction (e.g., values of syntax elements) together with or separately from the quantized transform coefficients. The encoded information (e.g., encoded video/image information) may be transmitted or stored in the form of a bitstream on a network abstraction layer (NAL) unit basis. The bitstream may be transmitted over a network or may be stored in a digital storage medium. Here, the network may include a broadcast network and/or a communication network, and the digital storage medium may include various storage media such as USB, SD, CD, DVD, Blu-ray, HDD, and SSD. A transmitter (not shown) to transmit the signal output from the entropy encoder 15110 and/or a storage (not shown) to store the signal may be configured as internal/external elements of the encoder 15000. Alternatively, the transmitter may be included in the entropy encoder 15110.

The quantized transform coefficients output from the quantizer 15040 may be used to generate a prediction signal. For example, inverse quantization and inverse transform may be applied to the quantized transform coefficients through the inverse quantizer 15050 and the inverse transformer 15060 to reconstruct the residual signal (residual block or residual samples). The adder 155 may add the reconstructed residual signal to the prediction signal output from the inter-predictor 15090 or the intra-predictor 15100. Thereby, a reconstructed signal (reconstructed picture, reconstructed block, reconstructed sample array) may be generated. When there is no residual signal for a processing target block as in the case where the skip mode is applied, the predicted block may be used as the reconstructed block. The adder 155 may be called a reconstructor or a reconstructed block generator. The generated reconstructed signal may be used for intra-prediction of the next processing target block in the current picture, or may be used for inter-prediction of the next picture through filtering as described below.

The filter 15070 may improve subjective/objective image quality by applying filtering to the reconstructed signal. For example, the filter 15070 may generate a modified reconstructed picture by applying various filtering techniques to the reconstructed picture, and the modified reconstructed picture may be stored in the memory 15080, specifically, the DPB of the memory 15080. The various filtering techniques may include, for example, deblocking filtering, sample adaptive offset, adaptive loop filtering, and bilateral filtering. As described below in the description of the filtering techniques, the filter 15070 may generate various kinds of information about filtering and deliver the generated information to the entropy encoder 15110. The information about filtering may be encoded and output in the form of a bitstream by the entropy encoder 15110.

The modified reconstructed picture transmitted to the memory 15080 may be used as a reference picture by the inter-predictor 15090. Thus, when inter-prediction is applied, the encoder may avoid prediction mismatch between the encoder 15000 and the decoder and improve encoding efficiency.

The DPB of the memory 15080 may store the modified reconstructed picture so as to be used as a reference picture by the inter-predictor 15090. The memory 15080 may store the motion information about a block from which the motion information in the current picture is derived (or encoded) and/or the motion information about the blocks in a picture that has already been reconstructed. The stored motion information may be delivered to the inter-predictor 15090 so as to be used as motion information about a spatial neighboring block or motion information about a temporal neighboring block. The memory 15080 may store the reconstructed samples of the reconstructed blocks in the current picture and deliver the reconstructed samples to the intra-predictor 15100.

At least one of the prediction, transform, and quantization procedures described above may be skipped. For example, for a block to which the pulse coding mode (PCM) is applied, the prediction, transform, and quantization procedures may be skipped, and the value of the original sample may be encoded and output in the form of a bitstream.

Figure 16:
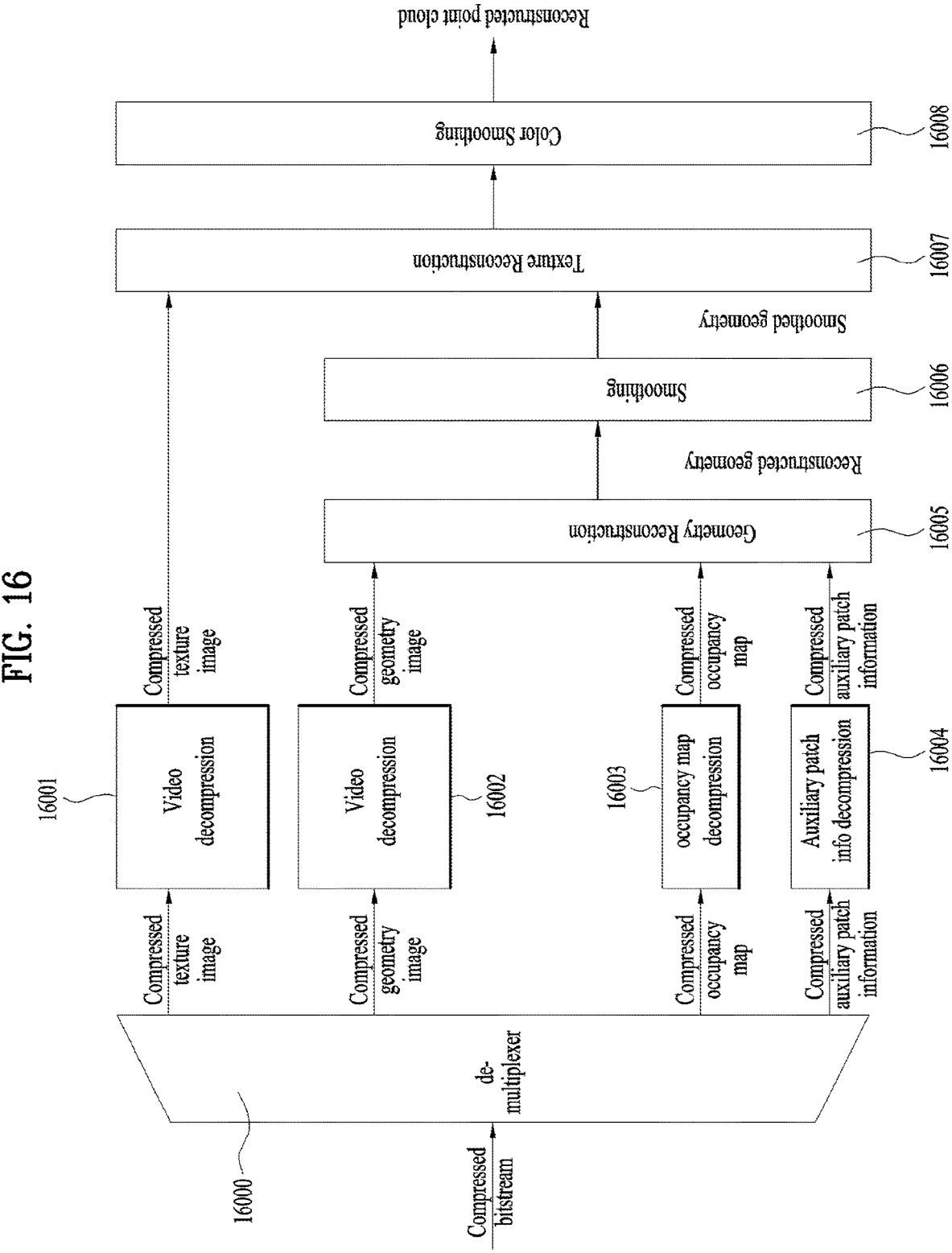
FIG. 16 illustrates an exemplary V-PCC decoding process according to embodiments.

FIG. 16 illustrates an exemplary V-PCC decoding process according to embodiments.

A demultiplexer 16000 demultiplexes the compressed bitstream to output a compressed texture image, a compressed geometry image, a compressed occupancy map, and a compressed auxiliary patch information.

In video decompression 16001, 16002, the compressed texture image and the compressed geometry image are decompressed, respectively.

In occupancy map decompression 16003, the compressed occupancy map is decompressed.

In auxiliary patch info decompression 16004, the auxiliary patch information is decompressed.

In geometry reconstruction 16005, the geometry information is restored (reconstructed) based on the decompressed geometry image, the decompressed occupancy map, and/or the decompressed auxiliary patch information. For example, the geometry changed in the encoding process may be reconstructed.

In smoothing 16006, the smoothing operation may be applied to the reconstructed geometry. For example, smoothing filtering may be applied.

In texture reconstruction 16007, a texture is reconstructed from the decompressed texture image and/or the smoothed geometry.

In color smoothing 16008, color values are smoothed from the reconstructed texture. For example, smoothing filtering may be applied.

As a result, reconstructed point cloud data may be generated.

The figure illustrates a decoding process of the V-PCC for reconstructing a point cloud by decoding the compressed occupancy map, geometry image, texture image, and auxiliary path information. Each process according to embodiments is operated as follows.

Video Decompression

Video decompression is a reverse process of the video compression described above. In video decompression, a 2D video codec such as HEVC or VVC is used to decode a compressed bitstream containing the geometry image, texture image, and occupancy map image generated in the above-described process.

Figure 17:
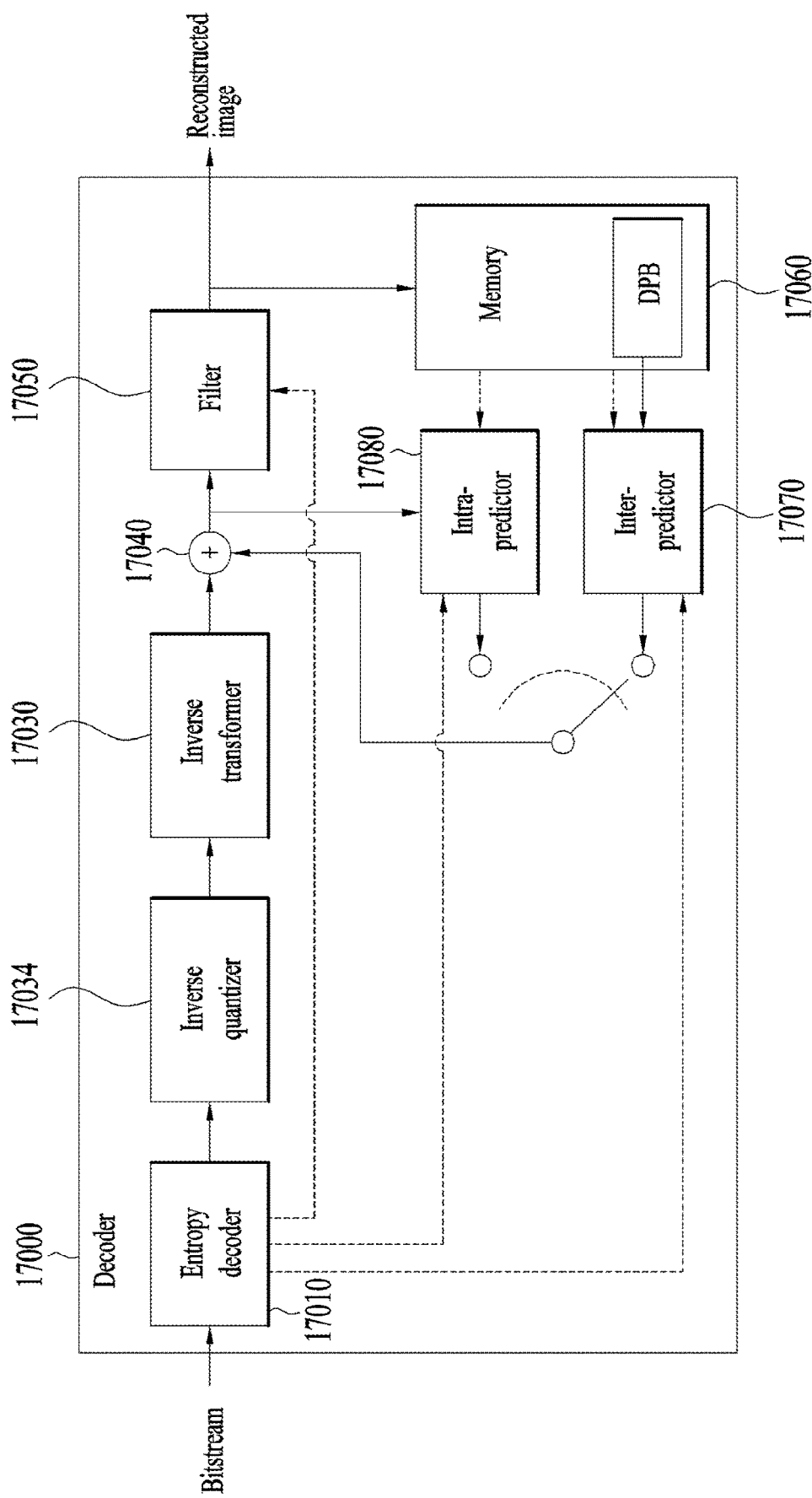
FIG. 17 shows an exemplary 2D video/image decoder according to embodiments.

FIG. 17 illustrates an exemplary 2D video/image decoder according to embodiments.

The figure, which illustrates an embodiment in which video decompression is applied, is a schematic block diagram of a 2D video/image decoder 17000 by which a video/image signal is decoded. The 2D video/image decoder 17000 may be included in the point cloud video decoder described above, or may be configured as an internal/external component. Here, the input bitstream may include bitstreams for the geometry image, texture image (attribute(s) image), and occupancy map image described above. The reconstructed image (or the output image or the decoded image) may represent a reconstructed image for the geometry image, texture image (attribute(s) image), and occupancy map image described above.

Referring to the figure, a inter-predictor 17070 and a intra-predictor 17080 may be collectively referred to as a predictor. That is, the predictor may include the inter-predictor 17070 and the intra-predictor 17080. An inverse quantizer 17020 and an inverse transformer 17030 may be collectively referred to as a residual processor. That is, the residual processor may include the inverse quantizer 17020 and the inverse transformer 17030. The entropy decoder 17010, the inverse quantizer 17020, the inverse transformer 17030, the adder 17040, the filter 17050, the inter-predictor 17070, and the intra-predictor 17080 described above may be configured by one hardware component (e.g., a decoder or a processor) according to an embodiment. In addition, the memory 170 may include a decoded picture buffer (DPB) or may be configured by a digital storage medium.

When a bitstream containing video/image information is input, the decoder 17000 may reconstruct an image in a process corresponding to the process in which the video/image information is processed by the encoder of FIG. 15. For example, the decoder 17000 may perform decoding using a processing unit applied in the encoder. Thus, the processing unit of decoding may be, for example, a CU. The CU may be split from a CTU or an LCU along a quad-tree structure and/or a binary-tree structure. Then, the reconstructed video signal decoded and output through the decoder 17000 may be played through a player.

The decoder 17000 may receive a signal output from the encoder in the form of a bitstream, and the received signal may be decoded through the entropy decoder 17010. For example, the entropy decoder 17010 may parse the bitstream to derive information (e.g., video/image information) necessary for image reconstruction (or picture reconstruction). For example, the entropy decoder 17010 may decode the information in the bitstream based on a coding technique such as exponential Golomb coding, CAVLC, or CABAC, output values of syntax elements required for image reconstruction, and quantized values of transform coefficients for the residual. More specifically, in the CABAC entropy decoding, a bin corresponding to each syntax element in the bitstream may be received, and a context model may be determined based on decoding target syntax element information and decoding information about neighboring and decoding target blocks or information about a symbol/bin decoded in a previous step. Then, the probability of occurrence of a bin may be predicted according to the determined context model, and arithmetic decoding of the bin may be performed to generate a symbol corresponding to the value of each syntax element. According to the CABAC entropy decoding, after a context model is determined, the context model may be updated based on the information about the symbol/bin decoded for the context model of the next symbol/bin. Information about the prediction in the information decoded by the entropy decoder 17010 may be provided to the predictors (the inter-predictor 17070 and the intra-predictor 17080), and the residual values on which entropy decoding has been performed by the entropy decoder 17010, that is, the quantized transform coefficients and related parameter information, may be input to the inverse quantizer 17020. In addition, information about filtering of the information decoded by the entropy decoder 17010 may be provided to the filter 17050. A receiver (not shown) configured to receive a signal output from the encoder may be further configured as an internal/external element of the decoder 17000. Alternatively, the receiver may be a component of the entropy decoder 17010.

The inverse quantizer 17020 may output transform coefficients by inversely quantizing the quantized transform coefficients. The inverse quantizer 17020 may rearrange the quantized transform coefficients in the form of a two-dimensional block. In this case, the rearrangement may be performed based on the coefficient scan order implemented by the encoder. The inverse quantizer 17020 may perform inverse quantization on the quantized transform coefficients using a quantization parameter (e.g., quantization step size information), and acquire transform coefficients.

The inverse transformer 17030 acquires a residual signal (residual block and residual sample array) by inversely transforming the transform coefficients.

The predictor may perform prediction on the current block and generate a predicted block including prediction samples for the current block. The predictor may determine whether intra-prediction or inter-prediction is to be applied to the current block based on the information about the prediction output from the entropy decoder 17010, and may determine a specific intra-/inter-prediction mode.

The intra-predictor 265 may predict the current block with reference to the samples in the current picture. The samples may be positioned in the neighbor of or away from the current block depending on the prediction mode. In intra-prediction, the prediction modes may include a plurality of non-directional modes and a plurality of directional modes. The intra-predictor 17080 may determine a prediction mode to be applied to the current block, using the prediction mode applied to the neighboring block.

The inter-predictor 17070 may derive a predicted block for the current block based on a reference block (reference sample array) specified by a motion vector on the reference picture. In this case, in order to reduce the amount of motion information transmitted in the inter-prediction mode, the motion information may be predicted on a per block, sub-block, or sample basis based on the correlation in motion information between the neighboring blocks and the current block. The motion information may include a motion vector and a reference picture index. The motion information may further include information about an inter-prediction direction (L0 prediction, L1 prediction, Bi prediction, etc.). In the case of inter-prediction, the neighboring blocks may include a spatial neighboring block, which is present in the current picture, and a temporal neighboring block, which is present in the reference picture. For example, the inter-predictor 17070 may configure a motion information candidate list based on neighboring blocks and derive a motion vector of the current block and/or a reference picture index based on the received candidate selection information. Inter-prediction may be performed based on various prediction modes. The information about the prediction may include information indicating an inter-prediction mode for the current block.

The adder 17040 may add the acquired residual signal to the prediction signal (predicted block or prediction sample array) output from the inter-predictor 17070 or the intra-predictor 17080, thereby generating a reconstructed signal (a reconstructed picture, a reconstructed block, or a reconstructed sample array). When there is no residual signal for a processing target block as in the case where the skip mode is applied, the predicted block may be used as the reconstructed block.

The adder 17040 may be called a reconstructor or a reconstructed block generator. The generated reconstructed signal may be used for intra-prediction of the next processing target block in the current picture, or may be used for inter-prediction of the next picture through filtering as described below.

The filter 17050 may improve subjective/objective image quality by applying filtering to the reconstructed signal. For example, the filter 17050 may generate a modified reconstructed picture by applying various filtering techniques to the reconstructed picture, and may transmit the modified reconstructed picture to the memory 250, specifically, the DPB of the memory 17060. The various filtering techniques may include, for example, deblocking filtering, sample adaptive offset, adaptive loop filtering, and bilateral filtering.

The reconstructed picture stored in the DPB of the memory 17060 may be used as a reference picture in the inter-predictor 17070. The memory 17060 may store the motion information about a block from which the motion information is derived (or decoded) in the current picture and/or the motion information about the blocks in a picture that has already been reconstructed. The stored motion information may be delivered to the inter-predictor 17070 so as to be used as the motion information about a spatial neighboring block or the motion information about a temporal neighboring block. The memory 17060 may store the reconstructed samples of the reconstructed blocks in the current picture, and deliver the reconstructed samples to the intra-predictor 17080.

In the present disclosure, the embodiments described regarding the filter 160, the inter-predictor 180, and the intra-predictor 185 of the encoder 100 may be applied to the filter 17050, the inter-predictor 17070 and the intra-predictor 17080 of the decoder 17000, respectively, in the same or corresponding manner.

At least one of the prediction, transform, and quantization procedures described above may be skipped. For example, for a block to which the pulse coding mode (PCM) is applied, the prediction, transform, and quantization procedures may be skipped, and the value of a decoded sample may be used as a sample of the reconstructed image.

Occupancy Map Decompression

This is a reverse process of the occupancy map compression described above. Occupancy map decompression is a process for reconstructing the occupancy map by decompressing the occupancy map bitstream.

Auxiliary Patch Info Decompression

This is a reverse process of the auxiliary patch info compression described above. Auxiliary patch info decompression is a process for reconstructing the auxiliary patch info by decoding the compressed auxiliary patch info bitstream.

Geometry Reconstruction

This is a reverse process of the geometry image generation described above. Initially, a patch is extracted from the geometry image using the reconstructed occupancy map, the 2D position/size information about the patch included in the auxiliary patch info, and the information about mapping between a block and the patch. Then, a point cloud is reconstructed in a 3D space based on the geometry image of the extracted patch and the 3D position information about the patch included in the auxiliary patch info. When the geometry value corresponding to a point (u, v) within the patch is g(u, v), and the coordinates of the position of the patch on the normal, tangent and bitangent axes of the 3D space are ($\delta 0$, s0, r0), $\Box\delta(u, v)$, s(u, v), and r(u, v), which are the normal, tangent, and bitangent coordinates in the 3D space of a position mapped to point (u, v) may be expressed as follows:

$$\delta(u,v)=\delta 0+g(u,v)$$

$$s(u,v)=s0+u$$

$$r(u,v)=r0+v.$$

Smoothing

Smoothing, which is the same as the smoothing in the encoding process described above, is a process for eliminating discontinuity that may occur on the patch boundary due to deterioration of the image quality occurring during the compression process.

Texture Reconstruction

Texture reconstruction is a process of reconstructing a color point cloud by assigning color values to each point constituting a smoothed point cloud. It may be performed by assigning color values corresponding to a texture image pixel at the same position as in the geometry image in the 2D space to points of a point of a point cloud corresponding to the same position in the 3D space, based on the mapping information about the geometry image and the point cloud in the geometry reconstruction process described above.

Color Smoothing

Color smoothing is similar to the process of geometry smoothing described above. Color smoothing is a process for eliminating discontinuity that may occur on the patch boundary due to deterioration of the image quality occurring during the compression process. Color smoothing may be performed through the following operations:

1) Calculate neighboring points of each point constituting the reconstructed point cloud using the K-D tree or the like. The neighboring point information calculated in the geometry smoothing process described above may be used.

2) Determine whether each of the points is positioned on the patch boundary. These operations may be performed based on the boundary information calculated in the geometry smoothing process described above.

3) Check the distribution of color values for the neighboring points of the points present on the boundary and determine whether smoothing is to be performed. For example, when the entropy of luminance values is less than or equal to a threshold local entry (there are many similar luminance values), it may be determined that the corresponding portion is not an edge portion, and smoothing may be performed. As a method of smoothing, the color value of the point may be replaced with the average of the color values of the neighboring points.

Figure 18:
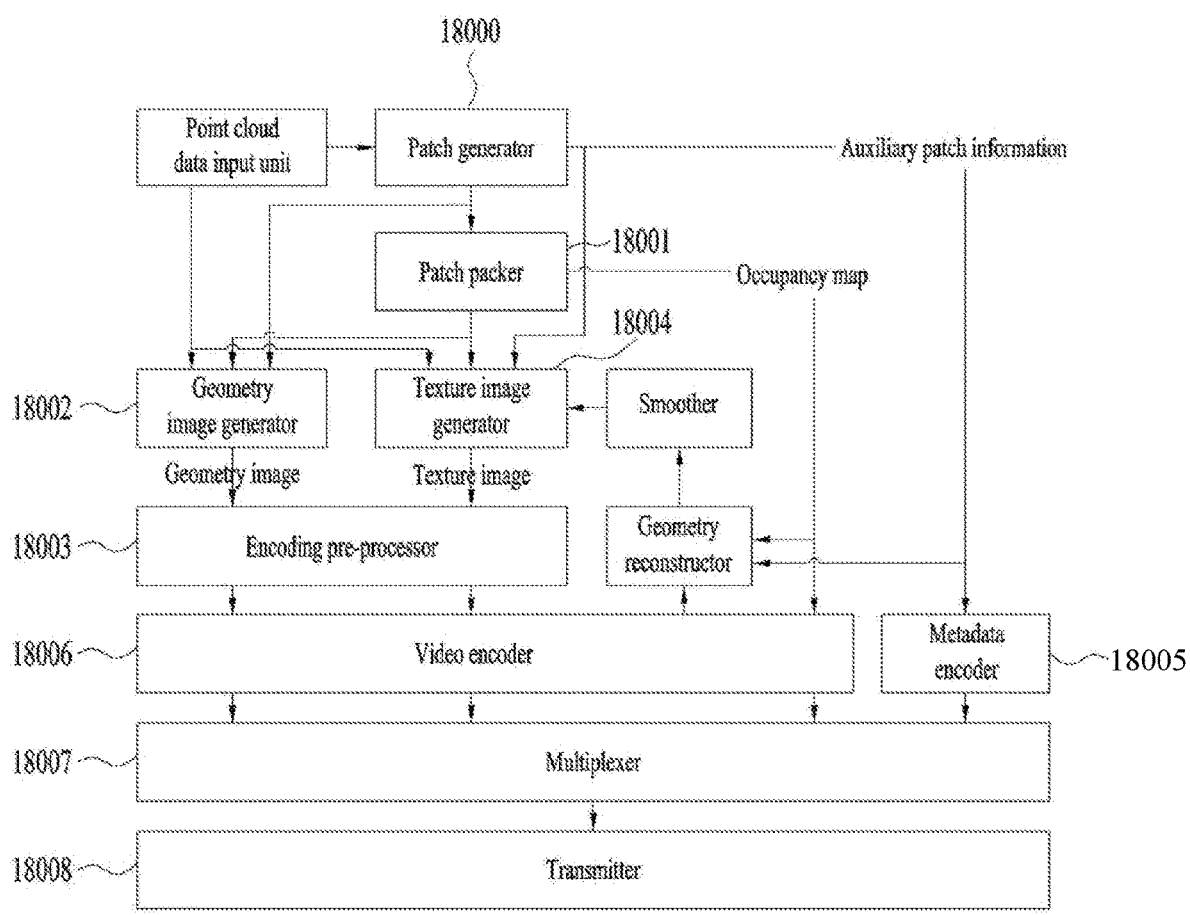
FIG. 18 is a flowchart illustrating operation of a transmission device according to embodiments of the present disclosure.

FIG. 18 is a flowchart illustrating operation of a transmission device according to embodiments of the present disclosure.

Procedure of Operation of the Transmission Terminal

An operation process of the transmission terminal for compression and transmission of point cloud data using V-PCC may be performed as illustrated in the figure.

The point cloud data transmission device according to the embodiments may be referred to as a transmission device.

Regarding a patch generator 18000, a patch for 2D image mapping of a point cloud is generated. Auxiliary patch information is generated as a result of the patch generation. The generated information may be used in the processes of geometry image generation, texture image generation, and geometry reconstruction for smoothing.

Regarding a patch packer 18001, a patch packing process of mapping the generated patches into the 2D image is performed. As a result of patch packing, an occupancy map may be generated. The occupancy map may be used in the processes of geometry image generation, texture image generation, and geometry reconstruction for smoothing.

A geometry image generator 18002 generates a geometry image based on the auxiliary patch information and the occupancy map. The generated geometry image is encoded into one bitstream through video encoding.

An encoding preprocessor 18003 may include an image padding procedure. The geometry image regenerated by decoding the generated geometry image or the encoded geometry bitstream may be used for 3D geometry reconstruction and then be subjected to a smoothing process.

A texture image generator 18004 may generate a texture image based on the (smoothed) 3D geometry, the point cloud, the auxiliary patch information, and the occupancy map. The generated texture image may be encoded into one video bitstream.

A metadata encoder 18005 may encode the auxiliary patch information into one metadata bitstream.

A video encoder 18006 may encode the occupancy map into one video bitstream.

A multiplexer 18007 may multiplex the video bitstreams of the generated geometry image, texture image, and occupancy map and the metadata bitstream of the auxiliary patch information into one bitstream.

A transmitter 18008 may transmit the bitstream to the reception terminal. Alternatively, the video bitstreams of the generated geometry image, texture image, and the occupancy map and the metadata bitstream of the auxiliary patch information may be processed into a file of one or more track data or encapsulated into segments and may be transmitted to the reception terminal through the transmitter.

Figure 19:
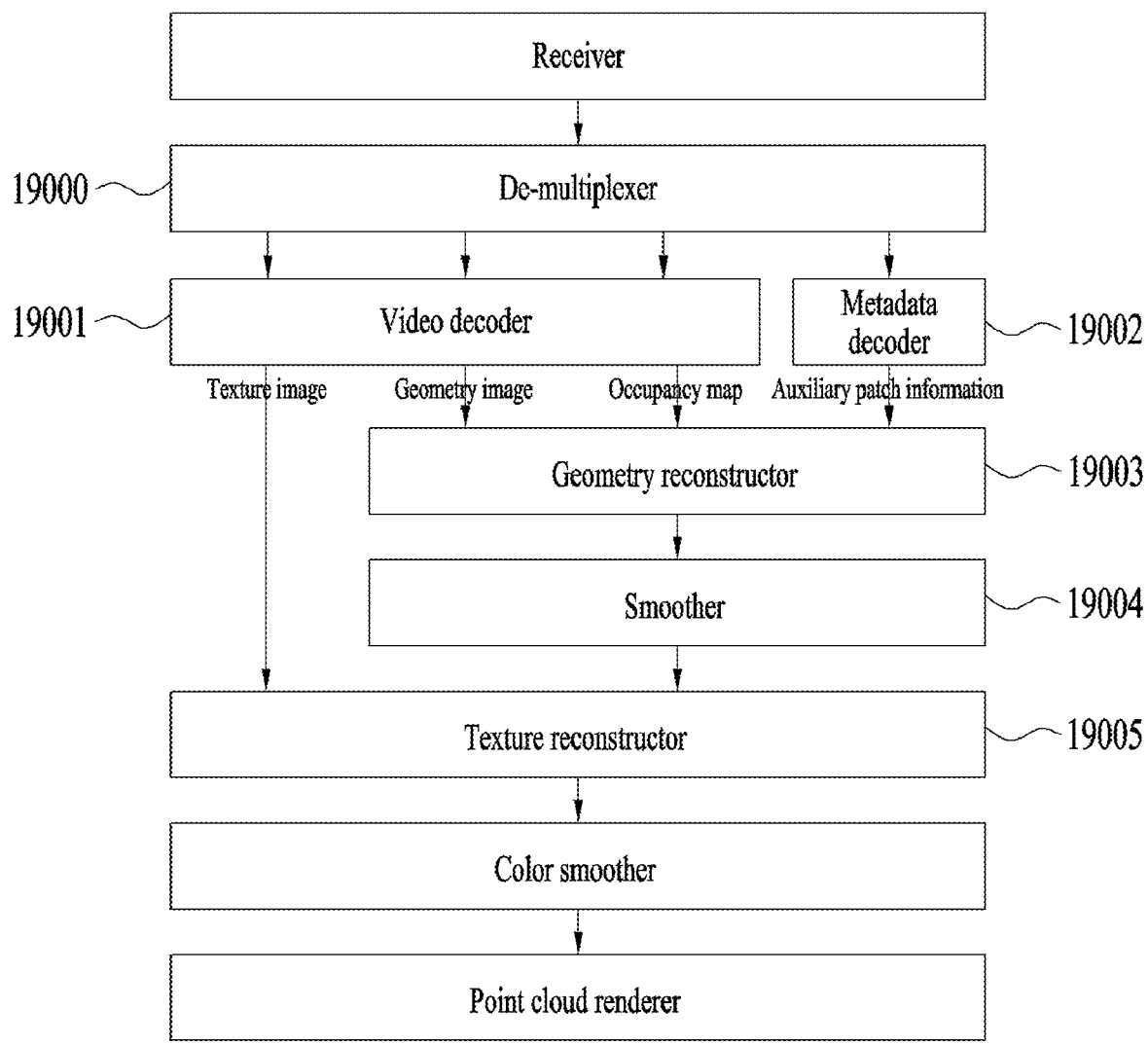
FIG. 19 is a flowchart illustrating operation of a reception device according to embodiments.

FIG. 19 is a flowchart illustrating operation of a reception device according to embodiments.

Operation Process Of Reception Terminal

An operation process of the reception terminal for receiving and reconstructing point cloud data using V-PCC may be performed as illustrated in the figure.

The point cloud data reception device according to the embodiments may be referred to as a reception device.

The bitstream of the received point cloud is demultiplexed into the video bitstreams of the compressed geometry image, texture image, occupancy map and the metadata bitstream of the auxiliary patch information by a demultiplexer 19000 after file/segment decapsulation. A video decoder 19001 and a metadata decoder 19002 decode the demultiplexed video bitstreams and metadata bitstream. 3D geometry is reconstructed by a geometry reconstrutor 19003 based on the decoded geometry image, occupancy map, and auxiliary patch information, and is then subjected to a smoothing process performed by a smoother 19004. A color point cloud image/picture may be reconstructed by a texture reconstrutor 19005 by assigning color values to the smoothed 3D geometry based on the texture image. Thereafter, a color smoothing process may be additionally performed to improve the objective/subjective visual quality, and a modified point cloud image/picture derived through the color smoothing process is shown to the user through the rendering process (through, for example, the point cloud renderer). In some cases, the color smoothing process may be skipped.

Figure 20:
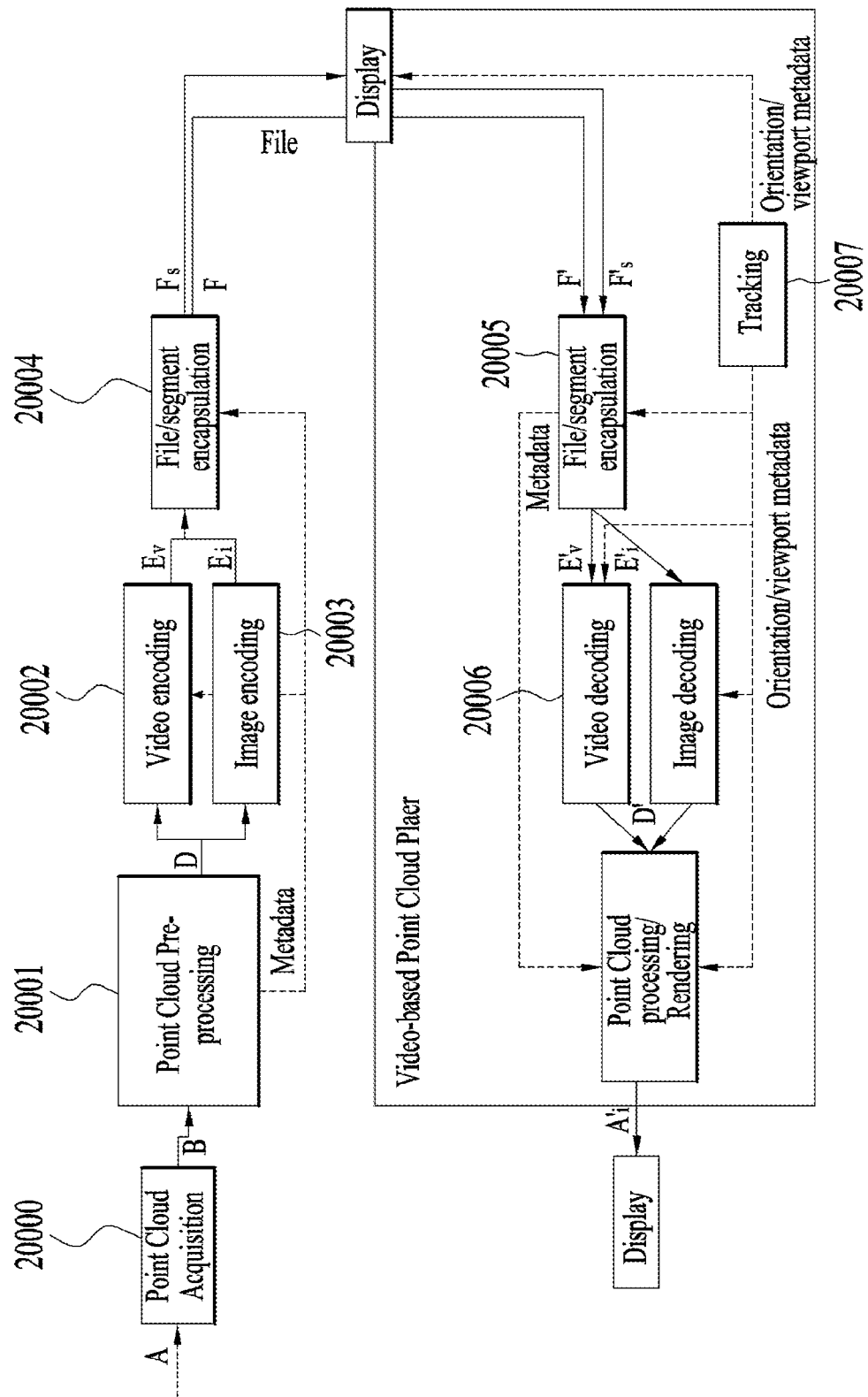
FIG. 20 illustrates an exemplary architecture for V-PCC based storage and streaming of point cloud data according to embodiments.

FIG. 20 illustrates an exemplary architecture for V-PCC based storage and streaming of point cloud data according to embodiments.

The figure shows the overall architecture for storing or streaming point cloud data compressed based on video-based point cloud compression (hereinafter referred to as V-PCC). The process of storing and streaming the point cloud data may include an acquisition process, an encoding process, a transmission process, a decoding process, a rendering process, and/or a feedback process.

The embodiments propose a method of effectively providing point cloud media/content/data.

In order to effectively provide point cloud media/content/data, a point cloud acquirer 20000 may acquire a point cloud video. For example, one or more cameras may acquire point cloud data through capture, composition or generation of a point cloud. Through this acquisition process, a point cloud video including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like containing the point cloud video may be generated. For point cloud data having multiple frames, one or more files may be acquired. In this process, point cloud related metadata (e.g., metadata related to capture, etc.) may be generated.

Post-processing for improving the quality of the content may be needed for the captured point cloud video. In the video capture process, the maximum/minimum depth may be adjusted within the range provided by the camera equipment. Even after the adjustment, point data of an unwanted area may still be present. Accordingly, post-processing of removing the unwanted area (e.g., the background) or recognizing a connected space and filling the spatial holes may be performed. In addition, point clouds extracted from the cameras sharing a spatial coordinate system may be integrated into one piece of content through the process of transforming each point into a global coordinate system based on the coordinates of the location of each camera acquired through a calibration process. Thereby, a point cloud video with a high density of points may be acquired.

A point cloud pre-processor 20001 may generate one or more pictures/frames of the point cloud video. Here, a picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame of a binary map, which indicates presence or absence of data at the corresponding position in the 2D plane with a value of 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

A point cloud video encoder 20002 may encode one or more video streams related to a point cloud video. One video may include multiple frames, and one frame may correspond to a still image/picture. In the present disclosure, the point cloud video may include a point cloud image/frame/picture, and the term "point cloud video" may be used interchangeably with the point cloud video/frame/picture. The point cloud video encoder may perform a video-based point cloud compression (V-PCC) procedure. The point cloud video encoder may perform a series of procedures such as prediction, transform, quantization, and entropy coding for compression and coding efficiency. The encoded data (encoded video/image information) may be output in the form of a bitstream. Based on the V-PCC procedure, the point cloud video encoder may encode point cloud video by dividing the same into a geometry video, an attribute video, an occupancy map video, and metadata, for example, information about patches, as described below. The geometry video may include a geometry image, the attribute video may include an attribute image, and the occupancy map video may include an occupancy map image. The patch data, which is auxiliary information, may include patch related information. The attribute video/image may include a texture video/image.

A point cloud image encoder 20003 may encode one or more images related to a point cloud video. The point cloud image encoder may perform a video-based point cloud compression (V-PCC) procedure. The point cloud image encoder may perform a series of procedures such as prediction, transform, quantization, and entropy coding for compression and coding efficiency. The encoded image may be output in the form of a bitstream. Based on the V-PCC procedure, the point cloud image encoder may encode the point cloud image by dividing the same into a geometry image, an attribute image, an occupancy map image, and metadata, for example, information about patches, as described below.

An encapsulation processor (file/segment encapsulation) 20004 may encapsulate the encoded point cloud data and/or point cloud-related metadata into a file or a segment for streaming. Here, the point cloud-related metadata may be received from the metadata processor or the like. The metadata processor may be included in the point cloud video/image encoder or may be configured as a separate component/module. The encapsulation processor may encapsulate the corresponding video/image/metadata in a file format such as ISOBMFF or in the form of a DASH segment or the like. According to an embodiment, the encapsulation processor may include the point cloud metadata in the file format. The point cloud-related metadata may be included, for example, in boxes at various levels on the ISOBMFF file format or as data in a separate track within the file. According to an embodiment, the encapsulation processor may encapsulate the point cloud-related metadata into a file.

A transmission processor may perform processing of the encapsulated point cloud data for transmission according to the file format. The transmission processor may be included in the transmitter or may be configured as a separate component/module. The transmission processor may process the point cloud data according to a transmission protocol. The processing for transmission may include processing for delivery over a broadcast network and processing for delivery through a broadband. According to an embodiment, the transmission processor may receive point cloud-related metadata from the metadata processor as well as the point cloud data, and perform processing of the point cloud video data for transmission.

The transmitter may transmit a point cloud bitstream or a file/segment including the bitstream to the receiver of the reception device over a digital storage medium or a network. For transmission, processing according to any transmission protocol may be performed. The data processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The transmitter may include an element for generating a media file in a predetermined file format, and may include an element for transmission over a broadcast/communication network. The receiver may extract the bitstream and transmit the extracted bitstream to the decoder.

The receiver may receive point cloud data transmitted by the point cloud data transmission device according to the present disclosure. Depending on the transmission channel, the receiver may receive the point cloud data over a broadcast network or through a broadband. Alternatively, the point cloud data may be received through the digital storage medium. The receiver may include a process of decoding the received data and rendering the data according to the viewport of the user.

The reception processor may perform processing on the received point cloud video data according to the transmission protocol. The reception processor may be included in the receiver or may be configured as a separate component/module. The reception processor may reversely perform the process of the transmission processor above described so as to correspond to the processing for transmission performed at the transmission side. The reception processor may deliver the acquired point cloud video to a decapsulation processor, and the acquired point cloud-related metadata to a metadata parser.

A decapsulation processor (file/segment decapsulation) 20005 may decapsulate the point cloud data received in the form of a file from the reception processor. The decapsulation processor may decapsulate files according to ISOBMFF or the like, and may acquire a point cloud bitstream or point cloud-related metadata (or a separate metadata bitstream). The acquired point cloud bitstream may be delivered to the point cloud decoder, and the acquired point cloud video-related metadata (metadata bitstream) may be delivered to the metadata processor. The point cloud bitstream may include the metadata (metadata bitstream). The metadata processor may be included in the point cloud decoder or may be configured as a separate component/module. The point cloud video-related metadata acquired by the decapsulation processor may take the form of a box or track in the file format. The decapsulation processor may receive metadata necessary for decapsulation from the metadata processor, when necessary. The point cloud-related metadata may be delivered to the point cloud decoder and used in a point cloud decoding procedure, or may be transferred to the renderer and used in a point cloud rendering procedure.

The point cloud video decoder 20006 may receive the bitstream and decode the video/image by performing an operation corresponding to the operation of the point cloud video encoder. In this case, the point cloud video decoder may decode the point cloud video by dividing the same into a geometry video, an attribute video, an occupancy map video, and auxiliary patch information as described below. The geometry video may include a geometry image, the attribute video may include an attribute image, and the occupancy map video may include an occupancy map image. The auxiliary information may include auxiliary patch information. The attribute video/image may include a texture video/image.

The 3D geometry may be reconstructed based on the decoded geometry image, the occupancy map, and auxiliary patch information, and then may be subjected to a smoothing process. The color point cloud image/picture may be reconstructed by assigning a color value to the smoothed 3D geometry based on the texture image. The renderer may render the reconstructed geometry and the color point cloud image/picture. The rendered video/image may be displayed through the display. All or part of the rendered result may be shown to the user through a VR/AR display or a typical display.

A sensor/tracker (sensing/tracking) 20007 acquires orientation information and/or user viewport information from the user or the reception side and delivers the orientation information and/or the user viewport information to the receiver and/or the transmitter. The orientation information may represent information about the position, angle, movement, etc. of the user's head, or represent information about the position, angle, movement, etc. of a device through which the user is viewing a video/image. Based on this information, information about the area currently viewed by the user in a 3D space, that is, viewport information may be calculated.

The viewport information may be information about an area in a 3D space currently viewed by the user through a device or an HMD. A device such as a display may extract a viewport area based on the orientation information, a vertical or horizontal FOV supported by the device, and the like. The orientation or viewport information may be extracted or calculated at the reception side. The orientation or viewport information analyzed at the reception side may be transmitted to the transmission side on a feedback channel.

Based on the orientation information acquired by the sensor/tracker and/or the viewport information indicating the area currently viewed by the user, the receiver may efficiently extract or decode only media data of a specific area, i.e., the area indicated by the orientation information and/or the viewport information from the file. In addition, based on the orientation information and/or viewport information acquired by the sensor/tracker, the transmitter may efficiently encode only the media data of the specific area, that is, the area indicated by the orientation information and/or the viewport information, or generate and transmit a file therefor.

The renderer may render the decoded point cloud data in a 3D space. The rendered video/image may be displayed through the display. The user may view all or part of the rendered result through a VR/AR display or a typical display.

The feedback process may include transferring various feedback information that may be acquired in the rendering/displaying process to the transmission side or the decoder of the reception side. Through the feedback process, interactivity may be provided in consumption of point cloud data. According to an embodiment, head orientation information, viewport information indicating an area currently viewed by a user, and the like may be delivered to the transmission side in the feedback process. According to an embodiment, the user may interact with what is implemented in the VR/AR/MR/autonomous driving environment. In this case, information related to the interaction may be delivered to the transmission side or a service provider in the feedback process. According to an embodiment, the feedback process may be skipped.

According to an embodiment, the above-described feedback information may not only be transmitted to the transmission side, but also be consumed at the reception side. That is, the decapsulation processing, decoding, and rendering processes at the reception side may be performed based on the above-described feedback information. For example, the point cloud data about the area currently viewed by the user may be preferentially decapsulated, decoded, and rendered based on the orientation information and/or the viewport information.

Figure 21:
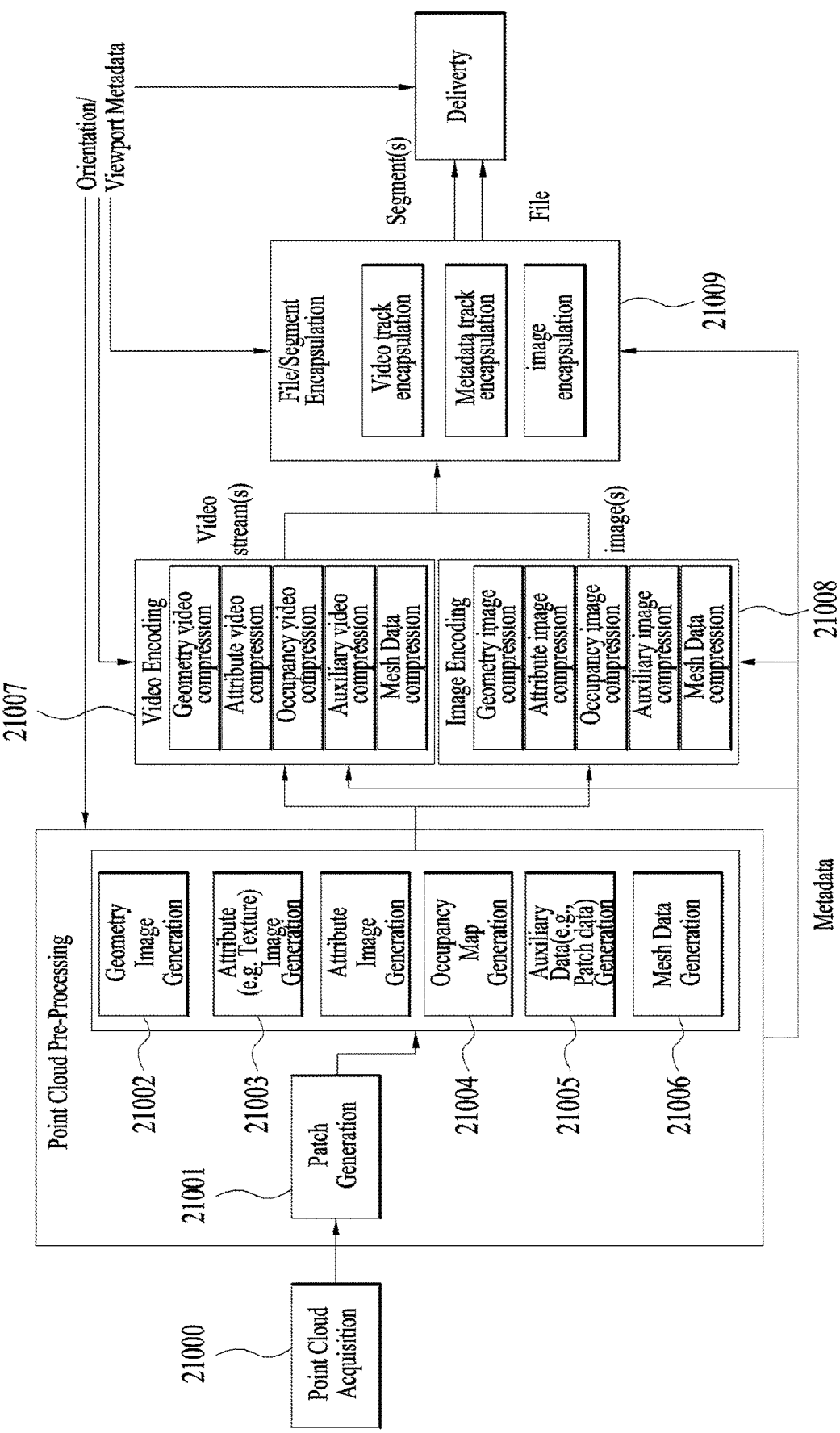
FIG. 21 is an exemplary block diagram of an apparatus for storing and transmitting point cloud data according to embodiments.

FIG. 21 is an exemplary block diagram of an apparatus for storing and transmitting point cloud data according to embodiments.

A point cloud data transmission device according to embodiments may be configured as shown in the figure. Each element of the transmission device may be a module/unit/component/hardware/software/a processor.

The geometry, attribute, auxiliary data, and mesh data of the point cloud may each be configured as a separate stream or stored in different tracks in a file. Furthermore, they may be included in a separate segment.

A point cloud acquirer (point cloud acquisition) 21000 acquires a point cloud. For example, one or more cameras may acquire point cloud data through capture, composition or generation of a point cloud. Through this acquisition process, point cloud data including a 3D position (which may be represented by x, y, and z position values, etc.) (hereinafter referred to as geometry) of each point and attributes (color, reflectance, transparency, etc.) of each point may be acquired. For example, a Polygon File format (PLY) (or Stanford Triangle format) file or the like including the point cloud data may be generated. For point cloud data having multiple frames, one or more files may be acquired. In this process, point cloud related metadata (e.g., metadata related to capture, etc.) may be generated.

A patch generator (or patch generation) 21002 generates patches from the point cloud data. The patch generator generates point cloud data or point cloud video as one or more pictures/frames. A picture/frame may generally represent a unit representing one image in a specific time interval. When points constituting the point cloud video is divided into one or more patches (sets of points that constitute the point cloud video, wherein the points belonging to the same patch are adjacent to each other in the 3D space and are mapped in the same direction among the planar faces of a 6-face bounding box when mapped to a 2D image) and mapped to a 2D plane, an occupancy map picture/frame in a binary map, which indicates presence or absence of data at the corresponding position in the 2D plane with 0 or 1 may be generated. In addition, a geometry picture/frame, which is in the form of a depth map that represents the information about the position (geometry) of each point constituting the point cloud video on a patch-by-patch basis, may be generated. A texture picture/frame, which represents the color information about each point constituting the point cloud video on a patch-by-patch basis, may be generated. In this process, metadata needed to reconstruct the point cloud from the individual patches may be generated. The metadata may include information about the patches, such as the position and size of each patch in the 2D/3D space. These pictures/frames may be generated continuously in temporal order to construct a video stream or metadata stream.

In addition, the patches may be used for 2D image mapping. For example, the point cloud data may be projected onto each face of a cube. After patch generation, a geometry image, one or more attribute images, an occupancy map, auxiliary data, and/or mesh data may be generated based on the generated patches.

Geometry image generation, attribute image generation, occupancy map generation, auxiliary data generation, and/or mesh data generation are performed by a pre-processor or a controller.

In geometry image generation 21002, a geometry image is generated based on the result of the patch generation. Geometry represents a point in a 3D space. The geometry image is generated using the occupancy map, which includes information related to 2D image packing of the patches, auxiliary data (patch data), and/or mesh data based on the patches. The geometry image is related to information such as a depth (e.g., near, far) of the patch generated after the patch generation.

In attribute image generation 21003, an attribute image is generated. For example, an attribute may represent a texture. The texture may be a color value that matches each point. According to embodiments, images of a plurality of attributes (such as color and reflectance) (N attributes) including a texture may be generated. The plurality of attributes may include material information and reflectance. According to an embodiment, the attributes may additionally include information indicating a color, which may vary depending on viewing angle and light even for the same texture.

In occupancy map generation 21004, an occupancy map is generated from the patches. The occupancy map includes information indicating presence or absence of data in the pixel, such as the corresponding geometry or attribute image.

In auxiliary data generation 21005, auxiliary data including information about the patches is generated. That is, the auxiliary data represents metadata about a patch of a point cloud object. For example, it may represent information such as normal vectors for the patches. Specifically, the auxiliary data may include information needed to reconstruct the point cloud from the patches (e.g., information about the positions, sizes, and the like of the patches in 2D/3D space, and projection (normal) plane identification information, patch mapping information, etc.)

In mesh data generation 21006, mesh data is generated from the patches. Mesh represents connection between neighboring points. For example, it may represent data of a triangular shape. For example, the mesh data refers to connectivity between the points.

A point cloud pre-processor or controller generates metadata related to patch generation, geometry image generation, attribute image generation, occupancy map generation, auxiliary data generation, and mesh data generation.

The point cloud transmission device performs video encoding and/or image encoding in response to the result generated by the pre-processor. The point cloud transmission device may generate point cloud image data as well as point cloud video data. According to embodiments, the point cloud data may have only video data, only image data, and/or both video data and image data.

A video encoder 21007 performs geometry video compression, attribute video compression, occupancy map compression, auxiliary data compression, and/or mesh data compression. The video encoder generates video stream(s) containing encoded video data.

Specifically, in the geometry video compression, point cloud geometry video data is encoded. In the attribute video compression, attribute video data of the point cloud is encoded. In the auxiliary data compression, auxiliary data associated with the point cloud video data is encoded. In the mesh data compression, mesh data of the point cloud video data is encoded. The respective operations of the point cloud video encoder may be performed in parallel.

An image encoder 21008 performs geometry image compression, attribute image compression, occupancy map compression, auxiliary data compression, and/or mesh data compression. The image encoder generates image(s) containing encoded image data.

Specifically, in the geometry image compression, the point cloud geometry image data is encoded. In the attribute image compression, the attribute image data of the point cloud is encoded. In the auxiliary data compression, the auxiliary data associated with the point cloud image data is encoded. In the mesh data compression, the mesh data associated with the point cloud image data is encoded. The respective operations of the point cloud image encoder may be performed in parallel.

The video encoder and/or the image encoder may receive metadata from the pre-processor. The video encoder and/or the image encoder may perform each encoding process based on the metadata.

A file/segment encapsulator (file/segment encapsulation) 21009 encapsulates the video stream(s) and/or image(s) in the form of a file and/or segment. The file/segment encapsulator performs video track encapsulation, metadata track encapsulation, and/or image encapsulation.

In the video track encapsulation, one or more video streams may be encapsulated into one or more tracks.

In the metadata track encapsulation, metadata related to a video stream and/or an image may be encapsulated in one or more tracks. The metadata includes data related to the content of the point cloud data. For example, it may include initial viewing orientation metadata. According to embodiments, the metadata may be encapsulated into a metadata track, or may be encapsulated together in a video track or an image track.

In the image encapsulation, one or more images may be encapsulated into one or more tracks or items.

For example, according to embodiments, when four video streams and two images are input to the encapsulator, the four video streams and two images may be encapsulated in one file.

The file/segment encapsulator may receive metadata from the pre-processor. The file/segment encapsulator may perform encapsulation based on the metadata.

A file and/or a segment generated by the file/segment encapsulation are transmitted by the point cloud transmission device or the transmitter. For example, the segment(s) may be delivered based on a DASH-based protocol.

The transmitter may transmit a point cloud bitstream or a file/segment including the bitstream to the receiver of the reception device over a digital storage medium or a network. Processing according to any transmission protocol may be performed for transmission. The data that has been processed for transmission may be delivered over a broadcast network and/or through a broadband. The data may be delivered to the reception side in an on-demand manner. The digital storage medium may include various storage media such as USB, SD, CD, DVD, Blu-ray, HDD, and SSD. The deliverer may include an element for generating a media file in a predetermined file format, and may include an element for transmission over a broadcast/communication network. The deliverer receives orientation information and/or viewport information from the receiver. The deliverer may deliver the acquired orientation information and/or viewport information (or information selected by the user) to the pre-processor, the video encoder, the image encoder, the file/segment encapsulator, and/or the point cloud encoder. Based on the orientation information and/or the viewport information, the point cloud encoder may encode all point cloud data or the point cloud data indicated by the orientation information and/or the viewport information. Based on the orientation information and/or the viewport information, the file/segment encapsulator may encapsulate all point cloud data or the point cloud data indicated by the orientation information and/or the viewport information. Based on the orientation information and/or the viewport information, the deliverer may deliver all point cloud data or the point cloud data indicated by the orientation information and/or the viewport information.

For example, the pre-processor may perform the above-described operation on all the point cloud data or on the point cloud data indicated by the orientation information and/or the viewport information. The video encoder and/or the image encoder may perform the above-described operation on all the point cloud data or on the point cloud data indicated by the orientation information and/or the viewport information. The file/segment encapsulator may perform the above-described operation on all the point cloud data or on the point cloud data indicated by the orientation information and/or the viewport information. The transmitter may perform the above-described operation on all the point cloud data or on the point cloud data indicated by the orientation information and/or the viewport information.

Figure 22:
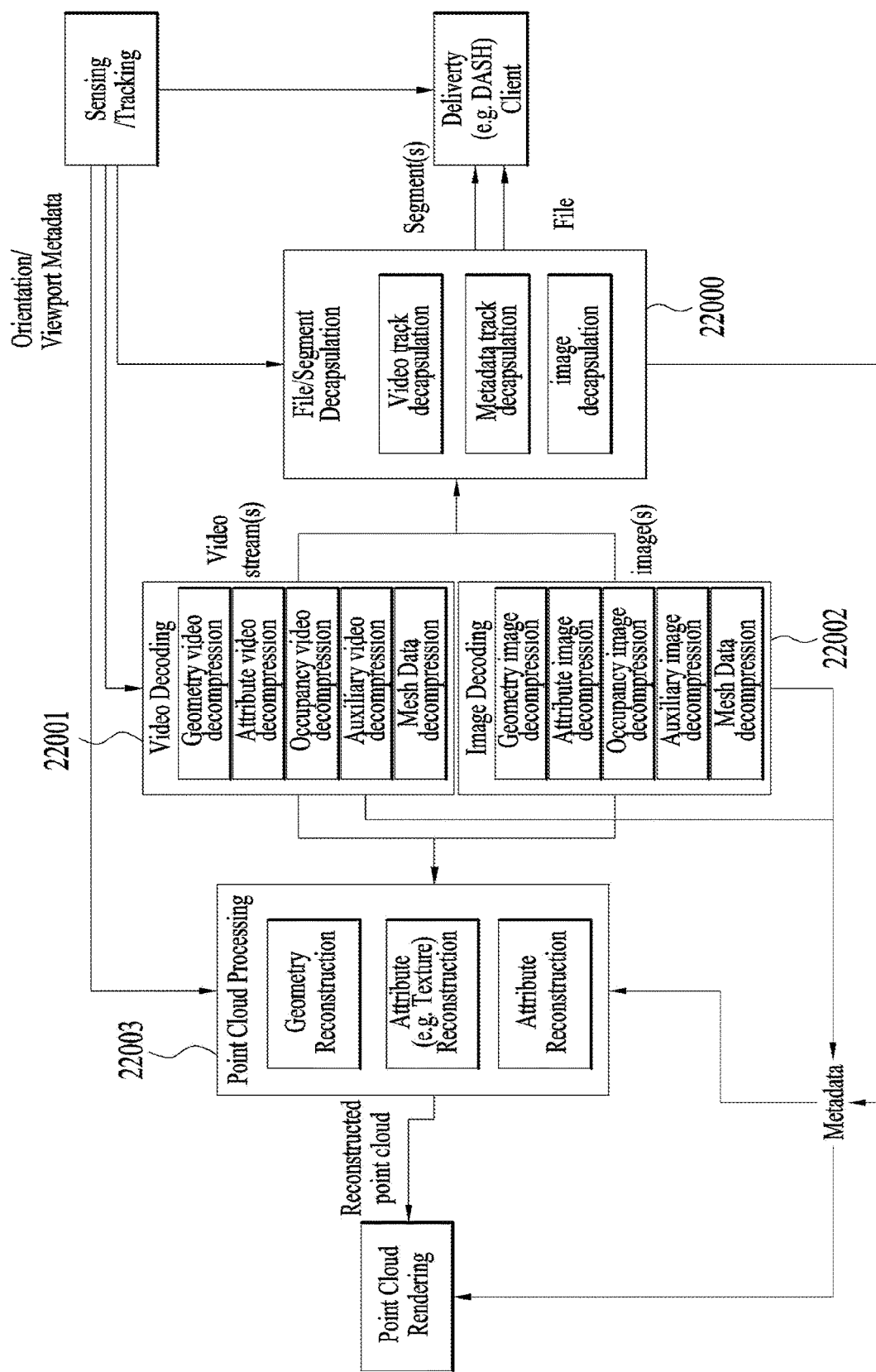
FIG. 22 is an exemplary block diagram of a point cloud data reception device according to embodiments.

FIG. 22 is an exemplary block diagram of a point cloud data reception device according to embodiments.

Each component of the reception device may be a module/unit/component/hardware/software/processor. A delivery client may receive point cloud data, a point cloud bitstream, or a file/segment including the bitstream transmitted by the point cloud data transmission device according to the embodiments. The receiver may receive the point cloud data over a broadcast network or through a broadband depending on the channel used for the transmission. Alternatively, the point cloud video data may be received through a digital storage medium. The receiver may include a process of decoding the received data and rendering the received data according to the user viewport. The reception processor may perform processing on the received point cloud data according to a transmission protocol. A reception processor may be included in the receiver or configured as a separate component/module. The reception processor may reversely perform the process of the transmission processor described above so as to correspond to the processing for transmission performed at the transmission side. The reception processor may deliver the acquired point cloud data to the decapsulation processor and the acquired point cloud related metadata to the metadata parser.

The sensor/tracker (sensing/tracking) acquires orientation information and/or viewport information. The sensor/tracker may deliver the acquired orientation information and/or viewport information to the delivery client, the file/segment decapsulator, and the point cloud decoder.

The delivery client may receive all point cloud data or the point cloud data indicated by the orientation information and/or the viewport information based on the orientation information and/or the viewport information. The file/segment decapsulator may decapsulate all point cloud data or the point cloud data indicated by the orientation information and/or the viewport information based on the orientation information and/or the viewport information. The point cloud decoder (the video decoder and/or the image decoder) may decode all point cloud data or the point cloud data indicated by the orientation information and/or the viewport information based on the orientation information and/or the viewport information. The point cloud processor may process all point cloud data or the point cloud data indicated by the orientation information and/or the viewport information based on the orientation information and/or the viewport information.

A file/segment decapsulator (file/segment decapsulation) 22000 performs video track decapsulation, metadata track decapsulation, and/or image decapsulation. The decapsulation processor (file/segment decapsulation) may decapsulate the point cloud data in the form of a file received from the reception processor. The decapsulation processor (file/segment decapsulation) may decapsulate files or segments according to ISOBMFF, etc., to acquire a point cloud bitstream or point cloud-related metadata (or a separate metadata bitstream). The acquired point cloud bitstream may be delivered to the point cloud decoder, and the acquired point cloud-related metadata (or metadata bitstream) may be delivered to the metadata processor. The point cloud bitstream may include the metadata (metadata bitstream). The metadata processor may be included in the point cloud video decoder or may be configured as a separate component/module. The point cloud-related metadata acquired by the decapsulation processor may take the form of a box or track in a file format. The decapsulation processor may receive metadata necessary for decapsulation from the metadata processor, when necessary. The point cloud-related metadata may be delivered to the point cloud decoder and used in a point cloud decoding procedure, or may be delivered to the renderer and used in a point cloud rendering procedure. The file/segment decapsulator may generate metadata related to the point cloud data.

In the video track decapsulation, a video track contained in the file and/or segment is decapsulated. Video stream(s) including a geometry video, an attribute video, an occupancy map, auxiliary data, and/or mesh data are decapsulated.

In the metadata track decapsulation, a bitstream including metadata related to the point cloud data and/or auxiliary data is decapsulated.

In the image decapsulation, image(s) including a geometry image, an attribute image, an occupancy map, auxiliary data and/or mesh data are decapsulated.

A video decoder (video decoding) 22001 performs geometry video decompression, attribute video decompression, occupancy map decompression, auxiliary data decompression, and/or mesh data decompression. The video decoder decodes the geometry video, the attribute video, the auxiliary data, and/or the mesh data in a process corresponding to the process performed by the video encoder of the point cloud transmission device according to the embodiments.

An image decoder (image decoding) 22002 performs geometry image decompression, attribute image decompression, occupancy map decompression, auxiliary data decompression, and/or mesh data decompression. The image decoder decodes the geometry image, the attribute image, the auxiliary data, and/or the mesh data in a process corresponding to the process performed by the image encoder of the point cloud transmission device according to the embodiments.

The video decoder and/or the image decoder may generate metadata related to the video data and/or the image data.

A point cloud processor (point cloud processing) 22003 performs geometry reconstruction and/or attribute reconstruction.

In geometry reconstruction, the geometry video and/or geometry image are reconstructed from the decoded video data and/or decoded image data based on the occupancy map, auxiliary data and/or mesh data.

In attribute reconstruction, the attribute video and/or the attribute image are reconstructed from the decoded attribute video and/or the decoded attribute image based on the occupancy map, auxiliary data, and/or mesh data. According to embodiments, for example, the attribute may be a texture. According to embodiments, an attribute may represent a plurality of pieces of attribute information. When there is a plurality of attributes, the point cloud processor according to the embodiments performs a plurality of attribute reconstructions.

The point cloud processor may receive metadata from the video decoder, the image decoder, and/or the file/segment decapsulator, and process the point cloud based on the metadata.

A point cloud renderer (point cloud rendering) renders the reconstructed point cloud. The point cloud renderer may receive metadata from the video decoder, the image decoder, and/or the file/segment decapsulator, and render the point cloud based on the metadata.

The display actually displays the result of rendering on the display.

As shown in FIGS. 15 to 19, after encoding/decoding, the method/device according to the embodiments the point cloud data as shown in 15 to 19, the bitstream including the point cloud data may be encapsulated and/or decapsulated in the form of a file and/or a segment For example, a point cloud data device according to the embodiments may encapsulate point cloud data based on a file. The file may include a V-PCC track containing parameters for a point cloud, a geometry track containing geometry, an attribute track containing an attribute, and an occupancy track containing an occupancy map.

In addition, a point cloud data reception device according to the embodiments decapsulates the point cloud data based on a file. The file may include a V-PCC track containing parameters for a point cloud, a geometry track containing geometry, an attribute track containing an attribute, and an occupancy track containing an occupancy map.

The operation described above may be performed by the file/segment encapsulator 20004, 20005 of FIG. 20, the file/segment encapsulator 21009 of FIG. 21, and the file/segment encapsulator 22000 of FIG. 22.

Figure 23:
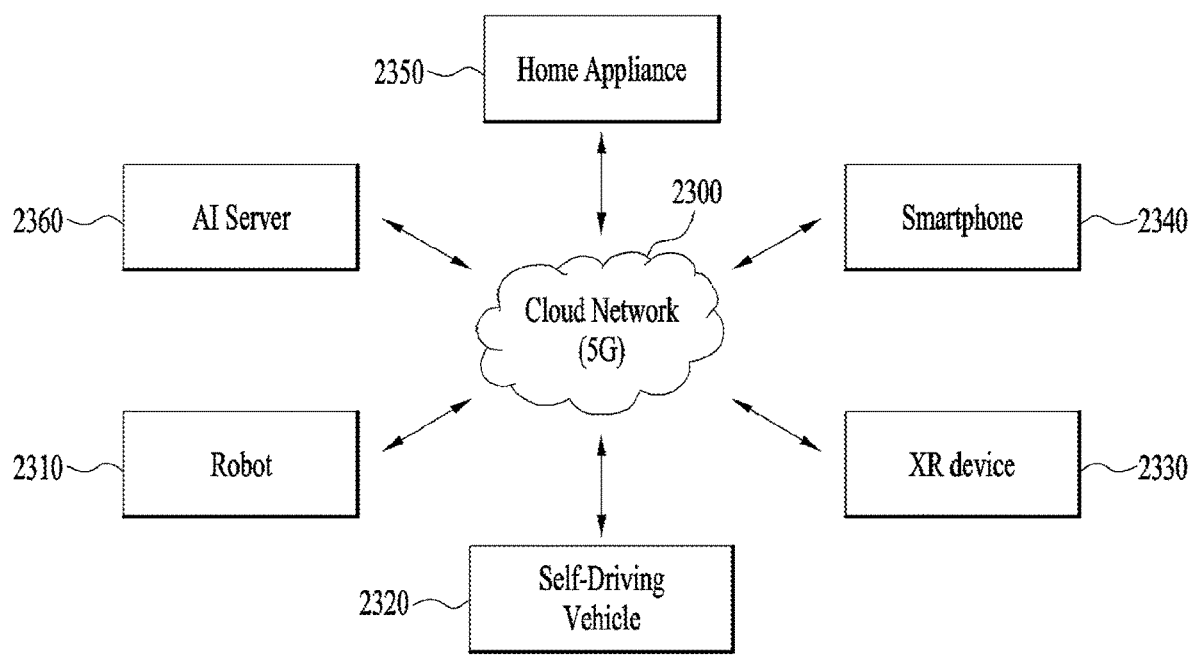
FIG. 23 illustrates an exemplary structure operable in connection with point cloud data transmission/reception methods/devices according to embodiments.

FIG. 23 illustrates an exemplary structure operable in connection with point cloud data transmission/reception methods/devices according to embodiments.

In the structure according to the embodiments, at least one of a server 2360, a robot 2310, a self-driving vehicle 2320, an XR device 2330, a smartphone 2340, a home appliance 2350 and/or a head-mount display (HMD) 2370 is connected to a cloud network 2300. Here, the robot 2310, the self-driving vehicle 2320, the XR device 2330, the smartphone 2340, or the home appliance 2350 may be referred to as a device. In addition, the XR device 1730 may correspond to a point cloud data (PCC) device according to embodiments or may be operatively connected to the PCC device.

The cloud network 2300 may represent a network that constitutes part of the cloud computing infrastructure or is present in the cloud computing infrastructure. Here, the cloud network 2300 may be configured using a 3G network, 4G or Long Term Evolution (LTE) network, or a 5G network.

The server 2360 may be connected to at least one of the robot 2310, the self-driving vehicle 2320, the XR device 2330, the smartphone 2340, the home appliance 2350, and/or the HMD 2370 over the cloud network 2300 and may assist at least a part of the processing of the connected devices 2310 to 2370.

The HMD 2370 represents one of the implementation types of the XR device and/or the PCC device according to the embodiments. An HMD type device according to embodiments includes a communication unit, a control unit, a memory, an I/O unit, a sensor unit, and a power supply unit.

Hereinafter, various embodiments of the devices 2310 to 2350 to which the above-described technology is applied will be described. The devices 2310 to 2350 illustrated in FIG. 23 may be operatively connected/coupled to a point cloud data transmission and reception device according to the above-described embodiments.

<PCC+XR> The XR/PCC device 2330 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 2330 may analyze 3D point cloud data or image data acquired through various sensors or from an external device and generate position data and attribute data about 3D points. Thereby, the XR/PCC device 2330 may acquire information about the surrounding space or a real object, and render and output an XR object. For example, the XR/PCC device 2330 may match an XR object including auxiliary information about a recognized object with the recognized object and output the matched XR object.

<PCC+Self-driving+XR> The self-driving vehicle 2320 may be implemented as a mobile robot, a vehicle, an unmanned aerial vehicle, or the like by applying the PCC technology and the XR technology.

The self-driving vehicle 2320 to which the XR/PCC technology is applied may represent an autonomous vehicle provided with means for providing an XR image, or an autonomous vehicle that is a target of control/interaction in the XR image. In particular, the self-driving vehicle 2320, which is a target of control/interaction in the XR image, may be distinguished from the XR device 2330 and may be operatively connected thereto.

The self-driving vehicle 2320 having means for providing an XR/PCC image may acquire sensor information from the sensors including a camera, and output the generated XR/PCC image based on the acquired sensor information. For example, the self-driving vehicle may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only real-world objects, backgrounds, and the like as CG images. On the other hand, the AR technology refers to a technology for showing a CG image virtually created on a real object image. The MR technology is similar to the AR technology described above in that virtual objects to be shown are mixed and combined with the real world. However, the MR technology differs from the AR technology makes a clear distinction between a real object and a virtual object created as a CG image and uses virtual objects as complementary objects for real objects, whereas the MR technology treats virtual objects as objects having the same characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to all VR, AR, MR, and XR technologies. For such technologies, encoding/decoding based on PCC, V-PCC, and G-PCC techniques may be applied.

The PCC method/device according to the embodiments may be applied to a vehicle that provides a self-driving service.

A vehicle that provides the self-driving service is connected to a PCC device for wired/wireless communication.

When the point cloud data transmission and reception device (PCC device) according to the embodiments is connected to a vehicle for wired/wireless communication, the device may receive and process content data related to an AR/VR/PCC service that may be provided together with the self-driving service and transmit the processed content data to the vehicle. In the case where the point cloud data transmission and reception device is mounted on a vehicle, the point cloud transmitting and reception device may receive and process content data related to the AR/VR/PCC service according to a user input signal input through a user interface device and provide the processed content data to the user. The vehicle or the user interface device according to the embodiments may receive a user input signal. The user input signal according to the embodiments may include a signal indicating the self-driving service.

Figure 24:
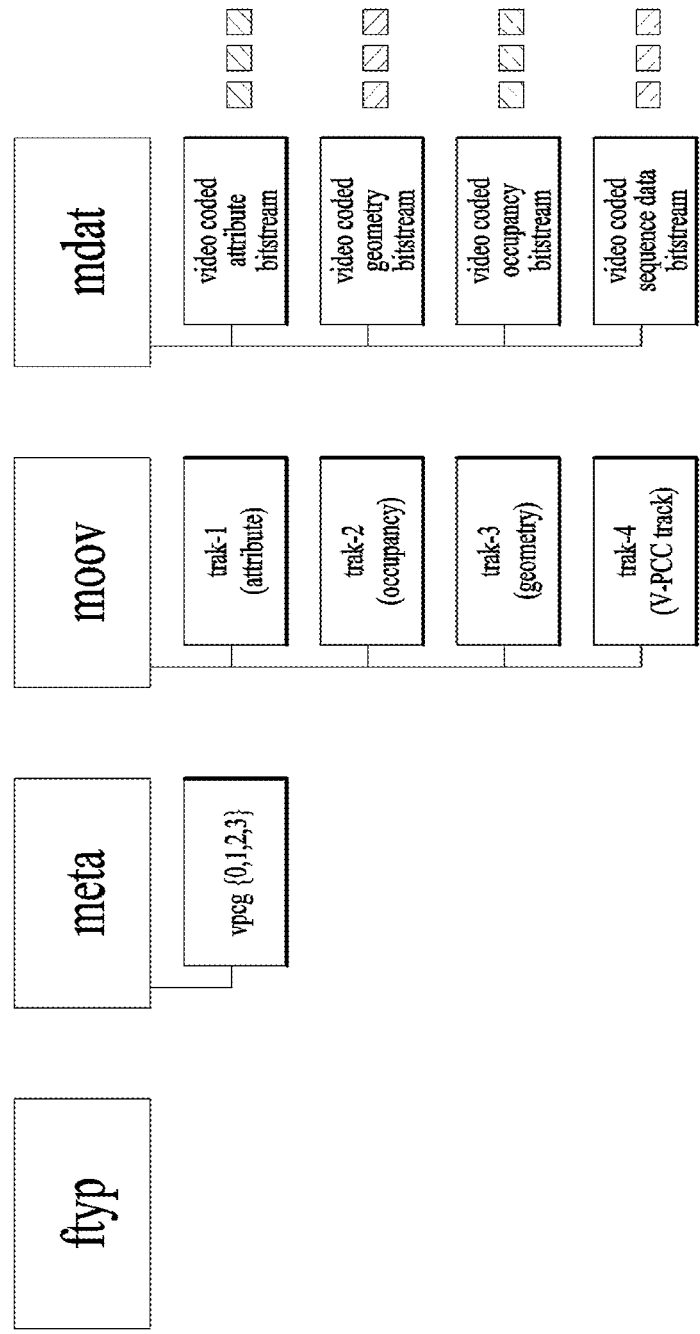
FIG. 24 illustrates an exemplary multi-track V-PCC file structure according to embodiments.

FIG. 24 illustrates an exemplary multi-track V-PCC file structure according to embodiments.

The V-PCC file according to the embodiments may be generated (encapsulated) and/or acquired (decapsulated) by the file/segment encapsulator 10003/decapsulator 10007 of FIG. 1, the file/segment encapsulator 20004/decapsulator 20005 of FIG. 20, the file/segment encapsulator 21009 of FIG. 21, the file/segment decapsulator 22000 of FIG. 22, or the like.

The V-PCC file structure according to the embodiments may have a DASH-based ISOBMFF format. Specifically, a file may be composed of information and/or boxes that may be referred to as ftyp, meta, moov, mdat, and the like.

The ftyp box according to the embodiments may provide file type or compatibility related information about a corresponding media file, and the movie box (also referred to as a moov box) may contain metadata for the media data of the media file. The mdat box may correspond to a box containing actual media data (e.g., audio and video) of the media file.

The meta box according to the embodiments may include a vpcg {0,1,2,3} box (V-PCC Group Box, which will be described in detail below). The vpcg box is a kind of sample entry type and may carry metadata about a V-PCC related configuration.

The moov box according to the embodiments may contain multiple tracks. For example, track 1 may contain an attribute, track 2 may contain an occupancy, track 3 may contain geometry, and track 4 may contain a V-PCC track. That is, the moov box may be a container that carries metadata for an attribute, an occupancy, geometry, a parameter/auxiliary information, and the like.

The moov box (movie box) according to the embodiments may be a box containing metadata about media data of a corresponding media file. The moov box may serve as a container for all metadata. The moov box may be a box of the highest layer among the metadata related boxes. According to an embodiment, only one moov box may be present in the media file.

According to embodiments, the ftyp box (file type box) may provide file type or compatibility related information about a corresponding media file. The ftyp box may include configuration version information about media data of a corresponding media file. The decoder may identify the media file with reference to the ftyp box.

The mdat according to the embodiments may contain a video coded attribute bitstream, a video coded geometry bitstream, a video coded occupancy bitstream, and a patch sequence data bitstream. That is, mdat may contain the above-described media data in the form of a bitstream.

The mdat box (media data box) may be a box containing actual media data of a corresponding media file. The media data may contain audio samples and/or video samples. The mdat box may serve as a container for storing these media samples.

According to embodiments, the video coded attribute bitstream, the video coded geometry bitstream, the video coded occupancy bitstream, and the patch sequence bitstream may be delivered through the mdat box.

The structure of each file is described in detail below.

The V-PCC bitstream may be composed of a set of V-PCC units. Each V-PCC unit may include a header having a field indicating the type and a payload.

Depending on the type of a V-PCC unit, the payload may include 2D video encoded information (for geometry, attribute, and occupancy map components of the encoded point cloud), non-video encoded information (for patch sequence data), or configuration and metadata information (for sequence parameter sets).

The general layout of the ISOBMFF V-PCC container may be configured as shown in the figure. The main design principle is to map V-PCC units in the V-PCC bitstream to individual tracks in the container file based on the type.

Based on this layout, the V-PCC ISOBMFF container may include the followings.

There may be a V-PCC track containing samples for carrying payloads of sequence parameter sets and a non-video encoded information V-PCC unit (e.g., a V-PCC sequence parameter set, V-PCC patch sequence data). This track may also provide a track that references other tracks containing samples for carrying the payload of a video compressed V-PCC unit.

One or more restricted video scheme tracks may include NAL units in which samples are for video-coded elementary streams for geometry, attributes, and occupancy map data (One or more restricted video scheme tracks where the samples contain NAL units for video-coded elementary streams for geometry, attribute, and occupancy map data).

In a method of transmitting point cloud data according to embodiments, a bitstream containing point cloud data is encapsulated based on a file. The file includes a first track containing signaling information about the point cloud data. According to embodiments, the first track may refer to a V-PCC track in the container structure containing V-PCC related data. The term "first track" may be changed according to embodiments.

In a method of receiving point cloud data according to embodiments, a bitstream containing point cloud data is decapsulated based on a file. The file includes a first track containing signaling information about the point cloud data.

In the present disclosure, the first track and the second track may be classified according to the type of data contained in the track. For example, regarding V-PCC data, there may be a track containing attribute information, a track containing occupancy information, a track containing geometry information, and a track containing other V-PCC data.

The point cloud data transmission method/device according to the embodiments may generate one or more file structures as shown in the figure in order to efficiently transmit encoded data, and the point cloud data reception method/device according to the embodiments may efficiently access and decode the data.

Hereinafter, specific syntax of data according to embodiments contained in a file structure shown in the figure will be described.

Figure 25:
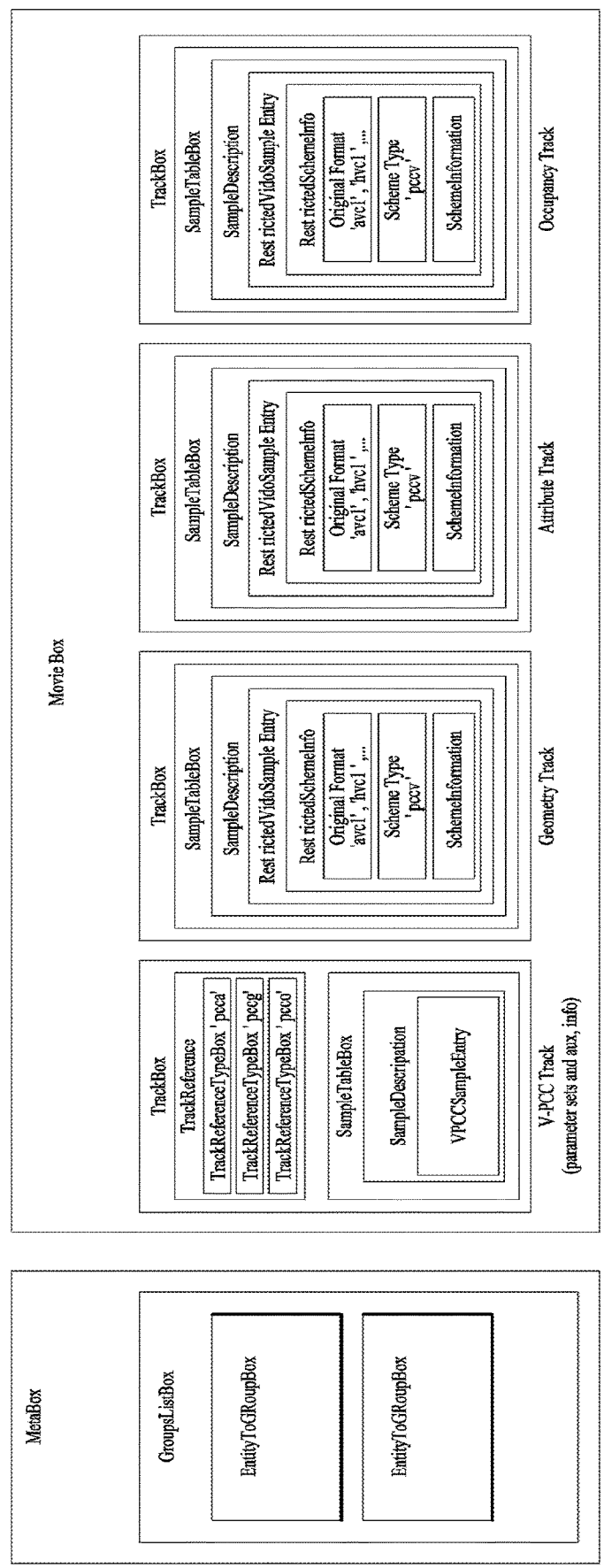
FIG. 25 illustrates an exemplary ISOBMFF V-PCC container structure according to embodiments.

FIG. 25 illustrates an exemplary ISOBMFF V-PCC container structure according to embodiments.

A container representing the above-described V-PCC file structure may be represented as shown in the figure. The V-PCC container may include MetaBox and MovieBox.

MetaBox according to the embodiments includes GroupListBox, which includes EntityToGroup and EntityToGroupBox. The group list may include a group and/or a group box, and each entity may include metadata about the group or group box. According to embodiments, the MetaBox may manage metadata related information as a group list and provide an entity for a group, such that the reception method/device according to the embodiments may efficiently access the metadata information about the group.

MovieBox according to the embodiments may include one or more TrackBoxes. For example, there may be a V-PCC track containing parameter sets or auxiliary information, a geometry track containing geometry, an attribute track containing an attribute, and an occupancy track containing an occupancy map. According to embodiments, Movie Box may provide movie related data through each track box and/or samples, such that the reception method/device according to the embodiments may efficiently access the movie related data based on a reference and/or a sample.

The V-PCC track of the movie box according to the embodiments may deliver parameter sets and/or auxiliary information in the form of samples. The V-PCC track box may include a track reference type box containing reference information between tracks according to a type (pcca, pccg, pcco, or the like). The V-PCC track box may also carry a sample table box that provides a sample description that includes a sample entry.

The geometry track of the moviebox according to the embodiments may carry a sample entry that contains scheme information about the geometry. For example, auxiliary information such as the original format (avcl, hvcl, etc.), scheme type (pccv), scheme information, and the like of the geometry information may be transmitted through the sample entry of the sample description in the sample table box.

The attribute track of the movie box according to the embodiments may carry a sample entry that contains scheme information about the attribute. For example, auxiliary information of the attribute information such as the original format (avcl, hvcl, etc.), scheme type (pccv), and scheme information may be transmitted through a sample entry of the sample description in the sample table box.

The occupancy track of the moviebox according to the embodiments may carry a sample entry that contains scheme information about the occupancy. For example, auxiliary information of the occupancy information, such as original format (avcl, hvcl, etc.), scheme type (pccv), and scheme information, may be transmitted through a sample entry of the sample description in the sample table box.

The V-PCC track may include TrackReference that references the track, and there may be a track reference that references type boxes such as pcca, pccg, and pcco.

In addition, the V-PCC track may include a sample table box that provides a sample description including a V-PCC sample entity.

The geometry track may include a sample table box, a sample description, a restricted video sample entry, restricted scheme information, an original format ('avcl', 'hvcl', etc.), a scheme type ('pccv'), and scheme information.

The attribute track may include a sample table box, a sample description, a restricted video sample entry, restricted scheme information, an original format ('avcl', 'hvcl', etc.), a scheme type ('pccv'), and scheme information.

The occupancy track may include a sample table box, a sample description, a restricted video sample entry, restricted scheme information, an original format ('avcl', 'hvcl'), a scheme type ('pccv'), and scheme information.

Figure 26:
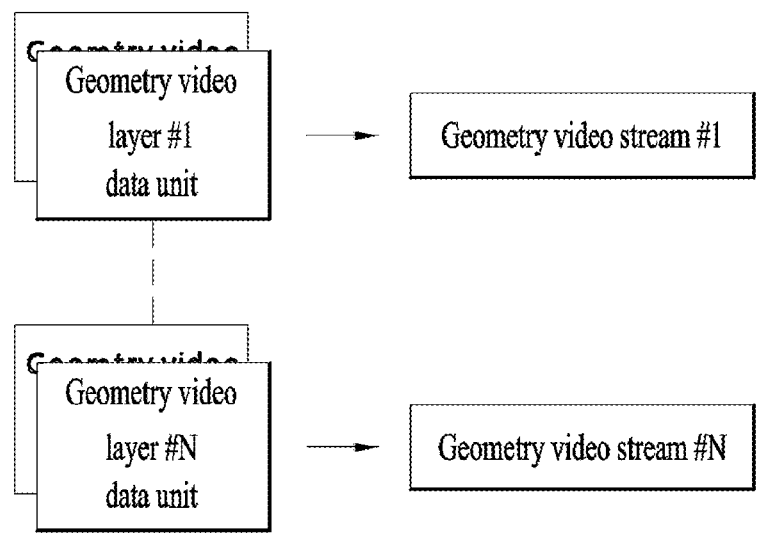
FIG. 26 illustrates an exemplary configuration of a geometry video stream according to embodiments.
Figure 26:
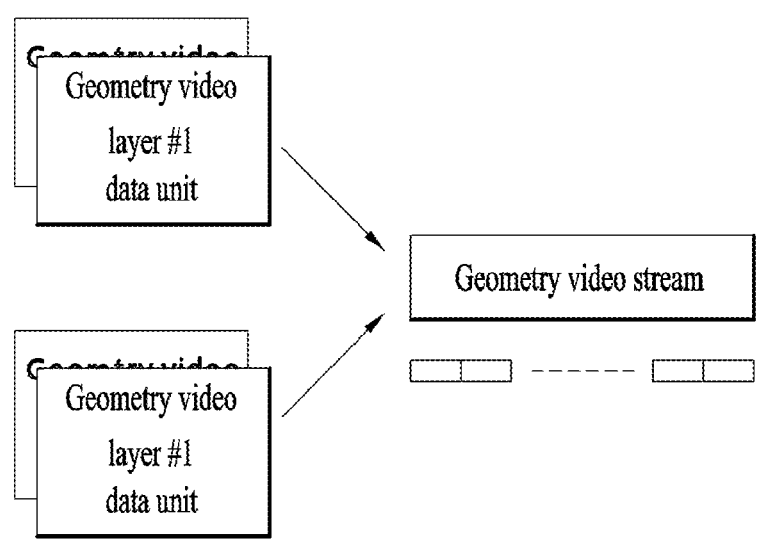

FIG. 26 illustrates an exemplary configuration of a geometry video stream according to embodiments.

According to the embodiments, the PCC encoder 10002 of FIG. 1, the V-PCC encoding process of FIG. 4, the V-PCC transmission operation of FIG. 18, and the V-PCC system of FIGS. 20 and 21 may generate geometry video streams shown in the figure.

All geometry or attribute layers may be positioned in separate video streams. All geometry or attribute layers may be positioned in each single geometry or attribute video stream.

When multiple layers of geometric video data are provided, the different layers of the geometry video data may be positioned in separate video streams, as shown at the top of the figure. A similar configuration may be established for the attribute video data.

When multiple layers of geometry video data are provided, all geometry video data may be positioned within a single video stream, as shown at the bottom of the figure. A similar configuration may be established for the attribute video data.

Synchronization between elementary streams in component tracks may be handled by ISOBMFF track timing structures (stts, ctts, and cslg, or equivalent mechanisms in movie fragments). Samples that contribute to the same point cloud frame across different video encoded component tracks and a V-PCC track may have the same component time.

The V-PCC parameter sets used for these samples may be the same decoding time as the composition time of the frame or a decoding time that precedes the composition time. Tracks of V-PCC content may be grouped within a file-level EntityToGroupBox VPCCGroupBox having a V-PCC specific grouping 4CC value ('vpcg'). VPCCGroupBox may be provided as an entry point for accessing V-PCC content in a container and may include initial metadata describing the V-PCC content. The entity group may be grouping of items that group tracks. Entities in the entity group may share a specific characteristic indicated by the grouping type or have a specific relationship.

Entity groups are indicated in GroupsListBox. The entity groups described in the GroupsListBox of file-level MetaBox refer to tracks or file-level items. The entity groups described in GroupsListBox of movie-level MetaBox refer to movie-level items. The entity groups described in GroupsListBox of track-level MetaBox refer to track-level items of the track. GroupsListBox contains EntityToGroupBoxes, each describing one entity group.

Groups List Box
Box Type:'grpl'
Container: MetaBox that is not contained in AdditionalMetadataContainerBox
Mandatory: No
Quantity: Zero or One GroupsListBox contains entity groups described for a file. This box contains a set of full boxes. Each of the boxes is referred to as EntityToGroupBox with four-character codes representing a defined grouping type.

GroupsListBox is not contained in AdditionalMetadataContainerBox.

When GroupsListBox is present in a file-level metabox, there may be no item ID value in ItemInfoBox in the same file-level metabox as the track ID value in TrackHeaderBox.

```
aligned(8) class GroupsListBox extends Box('grpl') {
}
```
Entity to Group box
Box Type: As specified below with the grouping_type value for the EntityToGroupBox
Container: GroupsListBox
Mandatory: No
Quantity: One or more EntityToGroupBox describes an entity group.

The box type (grouping_type) indicates the grouping type of the entity group. Each grouping_type code is associated with semantics that describe grouping. A grouping_type value is described below:

'altr': Items and tracks mapped to this grouping are replaceable with each other, and only one of them may be played (when the mapped items and tracks are part of a presentation, for example, displayable items or tracks) or may be processed by another method (when the mapped items or tracks are not part of the presentation, but metadata, for example).

The player may select and process a first entity from the list of entity ID values (entity_id). For example, it may decode and play mapped items and tracks which are part of the presentation. This configuration meets the application needs.

The entity ID value is mapped to only one grouping of type 'altr'. An alternative group of entities constitutes tracks and items which are mapped to the same entity group of type 'altr'.

Note: EntityToGroupBox contains a particular extension for grouping_type.

```
aligned(8) class Entity ToGroupBox(grouping_type, version, flags)
extends FullBox(grouping_type, version, flags) {
unsigned int(32) group_id;
unsigned int(32) num_entities_in_group;
for(i=0; i<num_entities_in_group; i++)
    unsigned int(32) entity_id;
// the remaining data may be specified for a particular grouping_type
}
```

The value of group_id is a non-negative integer that is assigned to specific grouping and is not equal to group_id of other EntityToGroupBoxes, the item_ID value of a hierarchy level (file, movie, or track) containing GroupsListBox, or the track_ID value (when GroupsListBox is contined at the file level).

num_entities_in_group indicates the number of entity_id values mapped to an entity group.

entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

V-PCC Group Box

Box Type:'vpcg'

Container: GroupListBox

Mandatory: Yes

Quantity: One or more

This box provides a list of the tracks that comprise V-PCC content.

This box provides a list of tracks containing the V-PCC content.

V-PCC content specific information, such as mapping of the attribute types and layers to the related tracks, is listed in this box. This information provides a convenient way to have an initial understanding of the V-PCC content. Multiple versions of encoded V-PCC components are listed in this box for flexible configuration of V-PCC content supporting various different client capabilities. V-PCC defined profile, tier, and level information are carried in this box.

```
aligned(8) class VPCCGroupBox( ) extends
EntityToGroupBox('vpcg', version, flags) {
    unsigned int(4)    layer_count_minus1;
    if(layer_count_minus1 >0) {
        unsigned int(6)    reserved =0;
        unsigned int(1)    multiple_layer_streams_present_flag;
        unsigned int(2)    multiple_layer_entities_present_flag
    }
    unsigned int(4)    attribute_count;
    unsigned int(1)    coverage_info_present_flag;
```

-continued

```
    unsigned int(1)    boundingbox_info_present_flag;
    for(i=0; i<num_entities_in_group; i++){
        unsigned int(32) entity_id[i];
        unsigned int(3)    reserved=0;
    unsigned int(5) data_type[i]:
    if (data_type[i] == 2) {
        if (multiple_layer_streams_present_flag
    || multiple_layer_entities_present_flag) {
        unsigned int(4)    layer_index[i];
        unsigned int(1)    pcm_video_flag[i];
        }
    }
    else if (data_type ==3){
        unsigned int(1)    reserved =0;
        unsigned int(7)    attribute_index[i];
        unsigned int(4)    attribute_type_id[i];
        unsigned int(8)    attribute_dimension_minus1[i];
        if (multiple_layer_streams_present_flag
    ||multiple_layer_entities_present_flag){
        unsigned int(4)    layer_index[i];
        unsigned int(1)    pcm_video_flag[i];
        unsigned int(3)    reserved = 0;
        }
    }
    unsigned int(4)    reserved 0;
    }
    if(coverage_info_present_flag) {
    PCCCoverageStruct( );
    }
    if(boundingbox_info_present _flag){
        PCCBoundingBoxStruct( );
    }
    vpcc_profile_tier_level( ) //defined in V-PCC spec
}
```

Referring to FIG. 26, the upper part of FIG. 26 illustrates a case where multiple_layer_streams_present_flag is 1, and the lower part of FIG. 26 illustrates a case where multiple_layer_streams_flag is 0.

layer_count_minus1 plus 1 represents the number of layers used for encoding of geometry and attribute data.

When multiple_layer_streams_present_flag is 0, this indicates that all geometry or attribute layers are positioned in each single geometry or attribute video stream. When multiple_layer_entities_present_flag is 1, this indicates that all geometry or attribute layers are positioned in individual video streams.

Figure 27:
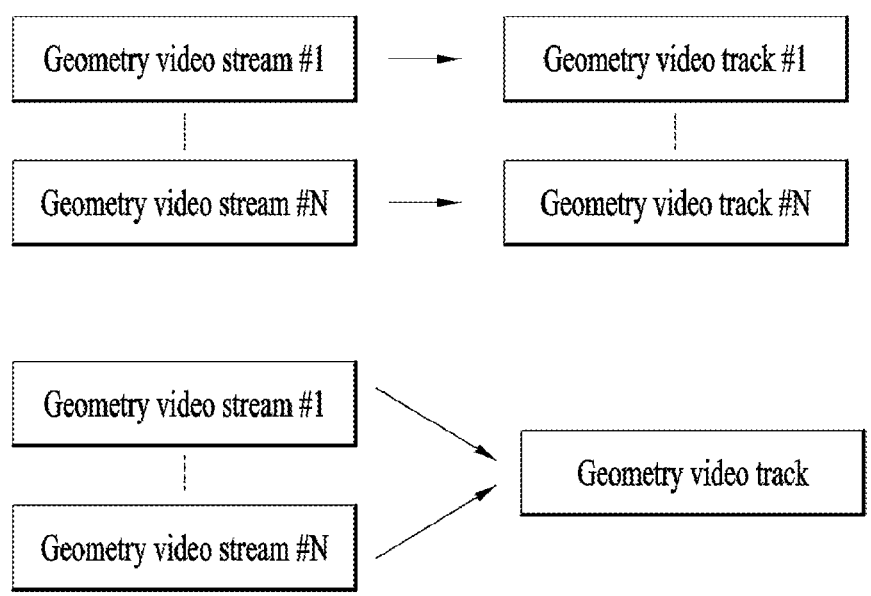
FIG. 27 illustrates an example of multiple_layer_entities_present_flag according to embodiments.

FIG. 27 illustrates an example of multiple_layer_entities_present_flag according to embodiment.

The upper part of FIG. 27 illustrates a case where multiple_layer_entities_present_flag is 1, and the lower part of FIG. 27 illustrates a case where multiple_layer_entities_present_flag is 0.

When multiple_layer_entities_present_flag is 0, this indicates that all geometry or attribute layers are present in each of the single geometry or attribute video tracks. When multiple_layer_entities_present_flag(or sps_multiple_layer_entities_present_flag) is 1, this indicates that all geometry or attribute layers are present in individual video tracks.

coverage_info_present_flag indicates that coverage information about a point cloud is present. When coverage_info_present_flag is 1, PCCCoverageStruct( ) is present.

boundingbox_info_present_flag indicates that bounding box information about the point cloud is present. When boundingbox_info_present_flag is 1, PCCCoverageStruct( ) is present.

attribute_count indicates the number of attributes associated with the point cloud.

layer_index[i] indicates the index of a layer of geometry or attribute video data in a referenced entity (track).

When pcm_video_flag[i] is 1, this indicates that the associated geometry or attribute video track contains PCM coded points video. vpcc_pcm_video_flag equal to 0 indicates that the associated geometry or attribute video track contains non PCM coded points.

attribute_index[i] indicates an index of attribute data delivered in a referenced attribute entity (or track).

attribute_dimension_minus1[i] plus 1 indicates a dimension (i.e., the number of channels) of an attribute delivered in a referenced entity.

data_type indicates the type of PCC data in a referenced track. It may be expressed as the following table.

TABLE 1

V-PCC Track Types

| Value | V-PCC Track Type |
|---|---|
| 0 | reserved for ISO use |
| 1 | V-PCC track (carrying V-PCC patch sequence data) |
| 2 | geometry video track |
| 3 | attribute video track |
| 4 | occupancy video track |
| 5~15 | reserved for ISO use | entity_id[i] is resolved to an item when an item with item_ID equal to entity_id is present in the hierarchy level (file, movie or track) that contains the GroupsListBox. Alternatively, entity_id[i] is resolved to a track when a track with track_ID equal to entity_id is present and the GroupsListBox is contained in the file level. Entity id represents an identifier of an associated track. Entity_id[i] represents an identifier of a track associated with the following information.

attribute_type_id[i] indicates an attribute type of attribute video data carried in the referenced entity (or track). It may be expressed as shown in the following table.

| attribute_type_id | Attribute type |
|---|---|
| 0 | Texture |
| 1 | Material ID |
| 2 | Transparency |
| 3 | Reflectance |
| 4 | Normals |
| 5 . . . 14 | Reserved |
| 15 | Unspecified | vpcc_profile_tier_level( ) is identical to profile_tier_level( ) described as follows.

| | Descriptor |
|---|---|
| profile_tier_level( ) { | |
| ptl_tier_flag | u(1) |
| ptl_profile_idc | u(7) |
| ptl_level_idc | u(8) |
| } | | ptl_tier_flag indicates a codec profile tier used for encoding V-PCC content.

ptl_profile_idc represents profile information to which a coded point cloud sequence conforms.

ptl_level_idc indicates the level of a codec profile to which the coded point cloud sequence conforms.

V-PCC Track

The entry point of each V-PCC content may be represented by a unique V-PCC track. An ISOBMFF file may contain multiple V-PCC contents, and thus multiple V-PCV tracks may be present in the file. The V-PCC tracks are identified by the media handler type 'vpcc'. VPCCSampleEntry is used in sample description of the tracks.

Sample Entry
Sample Entry Type: 'vpc1'
Container: SampleDescriptionBox ('stsd')
Mandatory: No
Quantity: 0 or 1

The track sample entry type 'vpc1' is used.

```
aligned(8) class VPCCSampleEntry( ) extends SampleEntry ('vpc1') {
  unsigned int(4) numOfSequenceParameterSets;
  unsigned int(4) numOfPatchSequenceParameterSets;
  for (i=0; i< numOfSequenceParameterSets; i++) {
    unsigned int(16) sequenceParameterSetLength ;
    bit(8*sequenceParameterSetLength) sequenceParameterSet;
  }
  for (i=0; i< numOfPatchSequenceParameterSets; i++) {
    unsigned int(16) patchSequenceParameterSetLength;
    bit(8*sequenceParameterSetLength) patchSequenceParameterSet;
  }
}
``` numOfSequenceParameterSets indicates the number of V-PCC sequence parameter sets.

numOfPatchSequenceParameterSets indicates the number of VPCC patch sequence parameter sets.

sequenceParameterSetLength indicates the byte length of a VPCC sequence parameter set. sequenceParameterSetUnit contains sequence parameter set data.

patchSequenceParameterSetLength indicates the byte length of the VPCC patch sequence parameter set. patchSequenceParameterSetUnit contains patch sequence parameter set data.

Figure 28:
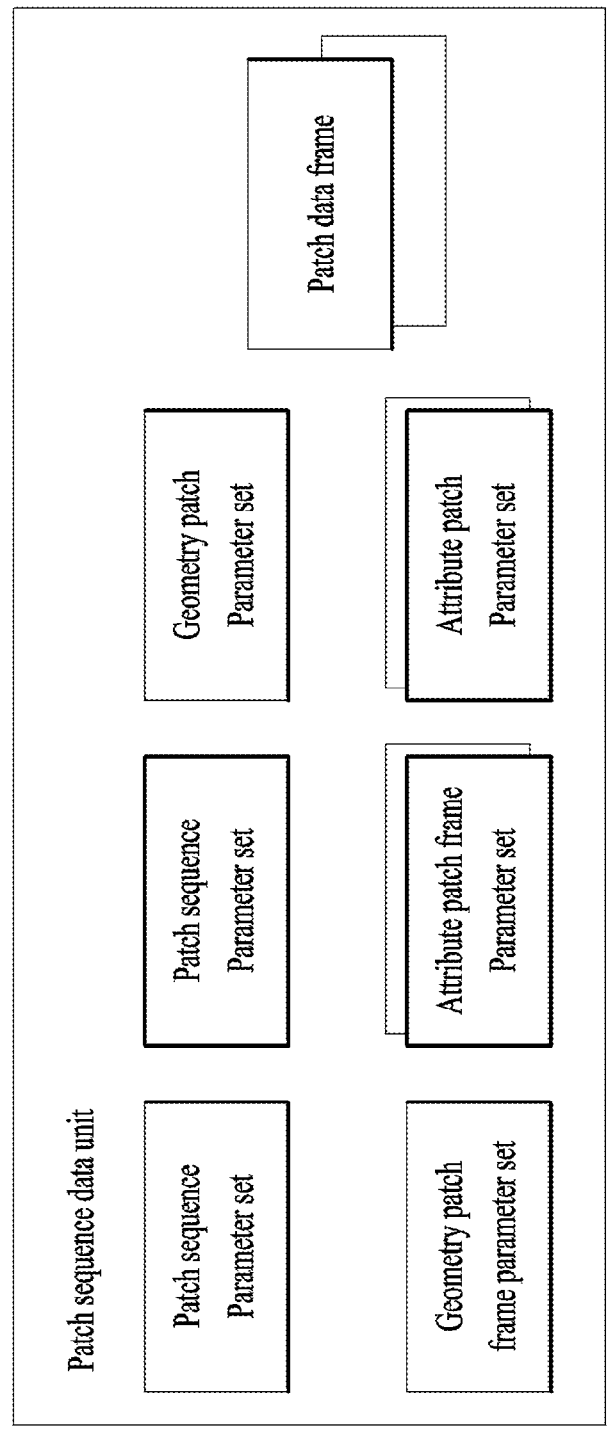
FIG. 28 shows an exemplary structure of a patch sequence data unit according to the embodiments.

FIG. 28 shows an exemplary structure of a patch sequence data unit according to the embodiments.

V-PCC tracks according to the embodiments may contain the data described below.

Sample Format

Each sample in the V-PCC track corresponds to a single point cloud frame.

The samples corresponding to this frame in various component tracks have the same composition time as the V-PCC sample for the frame in the V-PCC track.

Each V-PCC sample contains one or more vpcc_unit instances with a limitation of only containing patch_sequence_data V-PCC units.

As shown in the figure, a patch sequence data unit may include a patch sequence parameter set, a geometry frame parameter set, an attribute frame parameter set, a geometry patch parameter set, an attribute patch parameter set, a patch frame parameter set, and patch frame layer units (including a patch frame header and a patch frame data unit).

V-PCC Video Tracks

A restricted video scheme type may be defined for such video-coded tracks because it is not meaningful to display frames decoded from attribute, geometry or occupancy map tracks without reconstruction of a point cloud on the player side. V-PCC video tracks use 4CC 'pccv' as in the case of a scheme type for this restricted video scheme.

Use of a V-PCC video scheme for the restricted video sample entry type 'resv' indicates that the decoded pictures contain attribute, geometry, or occupancy map data of the point cloud.

Use of the V-PCC video scheme is represented by the same scheme_type as 'pccv' (video base point cloud video) in SchemeTypeBox of RestrictedSchemeInfoBox.

This box is a container containing boxes representing PCC specific information of this track. VPCCVideoBox provides PCC specific parameters that may be applied to all samples in the track.

```
Box Type:'pccv'
Container: SchemeInformationBox
Mandatory:   Yes, when scheme_type is equal to 'pccv'
Quantity: Zero or one
aligned(8) class VPCCVideoBox extends Box('pccv') {
    PCCCoverageInformationBox( );
    PointCloudBBBox( );
        SpatialRelationship2DSourceBox( );
        SubPictureRegionBox( );
}
```

When PCCCompositeGroupBox or SpatialRelationship2DDescriptionBox is present in the track, SpatialRelationship2DSourceBox provides the total width and height of the composite picture including all the data of one V-PCC component (For example, the geometry, attributes, occupancy map, and SubPctureRegionBox provide 2D region information corresponding to the point cloud data carried in this track for the composite picture).

Point Cloud Coverage Information

This box provides information about the coverage of the point cloud data carried in this track (when this box is contained in VPCCVideoBox). Alternatively, the box provides information about the coverage of the composed point cloud data (when the box is included in VPCCGroupBox, PCCCompositeGroupBox, or SpatialRelationship2DDescriptionBox).

```
Box Type:'pcci'
Container:VPCCVideoBox, VPCCGroupBox, PCCCompositeGroupBox,
or SpatialRelationship2DDescriptionBox
Mandatory:   No
Quantity: Zero or one
aligned(8) class PCCCoverageInformationBox extends
FullBox('pcci', 0, 0) {
    PCCCoverageStruct ( );
}
```

Point Cloud Coverage Structure

The fields in this structure provide the coverage, which is expressed by one or more regions covered by part or all of the point cloud data.

```
aligned(8) class PCCCoverageStruct( ){
    unsigned int(8)       num_regions;
    for (i = 0; i < num_regions; i++) {
        unsigned int(8)       coverage_shape_type;
        if(coverage_shape_type == 1) BoundingBox(i);
            else if ((coverage_shape_type == 2) SphereRegionStruct(i);
    }
}
``` num_regions indicates the number of regions to represent the coverage of part or all of the point cloud data.

coverage_shape_type indicates a shape of regions representing the point cloud coverage. When it is 1, the shape of the coverage is cuboid. When coverage_shape_type is 2, the shape of the coverage is sphere.

```
aligned(8) class SphereRegionStruct (i){
    unsigned int(8) sphere_id[i];
    unsigned int(32) sphere_center_offset_x[i];
    unsigned int(32) sphere_center_offset_y[i];
    unsigned int(32) sphere_center_offset_z[i];
    unsigned int(32) sphere_radius [i];
}
``` sphere_id[i] indicates the identifier of the i-th sphere in the Cartesian coordinates.

sphere_center_offset_x[i] indicates the x offset of the i-th sphere center in the Cartesian coordinates.

sphere_center_offset_y[i] indicates the y offset of the i-th sphere center in the Cartesian coordinates.

sphere_center_offset_z[i] indicates the z offset of the i-th sphere center in the Cartesian coordinates.

sphere_radius[i] indicates the radius of the i-th sphere in the Cartesian coordinates.

Point Cloud Bounding Box Information

This box provides information on the bounding box information of point cloud data carried in this track (when the box is contained in VPCCVideoBox) or the bounding box information of the composed point cloud data (when the box is contained in VPCCGroupBox, PCCCompositeGroupBox, or SpatialRelationship2DDescriptionBox).

```
Box Type:'bbib'
Container:VPCCVideoBox, VPCCGroupBox, PCCCompositeGroupBox
or SpatialRelationship2DDescriptionBox
Mandatory:   No
Quantity: Zero or one
aligned(8) class PointCloudBBBox extends FullBox('bbib', 0, 0) {
    PCCBoundingBoxStruct ( );
}
```

Figure 29:
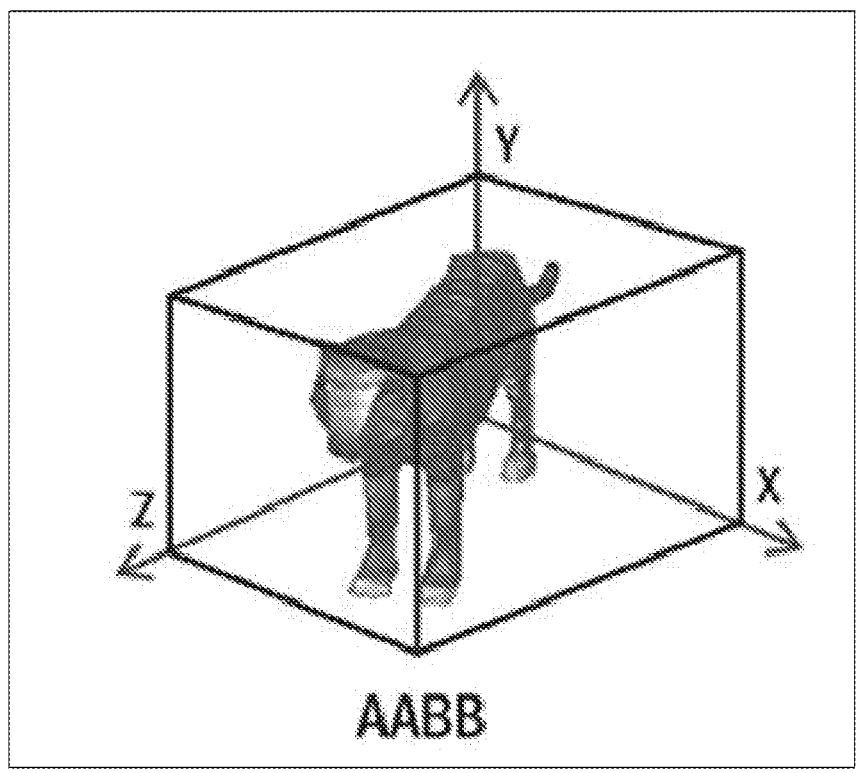
FIG. 29 illustrates a bounding box according to embodiments.

FIG. 29 illustrates a bounding box according to embodiments.

When a target that is the object of the point cloud data is positioned in a 3D space, the method/device according to the embodiments may represent the object of the point cloud in the form of a box based on a coordinate system. This box is called a bounding box.

The method/device according to the embodiments may encode (or decode) the point cloud data based on the bounding box. Signaling information (metadata or parameter set, etc.) related to the bounding box described below may be included in the patch information, the occupancy map, the auxiliary patch information, and the like shown in FIG. 4, may be included in the occupancy map, the auxiliary patch information, and the like in a bitstream containing the point cloud data as shown in FIG. 16, may be encoded by the metadata encoder 18005 of FIG. 18, and may be decoded by the metadata decoder 19002 of FIG. 19. In addition, such information may be included in the metadata generated by the point cloud preprocessor (or processor) 20001, and may be encapsulated and delivered in the form of a file by the file/segment encapsulator 20004, 21009 as shown in FIGS. 20 and 21. The information may be contained in the received bitstream as shown in FIG. 22 and be acquired by the file/segment decapsulator 22000 and the video/image decoders 22001 and 22002 so as to be used by the point cloud processor (or processing unit) 22003 and the point cloud renderer.

Signaling information (or metadata) described below may be delivered by the V-PCC container based on the file type, as shown in FIG. 25.

PCC Bounding Box Information Structure

As shown in this Figure, the PCC Bounding box information structure may include information about the bounding box of a point cloud object or the bounding box of a partial region of the point cloud object.

```
aligned(8) class PCCBoundingBoxStruct( ){
    unsigned int(8) num_boundingbox;
    for (i = 0; i < num_boundingbox; i++) {
        BoundingBox(i);
        2DRegions(i);
    }
}
aligned(8) class BoundingBox (i){
    unsigned int(8) boundingbox_id[i];
        BoundingBoxOffset(i);
    BoundingBoxScale(i);
    BoundingBoxVolume(i);
}
aligned(8) class BoundingBoxOffset (i){
    unsigned int(32) boundingbox_offset_x[i];
    unsigned int(32) boundingbox_offset_y[i];
    unsigned int(32) boundingbox_offset_z[i];
}
aligned(8) class BoundingBoxScale (i){
    unsigned int(32) boundingbox_scale_x_factor[i];
    unsigned int(32) boundingbox_scale_y_factor[i];
    unsigned int(32) boundingbox_scale_z_factor[i];
}
aligned(8) class BoundingBoxVolume (i){
    unsigned int(32) boundingbox_size_x_width[i];
    unsigned int(32) boundingbox_size_y_height[i];
    unsigned int(32) boundingbox_size_z_depth[i];
}
aligned(8) class 2DRegions(i) {
    unsigned int(8) num_regions;
    for (k= 0; k < num_regions; k++) {
        RectRegion(k);
    }
}
aligned(8) class RectRegion(i) {
    unsigned int(16) object_x[i];
    unsigned int(16) object_y[i];
    unsigned int(16) object_width[i];
    unsigned int(16) object_heigh[i]t;
}
``` num_boundingbox indicates the number of bounding boxes.

boundingbox_id[i] indicates the identifier of the i-th bounding box in the Cartesian coordinate system.

boundingbox_offset_x[i] indicates the x offset of the i-th bounding box in the Cartesian coordinate system.

boundingbox_offset_y[i] indicates the y offset of the i-th bounding box in the Cartesian coordinate system.

boundingbox_offset_z[i] indicates the z offset of the i-th bounding box in the Cartesian coordinate system.

boundingbox_x_scale_factor[i] indicates the scale factor of x-axis of the i-th bounding box in the Cartesian coordinate system.

boundingbox_y_scale_factor[i] indicates the scale factor of y-axis of the i-th bounding box in the Cartesian coordinate system.

boundingbox_z_scale_factor[i] indicates the scale factor of z-axis of the i-th bounding box in the Cartesian coordinate system.

boundingbox_size_x_width[i] indicates the width of the i-th bounding box in the Cartesian coordinate system.

boundingbox_size_y_height[i] indicates the height of the i-th bounding box in the Cartesian coordinate system.

boundingbox_size_z_depth[i] indicates the depth of the i-th bounding box in the Cartesian coordinate system.

num_regions indicates the number of regions where point cloud data within this bounding box is mapped in pictures.

RectRegion provides 2D rectangular region information (x and y offsets, width and height) to which the point cloud data in the decoded picture is mapped.

V-PCC Component Track Grouping

Same V-PCC component of point cloud data may be carried in one or more V-PCC video tracks. For example, as described below, a texture attribute of one point cloud object may be divided into three parts and each of the part may be carried in a separate track.

TrackGroupTypeBox with track_group_type equal to 'pccg' indicates that this track contains a part of V-PCC component (e.g., geometry, attribute, occupancy map). The tracks that have the same value of track_group_id within PCCCompositeGroupBox form one V-PCC component (e.g., geometry, attribute, occupancy map).

```
aligned(8) class PCCCompositeGroupBox extends
TrackGroupTypeBox('pccg')
{
    PCCCompositeInfoBox( );
    PCCCoverageInformationBox ( );
    PointCloudBBBox( );
    SpatialRelationship2DSourceBox( );
    SubPictureRegionBox( );
}
aligned(8) class PCCCompositeInfoBox( ) extends FullBox('pcgi', 0, 0)
{
    unsigned int(5) data type;
    unsigned int(3) layer index;
    if (data_type ==3){
        unsigned int(1)   reserved =0;
        unsigned int(7)   attribute_index;
        unsigned int(4)   attribute_type_id;
        unsigned int(8)   attribute_dimension_minus1;
    }
}
``` data_type indicates the type of PCC data in a track and may be represented as listed in the table below.

TABLE

| V-PCC Track Types | |
|---|---|
| Value | V-PCC Track Type |
| 0 | reserved for ISO use |
| 1 | V-PCC track (carrying V-PCC patch sequence data) |
| 2 | geometry video track |
| 3 | attribute video track |
| 4 | occupancy video track |
| 5~15 | reserved for ISO use | layer_index indicates the index of the layer of the geometry or attribute video data in the track.

attribute_index indicates the index of the attribute data carried in the track.

attribute_dimension_minus1 plus 1 indicates the dimension (i.e., the number of channels) of the attribute carried in the track.

attribute_type_id indicates the attribute type of the attribute data in the track.

| attribute_type_id | Attribute type |
|---|---|
| 0 | Texture |
| 1 | Material ID |
| 2 | Transparency |

-continued

| attribute_type_id | Attribute type |
|---|---|
| 3 | Reflectance |
| 4 | Normals |
| 5 ... 14 | Reserved |
| 15 | Unspecified |

```
aligned(8) class SpatialRelalionship2DSourceBox )
extends FullBox('2dsr', 0, 0
{
  unsigned int(32) totalwidth;
  unsigned int(32) total_height;
  unsigned int(32) source_id;
}
aligned(8) class SubPictureRegionBox extends FullBox('sprg',0,0) {
  unsigned int(16) object_x;
  unsigned int(16) object_y;
  unsigned int(16) object_width;
  unsigned int(16) object_height;
  bit(14) reserved = 0;
  unsigned int(1) track_not_alone_flag;
  unsigned int(1) track_not_mergable_flag;
}
aligned(8) class SpatialRelationship2DDescriptionBox extends
TrackGroupTypeBox('2dcc') {
  // track_group_id is inherited from TrackGroupTypeBox;
  SpatialRelationship2DSourceBox( ):
  SubPictureRegionBox ( );
}
``` total width specifies, in pixel units, the maximum width in the coordinate system of the SpatialRelationship2DDescriptionBox track group. The value of total_width shall be the same in all instances of SpatialRelationship2DDescriptionBox with the same value of track_group_id.

total_height specifies, in pixel units, the maximum height in the coordinate system of the SpatialRelationship2DDescriptionBox track group. The value of total_height shall be the same in all instances of SpatialRelationship2DDescriptionBox with the same value of track_group_id.

The source_id parameter provides a unique identifier for the source. It defines a coordinate system associated with this source.

object_x specifies the horizontal position of the top-left corner of the samples in this track within the coordinate system specified by the corresponding spatial relationship track group.

object_y specifies the vertical position of the top-left corner of the samples in this track within the coordinate system specified by the corresponding spatial relationship track group.

object_width specifies the width of the samples in this track within the coordinate system specified by the corresponding spatial relationship track group.

object_height specifies the height of the samples in this track within the coordinate system specified by the corresponding spatial relationship track group.

track_not_alone_flag equal to 1 indicates that the current sub-picture track is not intended to be presented alone without at least one other sub-picture track belonging to the same track group of grouping type '2dcc'.

track_not_mergable_flag equal to 1 indicates that the video bitstream carried in the current sub-picture track may not be merged with the video bitstream carried in any other sub-picture tracks belonging to the same track group of grouping type '2dcc'.

Dynamic Bounding Box Information

A point cloud object may move over the time. The dynamic bounding box timed metadata track indicates the 3D bounding box information of point cloud data is dynamically changing over time.

The track sample entry type 'dybb' is used. The sample entry of this sample entry type may be specified as follows:

```
class DynamicBBSampleEntry extends
MetaDataSampleEntry('dybb') {
  unsigned int(8)  num_boundingbox;
  for (i = 0; i < num_boundingbox; i++) {
    BoundingBox(i);
      2DRegions(i);
    unsigned int(1) dynamic_bb_offset_flag[i];
      unsigned int(1) dynamic_bb_scale_flag[i];
    unsigned int(1) dynamic_bb_volume_flag[i];
      unsigned int(1) dynamic_2d_regions_flag[i];
    bit(5) reserved = 0;
  }
    unsigned int(32) overall_bb_offset_x;
  unsigned int(32) overall_bb_offset_y;
  unsigned int(32) overall_bb_offset_z;
    unsigned int(32) overall_bb_scale_x;
    unsigned int(32) overall_bb_scale_y;
    unsigned int(32) overall_bb_scale_z;
    unsigned int(32) overall_bb_x_width;
    unsigned int(32) overall_bb_y_height;
    unsigned int(32) overall_bb_z_depth;
}
``` num_boundingbox indicates the number of bounding boxes carried in the track.

BoundingBox(i) indicates the i-th intial bounding box information of point cloud.

2DRegions(i) indicates one or more rectangular regions where point cloud within the i-th bounding box is projected in the coded pictures.

dynamic_bb_offset_flag[i] equal to 0 specifies that the offset of the i-th bounding box of the point cloud remain unchanged in all samples referring to this sample entry. dynamic_bb_offset_flag[i] equal to 1 specifies that the offset of the i-th bounding box of the point cloud are indicated in the sample.

dynamic_bb_scale_flag[i] equal to 0 specifies that the scale factor of all axes of the i-th bounding box of the point cloud remain unchanged in all samples referring to this sample entry. dynamic_bb_scale_flag[i] equal to 1 specifies that the scale factors of all axes of the i-th bounding box of the point cloud are indicated in the sample.

dynamic_bb_volume_flag[i] equal to 0 specifies that the width, height, or depth of the i-th bounding box of the point cloud remain unchanged in all samples referring to this sample entry. dynamic_bb_volume_flag[i] equal to 1 specifies that the width, height, or depth of the i-th bounding box of the point cloud is indicated in the sample.

dynamic_2d_regions_flag[i] equal to 0 specifies that one or more rectangular regions where point cloud within the i-th bounding box is projected in the coded pictures remain unchanged in all samples referring to this sample entry. dynamic_2d_regions_flag[i] equal to 1 specifies that one or more rectangular regions where point cloud within the i-th bounding box is projected in the coded pictures are indicated in the sample.

overall_bb_offset_x, overall_bb_offset_y, and overall_bb_offset_z indicate the offsets of the overall bounding box (wherein the overall bounding box contains all bounding boxes signaled in all samples referring to this sample entry).

overall_bb_scale_x, overall_bb_scale_y, and overall_bb_scale_z indicate the scale factors of axes of the overall bounding box.

overall_bb_x_width, overall_bb_y_height, and overall_bb_z_depth indicate the width, height, or depth of the overall bounding box.

The sample syntax of this sample entry type ('dybb') may be specified as follows:

```
aligned(8) DynamicBBSample( ) {
    for (i = 0; i < num_boundingbox; i++) {
        BoundingBox(i);
        if(dynamic_bb_offset_flag[i])BoundingBoxOffset(i);
        if(dynamic_bb_scale_flag[i]) BoundingBoxScale(i);
            if(dynamic_bb_volume_flag[i])    BoundingBoxVolume(i);
        if(dynamic_2d_regions_flag[i])    2DRegions(i);
    }
}
```

BoundingBox(i) indicates the i-th bounding box information of a point cloud.

When dynamic_bb_offset_flag[i] is equal to 1, the offset of the i-th bounding box (BoundBoxOffset(i)) is presented. When dynamic_bb_scale flag[i] is equal to 1, the scale factors of axes of the i-th bounding box (BoundBoxScale(i)) are presented.

When dynamic bb_volume_flag[i] is equal to 1, the width, height, or depth of the i-th bounding box (BoundBoxVolume (i)) are presented.

When dynamic_2d_regions_flag[i] is equal to 1, one or more rectangular regions where point cloud within the i-th bounding box is projected in the coded pictures (2DRegions (i)) are presented.

When this timed metadata track is linked to one or more media tracks with a 'cdsc' track reference, it describes each media track individually. For example, each PCC component track, e.g., geometry, attribute, occupancy map, may be linked with this timed metadata track individually, to indicate dynamically changing 3D bounding box information over time.

Alternatively, when one or more track carries data associated with point cloud objects, these tracks may belong to the same track group. This timed metadata track containing a 'cdtg' track reference describes the referenced media tracks and track groups collectively. The 'cdtg' track reference may be present in this timed metadata tracks. This timed metadata track containing 'cdtg' track reference to a track_group_id value describes tracks in the track group.

Figure 30:
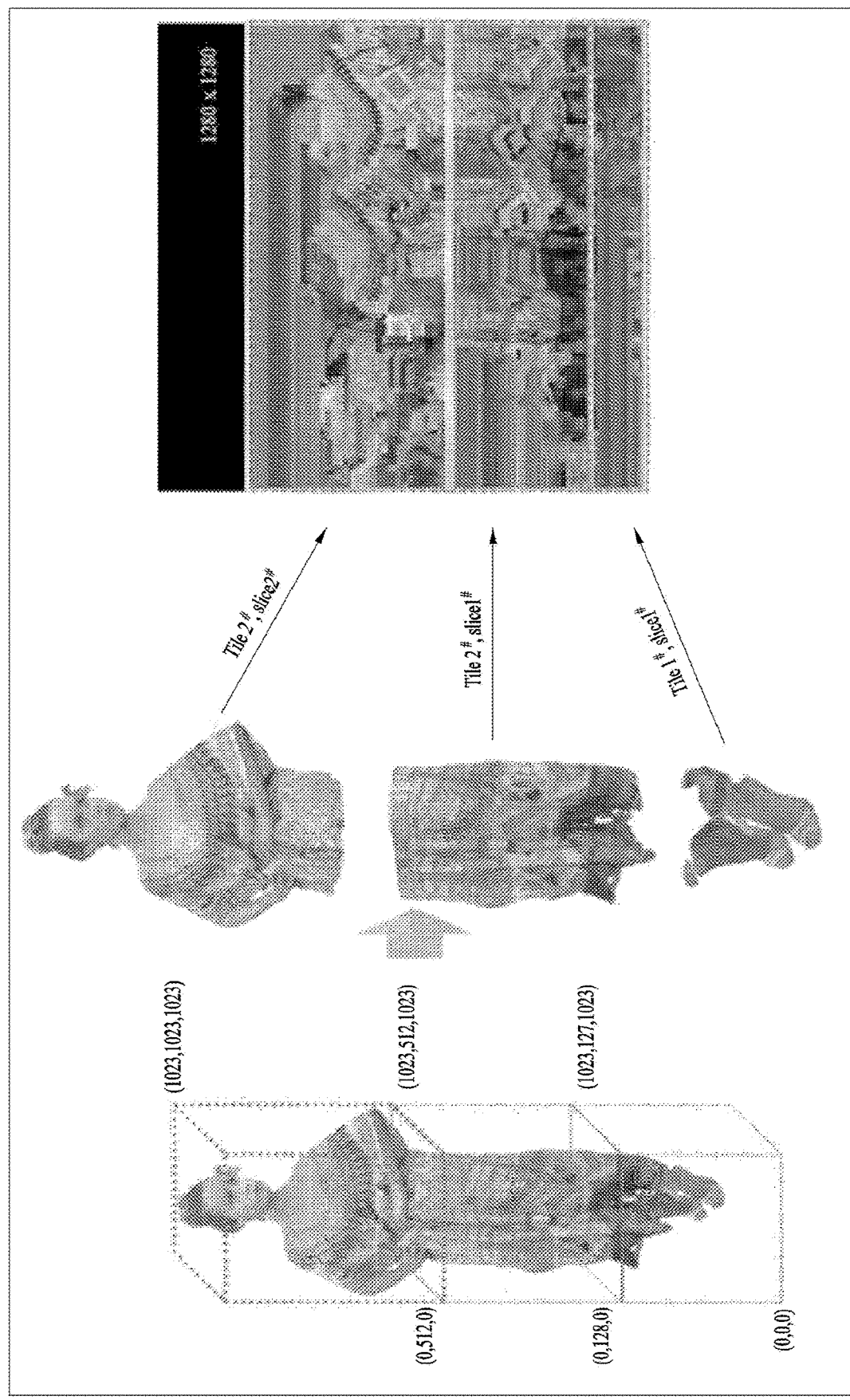
FIG. 30 illustrates an example of point cloud track grouping according to embodiments.

FIG. 30 illustrates an example of point cloud track grouping according to embodiments.

The spatial region (or space) containing an object of the point cloud according to embodiments may be divided. Thus, the method/device according to the embodiments may provide partial access of the point cloud data.

The figure shows how a bounding box is divided into three spatial regions. According to embodiments, a spatial region containing the entire object may be referred to as a box, and the divided spatial regions may be referred to as bounding boxes. For example, three bounding boxes may have respective coordinate values (or offset values on the x, y, and z axes) based on the coordinate system, and the object may be partially accessed based on the divided bounding box.

Point Cloud Track Grouping

As shown in the figure, point cloud data may be divided into one or more spatial regions. Each spatial region may be represented by a 3D coordinate space (x, y, z axis offsets, x-axis width, y-axis height, z-axis depth, etc.) that surrounds the region.

Figure 31:
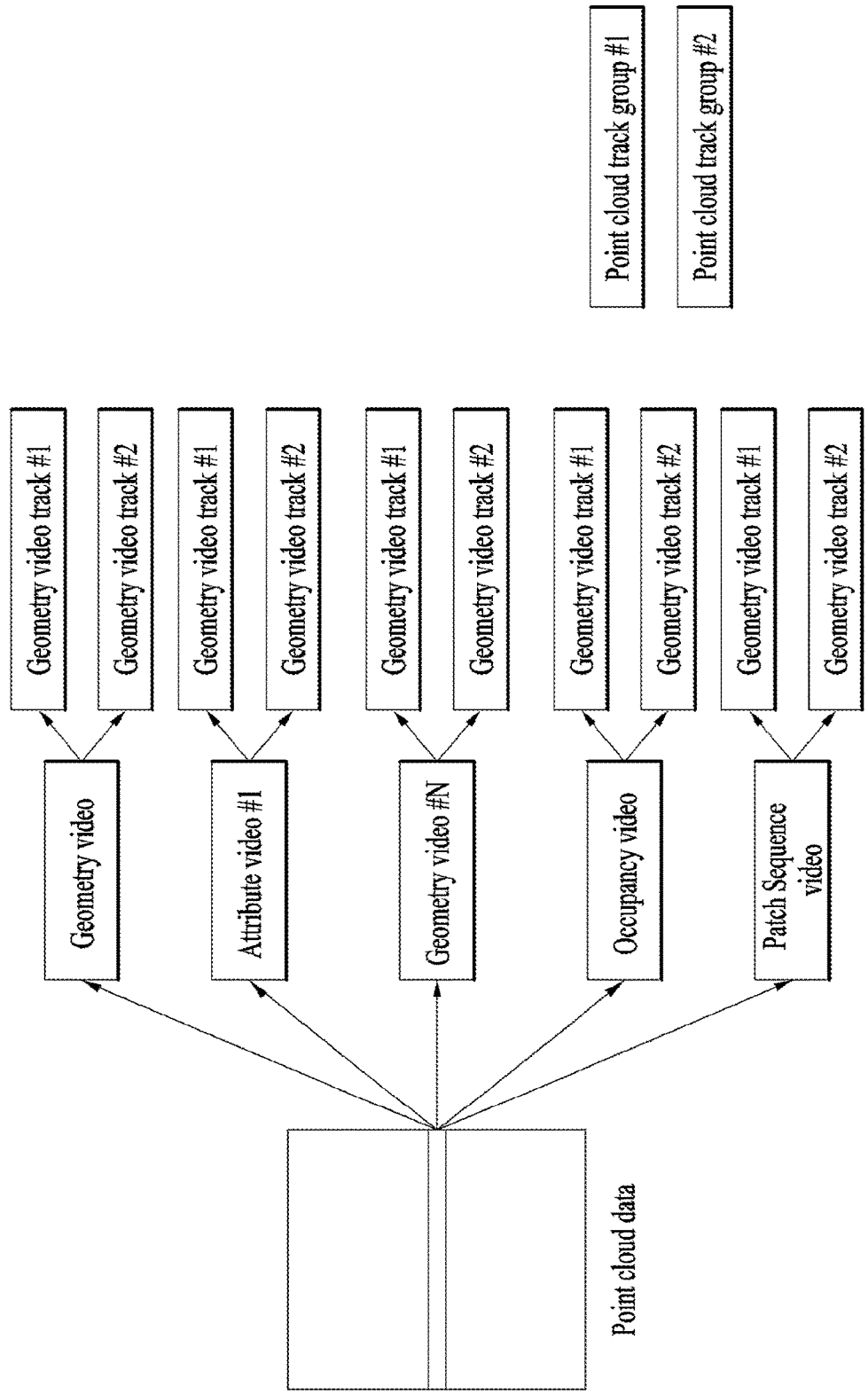
FIG. 31 illustrates tracks of point cloud data according to embodiments.

FIG. 31 illustrates tracks of point cloud data according to embodiments.

One or more V-PCC component, geometry, attribute and occupancy map data associated with the point cloud data contained in each spatial region may be generated and stored in one or more tracks.

In order to allow the player/client to spatially access the point cloud data, it is necessary to allow simultaneous access to V-PCC component data associated with the point cloud data in the same spatial region. To this end, one or more tracks containing the V-PCC component data associated with the point cloud in the same spatial region may be indicated as a group such that the player/client may easily access the data in the track. This figure shows an embodiment in which a point cloud may be divided into two spatial regions and the V-PCC component tracks of point cloud data contained in the same spatial region are grouped into the same track group.

Hereinafter, tracks containing V-PCC component data associated with a bounding box (3D bounding box) are described.

One or more tracks containing V-PCC component data associated with a point cloud of a specific spatial region (3D bounding box) may be grouped as follows.

TrackGroupTypeBox with track_group_type equal to 'pccg' indicates that this track contains V-PCC components, e.g., geometry, attribute, occupancy map, associated with point cloud data in a certain 3D bounding box. The tracks that have the same value of track_group_id within PCC-GroupBox contains V-PCC component video data, e.g., geometry, attribute, occupancy map, associated with point cloud within the same 3D bounding box. Tracks carrying V-PCC component data corresponding to the point cloud in different 3D bounding boxes have different values of track_group_id within PCCGroupBox.

```
aligned(8) class PCCGroupBox extends
TrackGroupTypeBox('pccg') {
    unsigned int (1) partial_region_flag;
    3DRegionBox( );
    3DSpatialRelationshipBox ( );
}
```

PCCGroupBox may include boxes containing information that may be commonly applied to V-PCC component tracks associated with point cloud data included in the same spatial region, for example, 3DSpatialRelationshipBox( ) and 3DRegionBox( ).

Parial_region_flag is a flag indicating that the spatial region of the current V-PCC component track group is a part of the spatial region of the entire point cloud data (when the value of partial_region_flag is 1) or that the spatial region coincides with the spatial region of the entire point cloud data.

3DRegionBox may contain spatial region (bounding box) information of a point cloud associated with V-PCC component tracks.

```
aligned(8) class 3DRegionBox extends FullBox('3drg',0,0) {
    unsigned int(16) object_offset_x;
    unsigned int(16) object_offset_y;
    unsigned int(16) object_offset_z;
```

```
unsigned int(16) object_x_width;
unsigned int(16) object_y_height;
unsigned int(16) object_z_depth;
}
``` object_offset_x, object_offset_y, and object_offset_z may indicate the minimum x, y, and z offset values of a spatial region associated with the data contained in the V-PCC component track. object_x_width, object_y_height, and object_z_depth may indicate the width, height, and depth of the corresponding spatial region.

3DSpatialRelationshipBox may contain information about the relationship between a spatial region of a point cloud associated with the V-PCC component tracks and the entire point cloud region including the spatial region. It may contain spatial region information on the entire point cloud including the spatial region of the point cloud associated with the V-PCC component tracks. For example, when a point cloud object is divided into one or more sub-spatial regions, 3DSpatialRelationshipBox may contain bounding box information on the entire object, and 3DRegionBox may contain information on a spatial region of the point cloud associated with the current V-PCC component track group among all object bounding boxes (spatial regions).

```
aligned(8) class 3DSpatialRelationshipBox extends
FullBox('3dsr', 0, 0) {
unsigned int(32) total_offset_x;
unsigned int(32) total_offset_y;
unsigned int(32) total_offset_z;
unsigned int(32) total_x_width;
unsigned int(32) total_y_height;
unsigned int(32) total_z_depth;
unsigned int(32) source_id;
}
``` total_offset_x, total_offset_y, and total_offset_z may indicate the minimum x, y, and z offset values of the entire point cloud spatial region including the spatial region of the V-PCC component track. total_x_width, total_y_height, and total_z_depth may indicate the width, height, and depth of the corresponding spatial region. source_id may indicate an identifier of a data source included in the entire point cloud spatial region. For example, it may be an identifier of a point cloud object in the entire point cloud spatial region. Different point cloud objects or the entire point cloud spatial region has different source_ids. Based on the source_id value, the entire point cloud spatial regions including the spatial region of the V-PCC component track may be identified.

When the information contained in 3DRegionBox is different from the information contained in 3DSpatialRelationshipBox, this may indicate that the entire point cloud spatial region is divided into a plurality of sub-spatial regions. Alternatively, when SpatialRelationship3DDescriptionBox is present in a file, this may indicate that the entire point cloud spatial region is divided into a plurality of sub-spatial regions and may indicate a spatial relationship between the entire spatial region and the spatial region of the current track group.

```
aligned(8) class SpatialRelationship3DDescriptionBox extends
TrackGroupTypeBox('3dcc') {
// track_group_id is inherited from TrackGroupTypeBox;
3DSpatialRelationshipBox( );
3DRegionBox( );
}
```

Dynamic 3D Region Metadata Track

The spatial region information associated with the V-PCC component track may change over time. The dynamic 3D region metadata track may contain spatial region information that changes over time.

The track sample entry type 'dy3d' is used. The sample entry of this sample entry type is specified as follows:

```
aligned(8) class Dynamic3DRegionSampleEntry extends
MetaDataSampleEntry('dy3d') {
3DRegionBox( );
3DSpatialRelationshipBox ( );
unsigned int(1) dynamic_region_flag;
unsigned int(1) dynamic_region_relationship_flag;
unsigned int(6) reserved = 0;
}
```

3DRegionBox may contain initial spatial region information, and 3DSpatialRelationshipBox may contain initial information on the entire spatial region. dynamic_region_flag equal to 0 specifies that fields in 3DRegionBox remain unchanged in all samples referring to this sample entry. dynamic_region_flag equal to 1 specifies that 3DRegionBox is presented in the sample. When the value of dynamic_region_flag is 1, this may indicate that spatial region information changes over time. dynamic_region_relationship_flag equal to 0 specifies that fields in 3DRegionRelationshipBox remain unchanged in all samples referring to this sample entry. dynamic_region_relationshp_flag equal to 1 specifies that 3DRegionRelationshipBox is presented in the sample. When the value of dynamic_region_relationship_flag is 1, this may indicate that the entire spatial region information on the point cloud changes over time.

The corresponding metadata track sample syntax may be specified as follows:

```
aligned(8) DynamicRegionSample( ) {
if(dynamic_region_flag[i]) 3DRegionBox;
if(dynamic_region_relationship_flag[i]) 3DRegionRelationshipBox;
}
```

A 'cdsc' track reference may refer to a track associated with the corresponding metadata.

A 'cdtg' track reference may refer to a track group associated with the corresponding metadata. Through this, the V-PCC component track spatial information or the associated entire spatial information that changes over time may be signaled.

ISOBMFF Fragmented Design For Streaming Delivery

If movie fragments are used for delivery of V-PCC content, in the V-PCC track fragments, parameter set information is carried in SampleGroupDescriptionBox of type 'vpgd' included in MovieFragmentBox.

```
aligned(8) class VPCCSampleGroupEntry( ) extends
SampleGroupDescriptionEntry('vpgd'){
    unsigned int(16) sequenceParameterSetLength;
    bit(8*sequenceParameterSetLength) sequenceParameterSet;
    unsigned int(16) patchSequenceParameterSetLength;
    bit(8*sequenceParameterSetLength) patchSequenceParameterSet;
}
``` sequenceParameterSetLength indicates the length in bytes of the VPCC sequence parameter set. sequenceParameterSetUnit contains sequence parameter set data.

patchSequenceParameterSetLength indicates the length in bytes of the VPCC patch sequence parameter set. patchSequenceParameterSetUnit contains patch sequence parameter set data.

The method/device according to the embodiments provides partial delivery and access of V-PCC data. For spatial access of the V-PCC data, metadata representing the 3D spatial part of the PCC data is proposed.

Content consumed by a user for the method/device according to the embodiments may include a plurality of point cloud objects and/or portions of point cloud objects. When the user intends to consume only a specific portion of the point cloud object, other invisible portions of the point cloud object do not need to be processed. Thus, there is a need for a method for a player to selectively access and identify portions of a point cloud object.

As shown in the figure, the point cloud object may be spatially divided into a plurality of 3D spatial regions (or 3D grids). That is, the 3D bounding box of the point cloud may be divided into one or more 3D grids. Here, the 3D grid may be represented by x, y, and z offsets, width, height, and depth.

One or more tracks may include V-PCC components. For example, there may be geometry, attributes, and components corresponding to the same 3D grid. For partial access of V-PCC data, a player corresponding to the method/device according to the embodiments may identify a spatial region, access a set of tracks that carry point cloud data in the region.

In addition, when the point cloud object is moving, the spatial region information may change over time. The method/device according to the embodiments provides a scheme for signaling dynamically changing region information.

Hereinafter, the structure of the spatial region information will be described.

According to embodiments, SpatialRegionStruct( ) and SpatialRegion3DSourceStruct( ) provide information on a spatial region including the X, Y, and Z offsets of the spatial region.

```
aligned(8) class SpatialRegionStruct( ) {
    signed int(32) region_offset_x;
    signed int(32) region_offset_y;
    signed int(32) region_offset_z;
    unsigned int(32) region_size_width;
    unsigned int(32) region_size_height;
    unsigned int(32) region_size_depth;
}
aligned(8) class SpatialRegion3DSourceStruct( ) {
    signed int(32) source_origin_x;
    signed int(32) source_origin_y;
    signed int(32) source_origin_z;
    unsigned int(32) source_size_width;
    unsigned int(32) source_size_height;
    unsigned int(32) source_size_depth;
}
``` source_origin_x, source_origin_y, and source_origin_z indicate the origin of the source bounding box in the coordinate system, respectively. In the present disclosure, the coordinate system may refer to the Cartesian coordinate system according to embodiments.

source_size_width, source_size_height, and source_size_depth indicate the width, height, and depth of the source bounding box in the coordinate system, respectively.

region_offset_x, region_offset_y, and region_offset_z indicate the x, y, and z offsets of a spatial region corresponding to the 3D spatial part of the source bounding box in the coordinate system, respectively.

region_size_width, region_size_height, and region_size_depth indicate the width, height, and depth of a spatial region corresponding to the 3D spatial part of the source bounding box in the coordinate system, respectively.

If the spatial region is associated with a timed metadata track with sample entry type 'dysr', the x, y, and z offsets, width, height and depth of the spatial region change dynamically over time. Otherwise, the spatial region is static. In previous cases, dynamic spatial region parameters are signaled in the associated timed metadata track with sample entry type 'dysr'.

Spatial Region Track Grouping

TrackGroupTypeBox with track_group_type equal to '3drg' indicates that this track belongs to a group of tracks having a 3D spatial relationship (corresponding to, for example, 3D spatial parts of the source bounding box).

Tracks belonging to the same spatial region have the same value of track_group_id for track_group_type '3drg', and track_group_id of tracks from one spatial region is different from track group id of tracks from another spatial region.

```
aligned(8) class SpatialRegionGroupBox extends
TrackGroupTypeBox('3drg') {
    SpatialRegionStruct( );
    SpatialRegion3DSourceStruct( );
}
```

Tracks having the same value of track_group_id in TrackGroupTypeBox having track_group_type equal to '3drg' belong to the same spatial region. track_group_id in TrackGroupTypeBox having track_group_type equal to '3drg' is used as an identifier of the spatial region.

SpatialRegionStruct( ) and SpatialRegion3DSourceStruct( ) are specified as described above.

Dynamic Spatial Region Information

The spatial region timed metadata track represents the spatial region information, i.e., x, y, and z offset, width, height and depth of a region that changes dynamically over time.

Sample Entry

```
class DynamicSpatialRegionSampleEntry extends
MetaDataSampleEntry('dysr') {
    SpatialRegion3DSourceStruct( );
    SpatialRegionStruct( );
}
```

SpatialRegionStruct( ) is specified as described above. That is, it indicates the x, y, and z offsets, width, height, and depth of the spatial region.

SpatialRegion3DSourceStruct( ) is specified as described above. However, it may indicate that the source bounding box information is applied to all samples referencing this sample entry.

Sample Format

The sample syntax of this sample entry type ('dysr') is specified as follows:

```
aligned(8) DynamicSpatialRegionSample( ) {
    SpatialRegionStruct( );
}
```

Semantics of SpatialRegionStruct( ) are specified as described above.

The dynamic spatial region timed metadata track includes a 'cdsc' track that refers to track_group_id that represents the associated spatial region track group.

The method/device according to the embodiments may provide partial access of a bounding box as follows.

```
aligned(8) class 3DAnchorPoint( ) {
    unsigned int(16) anchor_x;
    unsigned int(16) anchor_y;
    unsigned int(16) anchor_z;
}
aligned(8) class CuboidRegionStruct( ) {
    unsigned int(16) cuboid_delta_x;
    unsigned int(16) cuboid_delta_y;
    unsigned int(16) cuboid_delta_z;
}
aligned(8) class 3dSpatialRegionStruct(dimensions_included_flag) {
    unsigned int(16) 3d_region_id;
    3DAnchorPoint( );
    if (dimensions_included_flag) {
        CuboidRegionStruct( );
    }
}
aligned(8) class 3DBoundingBoxStruct( ) {
    unsigned int(16) bb_delta_x;
    unsigned int(16) bb_delta_y;
    unsigned int(16) bb_delta_z;
}
```

3DSpatialRegionStruct and 3DBoundingBoxStruct provide information on a spatial region of point cloud data. For example, the information may include the x, y, and z offsets, width, height, depth of the spatial region of the point cloud data in the 3D space, and 3D bounding box information on the region.

3d_region_id is an identifier for a spatial region.

anchor_x, anchor_y, and anchor_z indicate x, y, and z coordinate values in the Cartesian coordinate system of the spatial region corresponding to the 3D spatial part of the point cloud data, respectively.

cuboid_delta_x, cuboid_delta_y, and cuboid_delta_z indicate dimensions of the cuboid region on the x, y, and z axes in the Cartesian coordinate system, respectively.

bb_delta_x, bb_delta_y, and bb_delta_z indicate extensions of a 3D bounding box of point cloud data on the x, y, and z axes with respect to the origin (0, 0, 0) in the Cartesian coordinate system, respectively.

dimensions_included_flag indicates whether the dimensions of a spatial region are signaled.

The method/device according to the embodiments may provide dynamic spatial region information.

When the V-PCC track has an associated timed-metadata track with sample entry type 'dysr', the 3D spatial regions defined for the point cloud stream carried by the V-PCC track are considered as dynamic regions. For example, the spatial region information may change dynamically over time.

The associated timed-metadata track includes a 'cdsc' track that references a V-PCC track carrying the atlas stream.

```
aligned(8) class Dynamic3DSpatialRegionSampleEntry extends
MetaDataSampleEntry('dysr') {
    VPCCSpatialRegionsBox( );
    }
    }
}
aligned(8) DynamicSpatialRegionSample( ) {
    unsigned int(16) num_regions;
    for (i = 0; i < num_regions; i++) {
        3DSpatialRegionStruct(dimensions_included_flag);
    }
}
``` num_regions indicates the number of 3D spatial regions signaled in the sample. It may not be equal to the total number of possible regions. There may be spatial regions within the sample in which positions and/or dimensions of the spatial regions are updated.

3DSpatialRegionStruct( ) is specified as described above. dimensions_included_flag equal to 0 may indicate that the dimensions are not signaled and may indicate that the dimensions are previously signaled for the same region. For example, it may represent a previous instance of 3DSpatialRegionStruct having the same 3d_region_id.

In a point cloud data transmission method according to embodiments of the present disclosure, point cloud data may be encapsulated based on a file. Here, the file may include a first track for providing spatial region information about the point cloud data. The first track may include x offset, y offset and z offset of the spatial region, and may also include the width, height and depth of the spatial region.

In a point cloud data transmission method according to embodiments, the point cloud data is encapsulated based on a file. Here, the file may contain a timed-metadata track including spatial region information about the point cloud data. The spatial region information may indicate a spatial region that changes over time.

In a point cloud data reception method according to embodiments of the present disclosure, point cloud data may be decapsulated based on a file. Here, the file may include a first track for providing spatial region information about the point cloud data. The first track may include x offset, y offset and z offset of the spatial region, and may also include the width, height and depth of the spatial region.

In a point cloud data reception method according to embodiments, point cloud data may be decapsulated based on a file. Here, the file may include a timed-metadata track containing spatial region information about the point cloud data. The spatial region information may indicate a spatial region that changes over time.

With the method/device according to the embodiments, V-PCC component tracks associated with a point cloud of the same spatial region may be efficiently grouped, and information about a spatial region where the same point cloud changes over time may be efficiently signalled.

Therefore, according to the above-described embodiments, the method/device of transmitting point cloud data may process and signal the entire region and/or a partial spatial region of an object that is a target of the point cloud data. As a result, the method/device of receiving point cloud data according to the embodiments may consume/display only some spatial regions desired by the user.

Since there may be various types/kinds of point cloud data, the point cloud reception method/device according to the embodiments may render the entire region of the point cloud object or selectively render only some regions of the object, and signal the spatial region of the object that dynamically changes over time. Therefore, the point cloud data may be efficiently transmitted and received.

Figure 32:
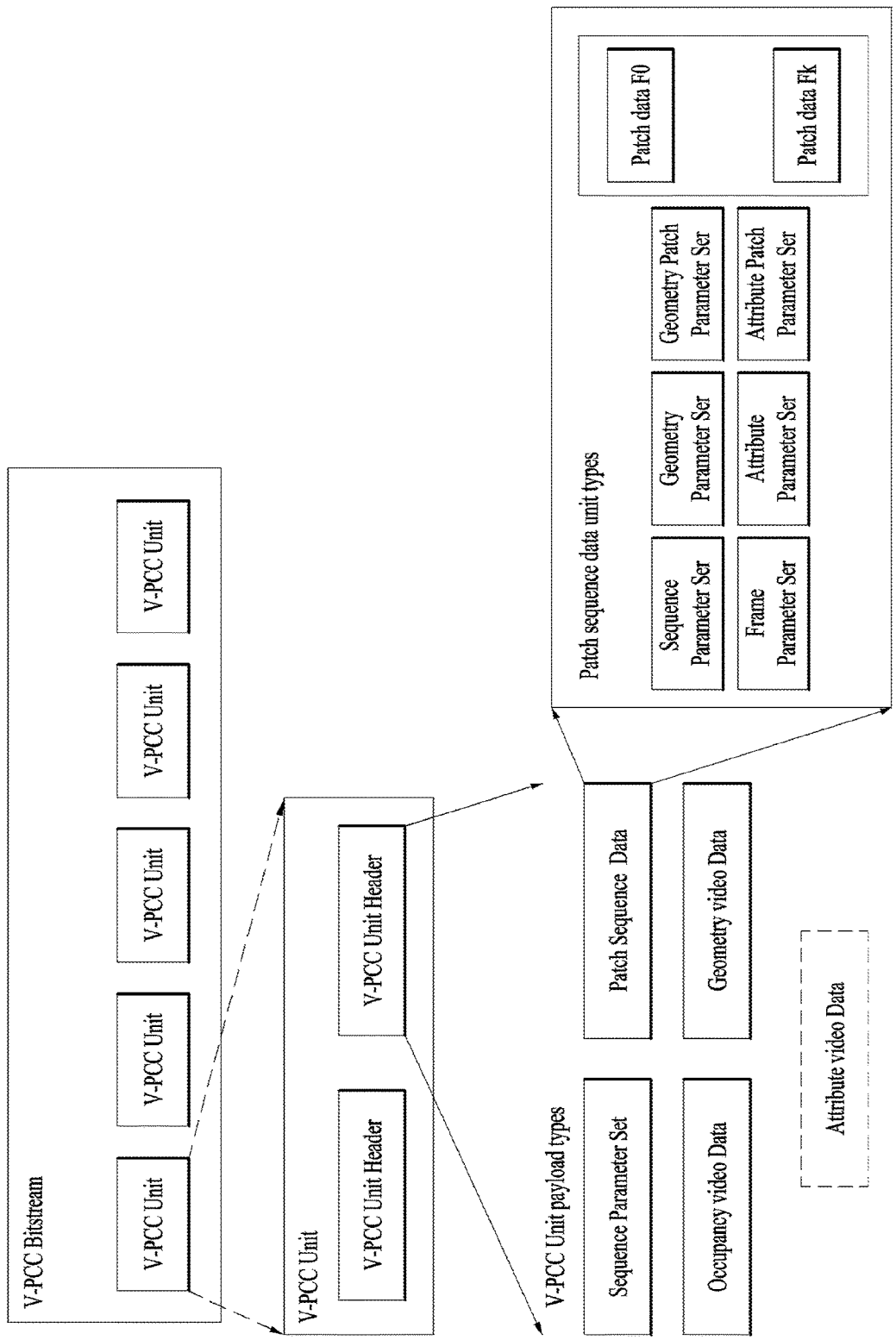
FIG. 32 illustrates an exemplary structure of a V-PCC bitstream according to embodiments.

FIG. 32 illustrates an exemplary structure of a V-PCC bitstream according to embodiments.

The V-PCC bitstream according to embodiments may be generated by a V-PCC encoding process. The V-PCC bitstream includes one or more V-PCC units.

The V-PCC unit includes a V-PCC unit header and a V-PCC unit payload.

The types of V-PCC unit payload include a sequence parameter set, patch sequence data, occupancy video data, geometry video data, and/or attribute video data.

The patch sequence data includes patch sequence data unit types.

The patch sequence data unit types include a sequence parameter set, a geometry parameter set, a geometry patch parameter set, a frame parameter set, an attribute parameter set, and/or an attribute patch parameter set, and patch data F0 to Fk.

V-PCC Unit Syntax

| | Descriptor |
|---|---|
| vpcc_unit( ) { | |
|     vpcc_unit_header( ) | |
|     vpcc_unit_payload( ) | |
| } | |

V-PCC Unit Header Syntax

| | Descriptor |
|---|---|
| vpcc_unit_header( ) { | |
|     vpcc_unit_type | u(5) |
|     if( vpcc_unit_type = = VPCC_AVD \|\| vpcc_unit_type = = VPCC_GVD \|\| | |
|     vpcc_unit_type = = VPCC_OVD \|\| vpcc_unit_type = = VPCC_PSD ) | |
|         vpcc_sequence_parameter_set_id | u(4) |
|     if( vpcc_unit_type = = VPCC_AVD ) { | |
|         vpcc_attribute_type | u(2) |
|         vpcc_attribute_index | u(5) |
|     if( sps_multiple_layer_streams_present_flag ) { | |
|         vpcc_layer_index | u(4) |
|         pcm_separate_video_data( 11 ) | |
|     } | |
|     else | |
|         pcm_separate_video_data( 15 ) | |

-continued

| | Descriptor |
|---|---|
| } else if( vpcc_unit_type = = VPCC_GVD ) { | |
|     if( sps_multiple_layer_streams_present_flag ) { | |
|         vpcc_layer_index | u(4) |
|         pcm_separate_video_data( 18 ) | |
|     } | |
|     else | |
|         pcm_separate_video_data( 22 ) | |
| } else | |
| if( vpcc_unit_type = = VPCC_OVD \|\| vpcc_unit_type = = VPCC_PSD) { | |
|     vpcc_reserved_zero_23bits | u(23) |
| } else | |
|     vpcc_reserved_zero_27bits | u(27) |
| } | | vpcc_unit_type indicates V-PCC unit types as specified in the table below.

Table V-PCC Unit Types

| vpcc_unit_type | Identifier | V-PCC Unit Type | Description |
|---|---|---|---|
| 0 | VPCC_SPS | Sequence parameter set | Sequence level parameters |
| 1 | VPCC_PSD | Patch Sequence Data | Patch sequence information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5 . . . 31 | VPCC_RSVD | Reserved | — | vpcc_sequence_parameter_set_id specifies the value of sps_sequence_parameter_set_id for the active VPCC SPS. The value of vpcc_sequence_parameter_set_id shall be in the range of 0 to 15, inclusive.

vpcc_attribute_type indicates the type of attribute data carried in the attribute video data unit. For example, the types may include color, reflectance, material.

| vpcc_attribute_type | Attribute type |
|---|---|
| 0 | Texture |
| 1 | Material ID |
| 2 | Transparency |
| 3 | Reflectance |
| 4 | Normals |
| 5 . . . 14 | Reserved |
| 15 | Unspecified | vpcc_attrbute_index indicates the index of the attribute data carried in the attribute video data unit.

vpcc_layer_index indicates the index of the current layer.

V-PCC unit payload syntax

| | Descriptor |
|---|---|
| vpcc_unit_payload( ) { | |
|     if( vpcc_unit_type = = VPCC_SPS ) | |
|         sequence_parameter_set( ) | |

-continued

| | Descriptor |
|---|---|
| else if( vpcc_unit_type = = VPCC_PSD ) | |
|     patch_sequence_data_unit( ) | |
| else if( vpcc_unit_type = = VPCC_OVD \|\| | |
| vpcc_unit_type = = VPCC_GVD \|\| | |
|     vpcc_unit_type = = VPCC_AVD) | |
|     video_data_unit( ) | |
| } | |

VPCC sequence parameter set unit contains the following information.

| | Descriptor |
|---|---|
| sequence_parameter_set( ) { | |
|     profile_tier_level( ) | |
|     sps_sequence_parameter_set_id | u(4) |
|     sps_frame_width | u(16) |
|     sps_frame_height | u(16) |
|     sps_avg_frame_rate_present_flag | u(1) |
|     if( sps_avg_frame_rate_present_flag ) | |
|         sps_avg_frame_rate | u(16) |
|     sps_enhanced_occupancy_map_for_depth_flag | u(1) |
|     sps_geometry_attribute_different_layer_flag | u(4) |
|     if(sps_geometry_attribute_different_layer_flag) | |
|         sps_layer_count_geometry_minus1 | u(4) |
|     else | |
|         sps_layer_count_minus1 | u(4) |
|     if( sps_layer_count_minus1 > 0 ) | |
|         sps_multiple_layer_streams_present_flag | u(1) |
|     sps_layer_absolute_coding_enabled_flag[ 0 ] = 1 | |
|     for(i = 0; i < sps_layer_count_minus1; i++ ) { | |
|         sps_layer_absolute_coding_enabled_flag[ i + 1 ] | u(1) |
|     if( sps_layer_absolute_coding_enabled_flag[ i + 1 ] = = 0 ) { | |
|         if( i > 0) | |
|             sps_layer_predictor_index_diff[ i + 1 ] | ue(v) |
|         else | |
|     sps_layer_predictor_index_diff[ i + 1 ] = 0 | |
|     } | |
| } | |
|     sps_pcm_patch_enabled_flag | u(1) |
|     if( sps_pcm_patch_enabled_flag ) | |
|         sps_pcm_separate_video_present_flag | u(1) |
|     occupancy_parameter_set( ) | |
|     geometry_parameter_set( ) | |
|     sps_attribute_count | u(16) |
|     for( i = 0; i < sps_attribute_count; i++ ) | |
| { | |
|   if(sps_geometry_attribute_different_layer_flag ) | |
|         sps_layer_count_attribute_minus1[i] | u(4) |
|     attribute_parameter_set( i ) | |
| } | |
|     sps_patch_sequence_orientation_enabled_flag | u(1) |
|     sps_patch_inter_prediction_enabled_flag | u(1) |
|     sps_pixel_deinterleaving_flag | u(1) |
|     sps_point_local_reconstruction_enabled_flag | u(1) |
|     sps_remove_duplicate_point_enabled_flag | u(1) |
|     byte_alignment( ) | |
| } | | sps_sequence_parameter_set_id provides an identifier for the VPCC SPS for reference by other syntax elements.

sps_frame_width indicates the nominal frame width in terms of integer luma samples.

sps_frame_height indicates the nominal frame height in terms of integer luma samples.

sps_avg_frame_rate_present_flag equal to 0 indicates that no average nominal frame rate information is indicated in the bitstream. sps_avg_frame_rate_present_flag equal to 1 indicates that the average nominal frame rate information shall be indicated in the bitstream.

sps_avg_frame_rate indicates the average nominal point cloud frame rate, in units of point cloud frames per 256 seconds. When sps_avg_frame_rate is not present, the value thereof shall be inferred as being equal to 0.

During the reconstruction phase, the decoded occupancy, geometry, and attribute videos could be converted to the nominal width, height, and frame rate using appropriate scaling.

sps_enhanced_occupancy_map_for_depth_flag equal to 1 indicates that the decoded occupancy map video contains information related to whether intermediate depth positions between two depth layers are occupied. sps_enhanced_depth_code_enabled_flag equal to 0 indicates that the decoded occupancy map video does not contain information related to whether intermediate depth positions between two depth layers are occupied.

sps_layer_count_minus1 plus 1 indicates the number of layers used for the geometry and attribute data.

sps_multiple_layer_streams_present_flag equal to 0 indicates that all geometry or attribute layers are placed in a single geometry or attribute video stream, respectively. sps_multiple_layer_streams_present_flag equal to 1 indicates that all geometry or attribute layers are placed in separate video streams.

sps_layer_absolute_coding_enabled_flag[i] equal to 2 indicates that the geometry layer with index i is coded without any form of layer prediction. sps_layer_absolute_coding_enabled_flag[i] equal to 0 indicates that the geometry layer with index i is first predicted from another, earlier coded layer, prior to coding.

sps_layer_predictor_index_diff[i] is used to compute the predictor of the geometry layer with index i when sps_layer_absolute_coding_enabled_flag[i] is equal to 0.

sps_pcm_patch_enabled_flag equal to 1 indicates that patches with PCM coded points may be present in the bitstream.

sps_pcm_separate_video_present_flag equal to 1 indicates that PCM coded geometry and attribute information may be stored in a separate video stream.

sps_attribute_count indicates the number of attributes associated with the point cloud.

sps_patch_sequence_orientation_enabled_flag indicates whether flexible orientation may be signaled in the patch sequence data unit or not. sps_patch_sequence_orientation_enabled_flag equal to 1 indicates that flexible orientation may be signaled. sps_patch_sequence_orientation_enabled_flag equal to 0 indicates that flexible orientation is not signaled.

sps_patch_inter_prediction_enabled_flag equal to 1 indicates that inter-prediction for patch information may be used based on patch information from previously encoded patch frames.

sps_pixel_deinterleaving_flag equal to 1 indicates that the decoded geometry and attribute videos corresponding to a single stream contain interleaved pixels from two layers. sps_pixel_deinterleaving_flag equal to 0 indicates that the decoded geometry and attribute videos corresponding to a single stream contain pixels from only a single layer.

sps_point_local_reconstruction_enabled_flag equal to 1 indicates that the local reconstruction mode may be used during the point cloud reconstruction process.

sps_remove_duplicatepoint_enabled_flag equal to 1 indicates that duplicated points shall not be reconstructed, where a duplicated point is a point with the same 2D and 3D geometry coordinates as another point from a lower layer.

sps_geometry_attribute_different_layer_flag equal to 1 indicates that the numbers of layers used for encoding the geometry and attribute data are different. For example, while two layers may be used for the geometry coding, one layer may be used for attribute. sps_geometry_attribute_different_layer flag equal to 1 indicates whether the number of layers used for encoding geometry and attribute data may be signaled in the patch sequence data unit or not.

sps_layer_count_geometry_minus1 plus 1 indicates the number of layers used for encoding the geometry data.

sps_layer_count_attribute_minus1[i] plus 1 indicates the number of layers used for encoding the i-th attribute data associated with the point cloud.

| | Descriptor |
|---|---|
| vpcc_patch_sequence_parameter_set( ) { | |
|   psps_patch_sequence_parameter_set_id | ue(v) |
|   psps_log2_max_patch_frame_order_cnt_lsb_minus4 | ue(v) |
|   psps_max_dec_patch_frame_buffering_minus1 | ue(v) |
|   psps_long_term_ref_patch_frames_flag | u(1) |
|   psps_num_ref_patch_frame_lists_in_sps | ue(v) |
|   for( j = 0; j < psps_num_ref_patch_frame_lists_in_sps; j++) | |
|     ref_list_struct( j ) | |
| } | | psps_patch_sequence_parameter_set_id provides an identifier for the patch sequence parameter set for reference by other syntax elements.

psps_log 2_max_patch_frame_order_cnt_lsb_minus4 specifies the value of the variable MaxPatchFrmOrderCntLsb that is used in the decoding process for the patch frame order count.

psps_max_dec_patch_frame_buffering_minus1 plus 1 specifies the maximum required size of the decoded patch frame buffer for the CPCS in units of patch frame storage buffers.

psps_long_term_ref_patch_frames_flag equal to 0 specifies that no long term reference patch frame is used for inter-prediction of any coded patch frame in the coded point cloud sequence.

psps_num_ref_patch_frame_lists_in_sps specifies the number of the ref_list_struct(rlsIdx) syntax structures included in the patch sequence parameter set.

Figure 33:
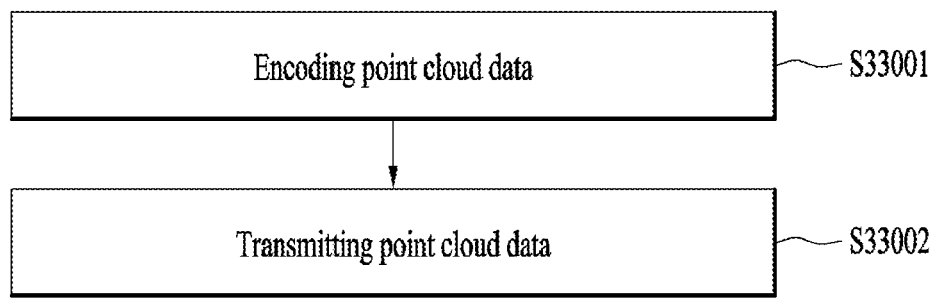
FIG. 33 illustrates a method of transmitting point cloud data according to embodiments.

FIG. 33 illustrates a method of transmitting point cloud data according to embodiments.

The transmission method according to the embodiments includes the following operations.

Regarding operation S33001, an encoder may encode the point cloud data. The encoding technique described above with reference to FIGS. 1, 4, 15, 18, and 20 to 22 may be applied.

Regarding operation S33002, a transmitter may transmit the point cloud data. The transmission scheme described above with reference to FIGS. 1, 4, 15, 18, and 20 to 22 may be applied.

With the transmission method according to the embodiments, data components related to a spatial region represented by the point cloud data may be efficiently encoded and transmitted. In addition, the spatial region that changes over time may be efficiently signaled.

The point cloud data transmission method according to the embodiments may achieve technical objects and/or effects through combination and/or modification of the above-described operations.

Figure 34:
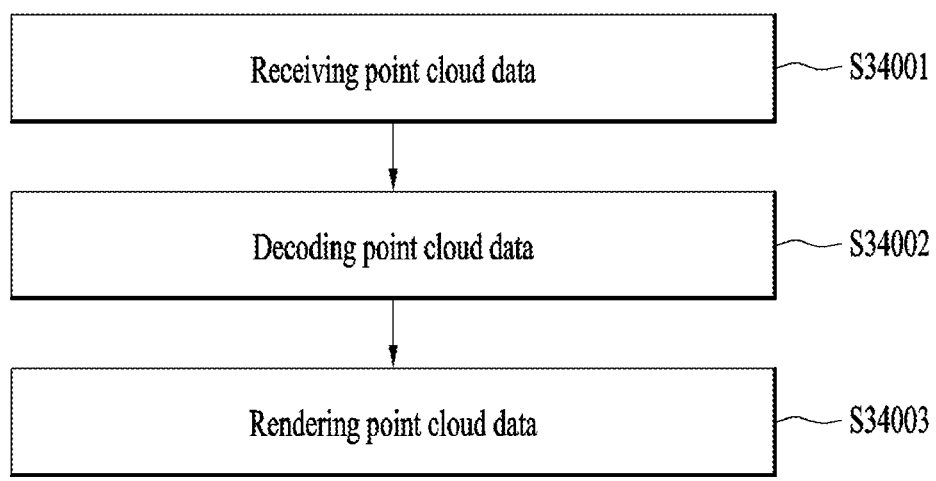
FIG. 34 illustrates a method of receiving point cloud data according to embodiments.

FIG. 34 illustrates a method of receiving point cloud data according to embodiments.

The reception method according to the embodiments includes the following operations.

Regarding operation S34001, a receiver may receive point cloud data.

Regarding operation S34002, a decoder may decode the point cloud data.

Regarding operation S34003, a renderer may render the point cloud data.

With the reception method according to the embodiments, data components related to a spatial region represented by the point cloud data may be efficiently received and decoded. In addition, the spatial region that changes over time may be efficiently signaled.

The point cloud data reception method according to the embodiments may achieve technical objects and/or effects through combination and/or modification of the above-described operations.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

It will be appreciated by those skilled in the art that various modifications and variations may be made in the embodiments without departing from the scope of the disclosures. Thus, it is intended that the present disclosure cover the modifications and variations of the embodiments provided they come within the scope of the appended claims and their equivalents.

Both apparatus and method disclosures are described in this specification and descriptions of both the apparatus and method disclosures are complementarily applicable.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C."

Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components.

As used herein, conditional expressions such as "if" and "when" are not limited to an optional case and are intended to be interpreted, when a specific condition is satisfied, to perform the related operation or interpret the related definition according to the specific condition.

[Mode for Disclosure]

As described above, related details have been described in the best mode for carrying out the embodiments.

[Industrial Applicability]

As described above, the embodiments are fully or partially applicable to a point cloud data transmission/reception device and system.

Those skilled in the art may change or modify the embodiments in various ways within the scope of the embodiments.

Embodiments may include variations/modifications within the scope of the claims and their equivalents.

It will be apparent to those skilled in the art that various modifications and variations can be made in the present invention without departing from the spirit and scope of the invention. Thus, it is intended that the present invention cover the modifications and variations of this invention provided they come within the scope of the appended claims and their equivalents.

What is claimed is:

1. A method for transmitting point cloud data, the method comprising:
   encoding point cloud data;
   encapsulating the point cloud data included in a file,
   wherein the file includes a geometry track including geometry data of the encoded point cloud data, an attribute track including attribute data of the encoded point cloud data, an occupancy track including occupancy data of the encoded point cloud data, wherein the file further includes metadata including:
3D bounding box information of the point cloud data, wherein the 3D bounding box information includes extension information of an entire volumetric media of the point cloud data in coordinates along x, y, and z axes; and
spatial region information for a sub-region of the entire volumetric media of the point cloud data, wherein the spatial region information includes dimension information for the sub-region in coordinates along x, y, and z axes; and
transmitting the file.

2. The method of claim 1,
wherein the file includes a timed-metadata track including information of a specific spatial region for the point cloud data, and
wherein the specific spatial region is dynamically changed over time.

3. An apparatus for transmitting point cloud data, the apparatus comprising:
a hardware transmitter; and
a processor configured to:
encode point cloud data; and
encapsulate the point cloud data in a file,
wherein the file includes a geometry track including geometry data of the encoded point cloud data, an attribute track including attribute data of the encoded point cloud data, an occupancy track including occupancy data of the encoded point cloud data,
wherein the file further includes metadata including:
3D bounding box information of the point cloud data, wherein the 3D bounding box information includes extension information of an entire volumetric media of the point cloud data in coordinates along x, y, and z axes; and
spatial region information for a sub-region of the entire volumetric media of the point cloud data, wherein the spatial region information includes dimension information for the sub-region in coordinates along x, y, and z axes, and
wherein the transmitter is configured to transmit the file.

4. The apparatus of claim 3,
wherein the file includes a timed-metadata track including information of a specific spatial region for the point cloud data, and
wherein the specific spatial region is dynamically changed over time.

5. A method for receiving point cloud data, the method comprising:
receiving a file including point cloud data;
decapsulating the point cloud data included the file,
wherein the file includes a geometry track including geometry data of the point cloud data, an attribute track including attribute data of the point cloud data, an occupancy track including occupancy data of the point cloud data, and
wherein the file further includes metadata including:
3D bounding box information of the point cloud data, wherein the 3D bounding box information includes extension information of an entire volumetric media of the point cloud data in coordinates along x, y, and z axes; and
spatial region information for a sub-region of the entire volumetric media of the point cloud data, wherein the spatial region information includes dimension information for the sub-region in coordinates along x, y, and z axes;
decoding the point cloud data; and
rendering the point cloud data.

6. The method of claim 5,
wherein the file includes a timed-metadata track including information of a specific spatial region for the point cloud data, and
wherein the specific spatial region is dynamically changed over time.

7. An apparatus for receiving point cloud data, the apparatus comprising:
hardware receiver configured to receive a file including point cloud data;
a processor configured to:
decapsulate the point cloud data included in the file,
wherein the file includes a geometry track including geometry data of the point cloud data, an attribute track including attribute data of the point cloud data, an occupancy track including occupancy data of the point cloud data, and
wherein the file further includes metadata including:
3D bounding box information of the point cloud data, wherein the 3D bounding box information includes extension information of entire volumetric media of the point cloud data in coordinates along x, y, and z axes; and
spatial region information for a sub-region of the entire volumetric media of the point cloud data, wherein the spatial region information includes dimension information for the sub-region in coordinates along x, y, and z axes;
decode the point cloud data; and
render the point cloud data.

8. The apparatus of claim 7,
wherein the file includes a timed-metadata track including information of a specific spatial region for the point cloud data, and
wherein the specific spatial region is dynamically changed over time.

* * * * *